United States Patent [19]

Fukuda et al.

[11] Patent Number: 5,333,231
[45] Date of Patent: Jul. 26, 1994

[54] WAVELENGTH CONVERSION ELEMENT

[75] Inventors: Hiroaki Fukuda, Yokohama; Hiroyoshi Funato, Chigasaki; Shigeyoshi Misawa, Tokyo, all of Japan

[73] Assignee: Ricoh Company, Ltd., Tokyo, Japan

[21] Appl. No.: 876,042

[22] Filed: Apr. 30, 1992

[30] Foreign Application Priority Data

| May 2, 1991  | [JP] | Japan | 3-100836 |
| May 2, 1991  | [JP] | Japan | 3-130592 |
| May 9, 1991  | [JP] | Japan | 3-133616 |
| May 17, 1991 | [JP] | Japan | 3-113265 |
| May 20, 1991 | [JP] | Japan | 3-114805 |
| Oct. 28, 1991| [JP] | Japan | 3-281522 |
| Jan. 24, 1992| [JP] | Japan | 4-034250 |

[51] Int. Cl.⁵ .................. G02B 6/10; H01S 3/10
[52] U.S. Cl. ........................... 385/122; 385/4; 385/5; 385/8; 385/9; 385/11; 385/14; 385/129; 359/332; 372/21
[58] Field of Search ............. 385/122, 129, 130, 131, 385/1-11, 14; 359/326, 328, 332; 372/21

[56] References Cited

U.S. PATENT DOCUMENTS

| 4,852,961 | 8/1989  | Yamamoto et al. | 385/122 |
| 4,896,930 | 1/1990  | Tsuchitani et al.| 385/122 |
| 4,907,850 | 3/1990  | Araki et al.    | 359/332 |
| 5,005,933 | 4/1991  | Shimuzu         | 385/122 |
| 5,036,220 | 7/1991  | Byer et al.     | 385/122 |
| 5,052,770 | 10/1991 | Papuchon        | 359/328 |
| 5,112,532 | 5/1992  | Ninomiya et al. | 252/587 |
| 5,133,027 | 7/1992  | Funazaki et al. | 385/5   |
| 5,157,754 | 10/1992 | Bierlein et al. | 385/122 |

FOREIGN PATENT DOCUMENTS 60-169826 9/1985 Japan ................................. 359/332
63-44781 2/1988 Japan .

Primary Examiner—Frank Gonzalez
Attorney, Agent, or Firm—Oblon, Spivak, McClelland, Maier & Neustadt

[57] ABSTRACT

A wavelength conversion element includes a substrate made of $LiTaO_3$ of non-linear medium, a three-dimensional waveguide formed in the substrate and a second harmonic generation portion for defining a change in refractive index in the waveguide with a period $\Lambda$ and generating a second harmonic of a fundamental wave introduced into the wave guide, where $\Lambda = 2m\pi/\{\beta(2\omega) - 2\beta(\omega)\}$, $m$ is a natural number, $\omega$ is a frequency of fundamental harmonic, $\beta(\omega)$ is a propagation constant of the fundamental wave, and $\beta(2\omega)$ is a propagation constant of second harmonic.

17 Claims, 19 Drawing Sheets

WAVELENGTH CONVERSION ELEMENT

BACKGROUND OF THE INVENTION

1. Field of the Invention

The present invention relates to a wavelength conversion element. More particularly, the invention relates to a wavelength conversion element for converting a wavelength of an optical beam into a shorter wavelength, using a nonlinear optical medium.

2. Description of the Related Background Art

A wavelength conversion element, specifically second harmonic generation (SHG) element, is an element for converting a wavelength λ of laser into a half of λ using an optical crystal material having a nonlinear effect.

Use of second harmonic allows a great increase in record density of information in an optical information record medium such as an optical disk. Therefore, recent development of SHG element becomes brisk these days. There are various SHG elements of three-dimensional waveguide known.

Conventional SHG elements are of a combination of high output coherent light source and bulk elements of nonlinear crystal. There is, however, a strong demand to make the optical disk apparatus and the laser printers smaller, so that semiconductor lasers have been replacing gas lasers as a light source recently. A light source of semiconductor laser has an output of several to several 10's mW, which requires the SHG element of thin film waveguide type to obtain a high conversion efficiency. Such SHG elements are disclosed for example in (1) Japanese Unexamined Patent Publication Sho 63-44781, (2) ELECTRONICS LETTERS Vol. 25 No. 3 (1989), and (3) 27a-p-10, Preview for the 51st academic presentations of Society of Applied Physics of Japan, Fall 1990.

In the SHG element as disclosed in (1), a substrate is formed of nonlinear optical crystal material of LiNbO$_3$, and Ti is diffused on the substrate to form a waveguide. A diffraction grating is formed on the upper surface of the waveguide with a predetermined pitch. When a laser beam of wavelength λ is introduced into an end of the waveguide from the laser light source as a fundamental wave, a second harmonic light (SHG light ) of a half of wavelength λ is output from the other end of the waveguide in the thus-arranged SHG element. The diffraction grating provided on the upper surface of the waveguide serves to cancel a difference of refractive index between the fundamental wave laser beam and the SHG light. Thus the diffraction grating enhances a conversion efficiency into the SHG light by matching the phases of the fundamental wave laser beam and the SHG light. For this, the diffraction grating must have a pitch equal to a wavelength of the fundamental wave laser beam incident into the waveguide to satisfy the Bragg condition.

The phase matching may be conducted by index dispersion means for canceling the index difference between the fundamental wave and a higher harmonic by wavelength dispersion of nonlinear medium in the waveguide.

The above reference (2) discloses a domain inversion periodic structure as index dispersion means to generate the second harmonic with a high efficiency.

Also, the above reference (3) discloses an inversion region formed by thermal treatment of proton-exchanged LiTaO$_3$.

Most of the conventional techniques use index dispersion means of domain inversion in the three-dimensional waveguide on LiNbO$_3$ crystal to effect the phase matching. However, if the intensity of light in the waveguide is strong, the LiNbO$_3$ crystal may suffer an optical damage where the refractive index varies, presenting a defect of mismatching in phase. Further, the LiNbO$_3$ crystal has a relatively high Curie point, which leads to a difficulty in production of index dispersion means of domain inversion.

In addition, when the wavelength conversion element is applied to the optical disk apparatus or the laser printer to increase a capacity of information in the optical disk by a shorter wavelength light, it is essential for the element that the element is not against downsizing of the optical disk apparatus and that the intensity of shorter wavelength light can be modulated. The semiconductor laser is suitable for downsizing of the apparatus, but the gas laser is not. Although the semiconductor laser has a lower output as compared to the gas laser, the wavelength conversion element of waveguide type as described above may expect a high conversion efficiency even in use of the semiconductor laser as a laser light source.

However, it is difficult to output a modulated shorter wavelength light. Therefore, it is extremely difficult to obtain a wavelength conversion element suitable for the optical disk apparatus, which can output a shorter wavelength light with a high efficiency and which may modulate the shorter wavelength light. For example, if the semiconductor laser itself is modulated to modulate the shorter wavelength light, the wavelength of fundamental wave light would be unstable, which cannot supply a shorter wavelength light with a high efficiency.

As explained, the modulation of second harmonic itself is necessary for processing information or for recording information using the second harmonic. It would be convenient if a single element could perform both generation and modulation of second harmonic. There has been no such element obtained.

SUMMARY OF THE INVENTION

It is a first object of the present invention to provide a wavelength conversion element using LiTaO$_3$ crystal, less in optical damage because of a higher optical damage threshold level than LiNbO$_3$ crystal and easy in production of index dispersion means of domain inversion because of a relatively lower Curie point than the LiNbO$_3$ crystal.

The first object of the present invention can be achieved by a wavelength conversion element comprising a substrate made of LiTaO$_3$ of nonlinear medium, a three-dimensional waveguide formed in the substrate, and a second harmonic generation section for defining a change in refractive index in the waveguide with a period Λ as set below to generate a second harmonic of a fundamental wave introduced into the waveguide;

$$\lambda = 2m\pi/\{\beta(2\omega)-2\beta(\omega)\},$$

where m represents a natural number, ω a frequency of fundamental wave, $\beta(\omega)$ a propagation constant of fundamental wave, and $\beta(2\omega)$ a propagation constant of second harmonic.

Used in the wavelength conversion element of the present invention is the $LiTaO_3$ crystal, which is less in optical damage because it has a greater optical damage threshold level than the $LiNbO_3$ crystal, which is easy in production of index dispersion means of domain inversion because it has a lower Curie point than the $LiNbO_3$, and which allows low temperature formation of polarization inversion, easy production and control of wavelength conversion element, and reduction in production cost thereof, as compared to one using the $LiNbO_3$.

Further, since the $LiTaO_3$ crystal is used in the wavelength conversion element of the present invention, the photorefractive effect is smaller because of the higher optical damage threshold level, increasing an allowable input power, and thereby increasing the generation efficiency into the second harmonic.

In an aspect of the present invention, a -c plate is used as the substrate, a direction of light propagation is taken as the z-axis, the -c axis of the substrate as the x-axis perpendicular to the z-axis, an electric field of the fundamental wave is polarized in parallel with the x-axis, and an electric field of the second harmonic is polarized in parallel with the x-axis.

In another aspect of the present invention, a -c plate is used as the substrate, a direction light propagation is taken as the z-axis, the -c axis of the substrate as the x-axis perpendicular to the z-axis, an electric field of the fundamental wave is polarized in parallel with the y-axis, and an electric field of the second harmonic is polarized in parallel with the x-axis.

The second harmonic generation means may be a polarization inversion layer arranged in the above. The polarization inversion layer may be formed by thermal treatment of proton exchange substrate.

Also, it is a second object of the present invention to provide a novel wavelength conversion element enabling both generation and modulation of second harmonic.

The second object of the invention can be achieved by a wavelength conversion element comprising a substrate of nonlinear medium, a three-dimensional waveguide formed in the substrate, a second harmonic generation section for generating a second harmonic of a fundamental wave introduced into the waveguide, and a second harmonic modulation section for modulating the second harmonic.

The wavelength conversion element of the present invention has the second harmonic generation section and the second harmonic modulation section together incorporated in the substrate.

The present invention may provide the novel wavelength conversion element. The same element can execute both the generation and the modulation of second harmonic as explained above.

In an aspect of the present invention, optical modulation means performs the modulation of second harmonic by mode conversion between the TE and the TM modes for the fundamental wave laser beam introduced into the three-dimensional waveguide.

The optical modulation means has electrodes with a period of electrode spacing, $\Lambda_2 = \lambda/\{Nte-Ntm\}$, to generate a periodic electric field in the direction of waveguide in the three-dimensional waveguide. In the equation, $\lambda$ is a wavelength of the fundamental wave laser beam, and Nte and Ntm are effective refractive indices of TE and TM modes in the three-dimensional waveguide, respectively.

The phase matching is necessary upon generation of second harmonic between the fundamental wave and the second harmonic. The phase matching may be carried out by special phase matching means or by selection of substrate.

As a further feature of the present invention, the phase matching means may be a part of the second harmonic generation means having a polarization inversion region formed with a period $\Lambda_1$ as defined below in the direction of waveguide:

$$\Lambda_1 = 2(2m-1)\pi/\{\beta(2\omega)-2\beta(\omega)\},$$

where m is a natural number, $\beta(\omega)$ a propagation constant of guided mode light for the laser beam of fundamental wave, and $\beta(2\omega)$ a propagation constant of guided mode light for the second harmonic.

Also as a feature of the present invention, the phase matching may be effected by birefringence of $LiNbO_3$ of substrate when the substrate is a c plate of $LiNbO_3$ with the three-dimensional waveguide being formed therein by diffusion, the propagation direction of light is the y-axis, the c axis is the z-axis perpendicular to the y-axis, an electric field of the fundamental wave is polarized in parallel with the x-axis, an electric field of the second harmonic is polarized in parallel with the z-axis, and the wavelength of fundamental wave is not less than 1 μm.

As a further feature of the present invention, if the periodic polarization inversion region is used as the phase matching means, a -c plate of $LiTaO_3$ and a c plate of $LiNbO_3$ may be used as the substrate. The three-dimensional waveguide is formed in the substrate by diffusion. The substrate of $LiNbO_3$ may be replaced by the substrate of $LiNbO_3$ doped with MgO.

If the -c plate of $LiTaO_3$ is used, if the propagation direction of light is aligned with the y-direction, and if the -c axis is aligned with the z-direction perpendicular to the y-direction, a z-directionally polarized wave with the electric field in parallel with the z-axis may be used as the fundamental wave, and a z-directionally polarized wave as the second harmonic. If the direction of light propagation is aligned with the y-direction and the -c axis with the z-direction perpendicular thereto, an x-directionally polarized wave with the electric field in parallel with the x-axis may be used as the fundamental wave, and a z-directionally polarized wave with the electric field in parallel with the z-axis as the second harmonic.

If the c plate of $LiNbO_3$ is used, if the direction of light propagation is aligned with the y-direction, and if the c axis is aligned with the z-direction perpendicular to the y-direction, a z-directionally polarized wave with the electric field in parallel with the z-axis may be used as the fundamental wave, and a z-directionally polarized wave as the second harmonic. Also, if the direction of light propagation is aligned with the y-direction and the c axis is aligned with the z-direction perpendicular thereto, an x-directionally polarized wave with the electric field in parallel with the x-axis may be used as the fundamental wave, and a z-directionally polarized wave with the electric field in parallel with the z-axis as the second harmonic.

Further, if the three-dimensional waveguide is formed by proton exchange of c plate of $LiNbO_3$, the second harmonic may be produced by the Cherenkov radiation.

In the wavelength conversion element, modulation of second harmonic may be effected by mode conversion between the TE and the TM modes for the fundamental wave laser beam introduced into the three-dimensional waveguide.

In the wavelength conversion element an electric field may be created in the direction of light propagation in the waveguide by an arrangement of electrodes of optical modulation means to cause major axis rotation of index ellipsoid, thereby causing mode coupling of the TE and the TM modes. The second harmonic may be modulated by the mode conversion by the mode coupling.

Second harmonic generation means and a pair of electrodes may be incorporated in the single substrate in the wavelength conversion element.

The second harmonic generation means is divided into two branches on the side of output, to have a three-dimensional waveguide of Y-shape for guiding the fundamental wave laser beam and for generating the second harmonic from the fundamental wave laser beam.

The pair of electrodes change the phase of the guided wave before the branch point of the waveguide to select a branch of the branched waveguide.

Then the optical modulation is effected by selection of branch of the three-dimensional waveguide or branched waveguide. As a further feature of the present invention, the substrate may be made of nonlinear medium, and the second harmonic generation means is a polarizaion inversion region formed in the three-dimensional waveguide with a period A as defined below in the direction of waveguide:

$$\Lambda = 2(2m-1)\pi/\{\beta(2\omega) - 2\beta(\omega)\},$$

where m is a natural number, $\beta(\omega)$ a propagation constant of guided mode light for the fundamental wave laser beam, and $\beta(2\omega)$ a propagation constant of guided mode light for the second harmonic.

In this case, the second harmonic generation means itself has a function of phase matching.

Further in this case, the second harmonic generation means of the polarization inversion region may be formed in an intermediate portion between the entrance of the fundamental wave laser beam and the branch point of the waveguide. It may be formed on one of the branches of waveguide.

As a further feature of the present invention, the substrate is a -c plate of $LiTaO_3$ with the three-dimensional waveguide being formed therein by diffusion, the propagation direction of light is the y-axis, the -c axis is the z-axis perpendicular to the y-axis, an electric field of the fundamental wave is polarized in parallel with the z-axis or with the x-axis, and an electric field of the second harmonic is polarized in parallel with the z-axis. Also, the substrate is a c plate of $LiNbO_3$ with the three-dimensional waveguide being formed therein by diffusion, the propagation direction of light is the y-axis, the c axis is the z-axis perpendicular to the y-axis, an electric field of the fundamental wave is polarized in parallel with the z-axis or with the x-axis, and an electric field of the second harmonic is polarized in parallel with the z-axis.

Further, the substrate may be a c plate of $LiNbO_3$ with the three-dimensional waveguide being formed therein by diffusion, the propagation direction of light is the y-axis, an electric field of the fundamental wave is polarized in parallel with the x-axis, an electric field of the second harmonic is polarized in parallel with the z-axis, and phase matching is effected by birefringence of the substrate, as defined in claim 21, In this case a metal cladding may be formed on the other branch of waveguide which emits no modulated second harmonic.

The substrate of the wavelength conversion element may be a plate of $LiNbO_3$ crystal or $LiTaO_3$ crystal with the three-dimensional waveguide formed by proton exchange, which may generate the second harmonic by the Cherenkov radiation.

In the wavelength conversion element, the second harmonic may be generated in the three-dimensional waveguide and modulated by selection of the branched waveguide.

In another aspect of the present invention, the optical modulation means is a transducer for generating a surface acoustic wave propagating in the direction of waveguide with a frequency f and a phase velocity v satisfying the following relation:

$$f = v\,\text{Nte-Ntm}/\lambda,$$

where $\lambda$ is a wavelength of fundamental wave laser beam, and Nte and Ntm effective refractive indices of the TE and the TM modes in said three-dimensional waveguide, respectively.

The phase matching is necessary upon generation of second harmonic between the fundamental wave and the second harmonic, which may be performed by special phase matching means or by selection of substrate.

For example, the second harmonic generation means has phase matching means of polarization inversion region formed with a period $\Lambda$ as defined below in the direction of waveguide:

$$\Lambda = 2(m-1)\pi/\{\beta(2\omega) - 2\beta(\omega)\},$$

where m is a natural number, $\beta(\omega)$ is a propagation constant of guided mode light for the fundamental wave laser beam, and $\beta(2\omega)$ a propagation constant of guided mode light for the second harmonic.

Also, the phase matching may be effected by birefringence of $LiNbO_3$ of substrate when the substrate is a c plate of $LiNbO_3$ with the three-dimensional waveguide being formed therein by diffusion, the propagation direction of light is the y-axis, the c axis is the z-axis perpendicular to the y-axis, an electric field of the fundamental wave is polarized in parallel with the x-axis, an electric field of the second harmonic is polarized in parallel with the z-axis, and the wavelength of the fundamental wave is not less than 1 $\mu$m.

If the periodic polarization inversion region is used as the phase matching means, the -c plate of $LiTaO_3$ or the c plate of $LiNbO_3$ may be used as the substrate. The three-dimensional waveguide is formed in the substrate by diffusion. The substrate of $LiNbO_3$ may be replaced by one of $LiNbO_3$ doped with MgO.

If the -c plate of $LiTaO_3$ is used, if the propagation direction of light is aligned with the y-direction, and if the -c axis is aligned with the z-direction perpendicular to the y-direction, a z-directionally polarized wave with the electric field in parallel with the z-axis may be used as the fundamental wave, and a z-directionally polarized wave with the electric field in parallel with the z-axis as the second harmonic. Also, if the propagation direction of light is aligned with the y-direction and the -c axis with the z-direction, an x-directionally polarized wave with the electric field in parallel with the x-axis may be used as the fundamental wave, and a z-directionally polarized wave with the electric field in parallel with the z-axis as the second harmonic.

If the c plate of LiNbO$_3$ is used, if a propagation direction of light is aligned with the y-direction, and if the c axis is aligned with the z-direction perpendicular to the y-direction, a z-directionally polarized wave with the electric field in parallel with the z-axis may be used as the fundamental wave, and a z-directionally polarized wave with the electric field in parallel with the z-axis as the second harmonic. Also, if the propagation direction of light is aligned with the y-direction and the c axis is aligned with the z-direction, an x-directionally polarized wave with the electric field in parallel with the x-axis may be used as the fundamental wave, and a z-directionally polarized wave with the electric field in parallel with the z-axis may be used as the second harmonic.

Further, if the three-dimensional waveguide is formed by proton exchange of c plate of LiNbO$_3$, the second harmonic may be generated by the Cherenkov radiation.

Furthermore, as in the wavelength conversion element, at least one three-dimensional waveguide for surface acoustic wave may be provided in parallel with the three-dimensional waveguide.

In such an arrangement, when the surface acoustic wave propagates in the direction of the guided light in the waveguide, a stress is generated in the waveguide by the surface acoustic wave, causing deformation of index ellipsoid. This produces off-diagonal components in the dielectric tensor to cause coupling of the TE and the TM modes. The second harmonic may be modulated by using the mode conversion due to the mode coupling.

In still another aspect of the present invention, a plurality of waveguides are formed, the fundamental wave is introduced into one of the plural waveguides, a variable potential difference is applied to an optical coupling region between the plural waveguides, and one of the plural waveguides is provided with a shorter wavelength harmonic generation portion for generating a shorter wavelength harmonic from the fundamental wave or with a shorter wavelength harmonic annihilation portion for annihilating the generated shorter wavelength harmonic.

The plural waveguides may be formed of nonlinear optical medium of LiTaO$_3$.

Also, the shorter wavelength harmonic generation portion may be constructed by a phase matching portion for matching phases of the fundamental wave and the shorter wavelength harmonic generated therefrom.

Further, the plural waveguides may be formed of nonlinear optical medium of LiNbO$_3$ or LiNbO$_3$ doped with MgO.

Furthermore, the shorter wavelength harmonic annihilation portion may be constructed by a cladding metal layer to absorb the shorter wavelength harmonic generated from the fundamental wave.

Furthermore, the plural-waveguides may be proton exchange waveguides, and one of the plural waveguides is provided with the shorter wavelength harmonic annihilation portion.

In case that the shorter wavelength harmonic cannot be efficiently produced when the fundamental wave reaches the optical coupling region, the shorter wavelength harmonic generation portion is formed on at least one of the plural waveguides. In this case, the fundamental wave propagating in the at least one of waveguides is transmitted into another waveguide adjacently disposed thereto when the potential difference is for example 37 0" in the optical coupling portion, while the fundamental wave continues propagating in the original waveguide when the potential difference is over a predetermined value. Accordingly, the shorter wavelength harmonic may be modulated by changing the potential difference when the shorter wavelength harmonic generation portion is formed on the output side of either the original waveguide or the another waveguide. In detail, for example, if the shorter wavelength harmonic generation portion is formed on the output side of the another waveguide, the fundamental wave is transmitted into the another waveguide when the potential difference is "0", and the shorter wavelength harmonic may be output from the shorter wavelength harmonic generation portion formed thereon. When the potential difference is over a predetermined value, no shorter wavelength harmonic is output because the fundamental wave is not transmitted. Therefore, on-off control of output of shorter wavelength harmonic may be carried out by changing the potential difference.

In case that the shorter wavelength harmonic can be efficiently produced when the fundamental wave reaches the optical coupling region, the shorter wavelength harmonic annihilation portion is formed on at least one of the plural waveguides. In this case, the shorter wavelength harmonic propagating in the at least one of waveguides is transmitted into another waveguide when the potential difference is for example "0" in the optical coupling portion, while the shorter wavelength harmonic propagates in the original waveguide when the potential difference is over a predetermined value. Accordingly, if the shorter wavelength harmonic annihilation portion is formed on the output side of either the original waveguide or the another waveguide, the shorter wavelength harmonic may be modulated by changing the potential difference in a theory opposite to the above case.

In still another aspect of the present invention, a plurality of waveguides of nonlinear optical medium are crossed on the substrate, potential difference application means is provided at the intersection to apply a potential difference for change of optical path of the fundamental wave guided through the waveguide, at least one of the plural waveguides is provided with a shorter wavelength harmonic generation portion for generating a shorter wavelength harmonic from the fundamental wave or with a shorter wavelength harmonic annihilation portion for annihilating the generated shorter wavelength harmonic.

Also, the plural waveguides may be formed of nonlinear optical medium of LiTaO$_3$.

Further, the shorter wavelength harmonic generation portion may be constituted by a phase matching portion for matching the phases of the fundamental wave and the shorter wavelength harmonic generated therefrom.

Furthermore, the plural waveguides may be formed of nonlinear optical medium of LiNbO$_3$ or LiNbO$_3$ doped with MgO.

Also, the phase matching may be effected by polarization inversion with a predetermined period, or by birefringence of nonlinear optical medium.

Further, the plural waveguides may be proton exchange waveguides.

The fundamental wave or the shorter wavelength harmonic propagating in at least one of the plural waveguides changes its path when reaching the intersection or cross portion in correspondence with the potential difference. The harmonic is transmitted into another waveguide crossing the at least one of waveguides for example if the potential difference is a predetermined value, while it continues propagating the original waveguide without being transmitted if the potential difference is "0". Accordingly, in case that a fundamental wave is guided into the intersection, the shorter wavelength harmonic may be modulated by changing the potential difference if a shorter wavelength harmonic generation portion is formed on the output side of the original waveguide or the another waveguide. That is, for example, if the shorter wavelength harmonic generation portion is formed on the output side of the another waveguide, the fundamental wave is transmitted into the another waveguide when the potential difference is the predetermined value to output the shorter wavelength harmonic from the shorter wavelength harmonic generation portion formed thereon. On the contrary, when the potential difference is "0", no shorter wavelength harmonic is output without transmission of the fundamental wave. Therefore, the change in potential difference results in on-off control of output of the shorter wavelength harmonic from the element.

In case that the shorter wavelength harmonic can be effectively produced when the fundamental wave reaches the intersection, the shorter wavelength harmonic annihilation portion is formed on at least one of the waveguides. In this case, the shorter wavelength harmonic propagating in the at least one of waveguides is transmitted into another waveguide when the potential difference in the intersection is a predetermined value, while it propagates in the original waveguide without transmission when the potential difference is "0".

Accordingly, if the shorter wavelength harmonic annihilation portion is formed on the output side of the original waveguide or the another waveguide, the shorter wavelength harmonic may be modulated by changing the potential difference in a theory opposite to that in the case of the shorter wavelength harmonic generation portion.

In a further aspect of the present invention, the waveguide is provided with an interference portion of plural separate arms, a variable potential difference is applied between the plural arms of the interference portion, the interference portion causes a phase difference corresponding to the variable potential difference between shorter wavelength harmonics generated from the fundamental wave and then propagating in the respective arms, and the interference portion makes the shorter wavelength harmonics different in phase coupled with each other to output therefrom.

Also, in a still further aspect of the present invention, the waveguide is provided with an interference portion of plural separate arms, a variable potential difference is applied between the plural arms of the interference portion, the interference portion causes a phase difference corresponding to the variable potential difference between fundamental waves propagating in the respective arms, and the interference portion makes the fundamental waves different in phase coupled with each other to produce the shorter wavelength harmonic based on the coupled fundamental waves in the interference portion to output therefrom.

The waveguide may be formed of nonlinear optical medium $LiTaO_3$.

Also, the shorter wavelength harmonic may be produced by a phase matching portion provided on the waveguide for matching phases of the fundamental wave and the shorter wavelength harmonic generated therefrom.

Further, the waveguide is formed of nonlinear optical medium of $LiNbO_3$, $LiNbO_3$ doped with MgO, or $KTiOPO_4$.

Further, the waveguide may be a proton exchange waveguide.

As one feature of the wavelength conversion element, a shorter wavelength harmonic is produced by inputting a fundamental wave into the waveguide, the produced shorter wavelength harmonic receives a variable potential difference during propagation in the plural arms of interference portion, and a phase difference is produced with correspondence to the variable potential difference in the arms. The shorter wavelength harmonics having the phase difference are coupled to output. In detail, when the potential difference is for example "0", the coupled harmonics have the maximum intensity when output because of no phase difference in the arms, whereas, when the potential difference is the predetermined value, the intensity of the mixed harmonics decreases due to the phase difference in the arms. Accordingly, the shorter wavelength harmonic may be modulated in intensity by changing the potential difference.

Also as a feature of the wavelength conversion element, a fundamental wave input into the waveguide receives a variable potential difference during the propagation in the plural arms of interference portion, a phase difference is produced with correspondence to the variable potential difference in the arms, the fundamental waves with the phase difference are coupled with each other, and a shorter wavelength harmonic is produced to output based on the coupled fundamental waves. That is, the shorter wavelength harmonic is produced based on the fundamental waves modulated in intensity with correspondence to the variable potential difference. Then the shorter wavelength harmonic may be modulated in intensity to output.

Further objects and advantages of the present invention will be apparent from the following description of the preferred embodiments of the invention as illustrated in the accompanying drawings.

DESCRIPTION OF THE PREFERRED EMBODIMENTS

Embodiments according to the present invention will now be explained with reference to the accompanying drawings.

Figure 1A:
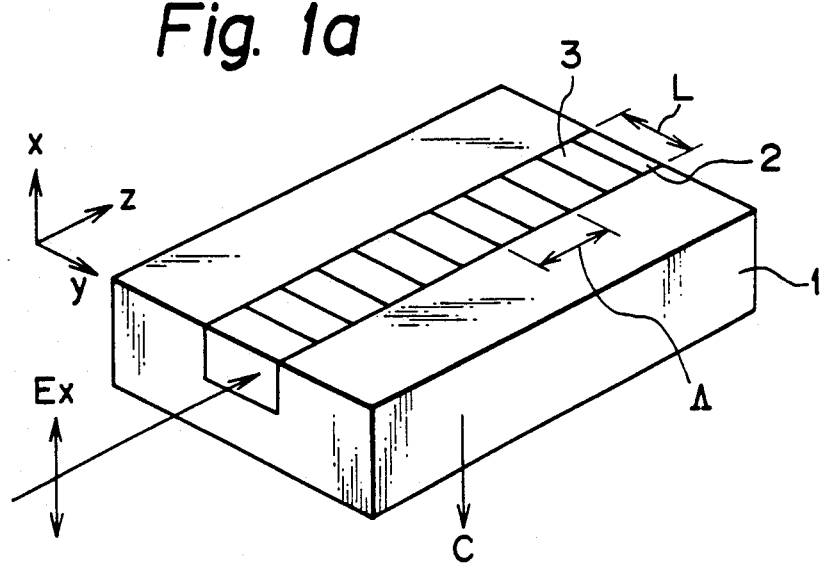
FIGS. 1A & 1B are schematic drawings to show an embodiment of a wavelength conversion element according to the present invention, FIG. 1A a perspective view, and FIG. 1B a sectional view.
Figure 1B:
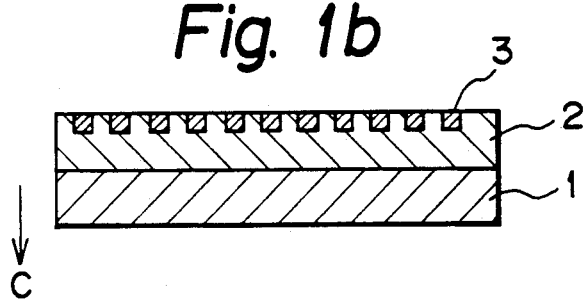

FIGS. 1A and 1B show an embodiment of a second harmonic generation (SHG) element according to the present invention. Reference numeral 1 denotes a single crystal substrate of nonlinear medium of LiTaO$_3$, and the orientation of the substrate is of -c plate. Numeral 2 denotes a three-dimensional waveguide formed in a layer of the single crystal substrate 1, and 3 a polarization inversion layer with a periodic change in effective refractive index of guided wave. Thus the SHG element of waveguide type of the present embodiment comprises the single crystal substrate 1, the three-dimensional waveguide 2 formed on the single crystal substrate 1 with the higher refractive index than the single crystal substrate 1, and the polarization inversion layer 3 presenting the periodic change in effective refractive index of the guided wave.

The polarization inversion layer 3 is formed in the direction of light propagation on the three-dimensional waveguide 2 with the following period Λ of the refractive index change for effective wavelength conversion:

$$\beta(2\omega) - 2\beta(\omega) = 2m\pi/\Lambda \qquad (1),$$

where m is a natural number, ω a frequency of fundamental wave in the three-dimensional waveguide 2, $\beta(\omega)$ a propagation constant of guided mode light for the fundamental wave, and $\beta(2\omega)$ a propagation constant of guided mode light for the second harmonic of the fundamental wave.

The waveguide layer 2 is a three-dimensional waveguide made by diffusion of Ti, Cu, or others at 1000° C. on a surface of the single crystal substrate 1 of LiTaO$_3$. Reference should be made to "Optical Integrated Circuit" written by Nishihara, Haruna, and Seihara, OHM Publisher, about the three-dimensional waveguide. The three-dimensional waveguide is preferably a single mode waveguide.

After the formation of the three-dimensional waveguide on the substrate, an electric field is applied in the direction of c axis of chip cut out at a temperature near the Curie point thereof to align the polarization direction by poling. Then the upper surface of the substrate 1 is masked by Ti except the cross-hatched portion as shown in FIG. 1A. The masked substrate is subject to proton exchange at a temperature of about 250° C. in a benzoic acid solution. After the proton exchange, the substrate is subject to a thermal treatment at a temperature right below the Curie point of LiTaO₃ (Tc approximately equal to 600° C.). The polarization inversion layer 3 is thus formed on the portion not masked. Alternatively, the three-dimensional waveguide may be formed after the formation of polarization inversion layer following the above steps (see the above reference (3)). If the metal for three-dimensional waveguide is one such as Rb, Cs, Ag, or the like, which can diffuse at about 300°-400° C., this alternative method should be taken as seen in J. D. Bierlein, A. Ferretti, and M. G. Roelofs "KTiPO₄ (KTP): a New Material for Optical Waveguide Applications" SPIE Vol. 994 Optoelectronic Material, Device, Packaging, and Interconnects. II (1988); and in J. L. Jackel "Optical waveguides in LiTaO₃: silver lithium ion exchange" APPLIED OPTICS, Vol. 19, No. 12 (1980). In the alternative method, the treatment temperature is lower than the Curie point of LiNbO₃ (Tc almost equal to 1000° C.). The thickness of polarization conversion layer 3 may be adjusted by changing a heating rate. It is not always necessary that the width L of the polarization inversion layer 3 is coincident with that of the waveguide layer 2.

Figure 2:
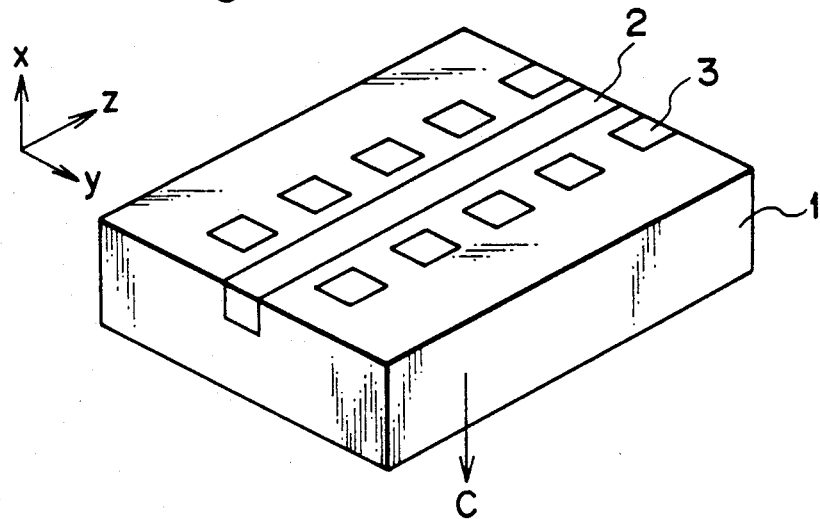
FIG. 2 is a perspective view to show another embodiment of a wavelength conversion element according to the present invention.

FIG. 2 shows another embodiment of the present invention. In this embodiment, the proton exchange for polarization inversion is effected on a portion of the substrate avoiding the three-dimensional waveguide 2. The polarization inversion, layer 3 is formed on the both sides of the waveguide 2. A distance between the two regions 2 and 3 must be shorter than that of light oozing. In FIG. 2, the polarization inversion region 3 includes two lines of inversion domains. A line of domains will do as the polarization inversion region 3. The same effect can be obtained in either case.

Figure 3:
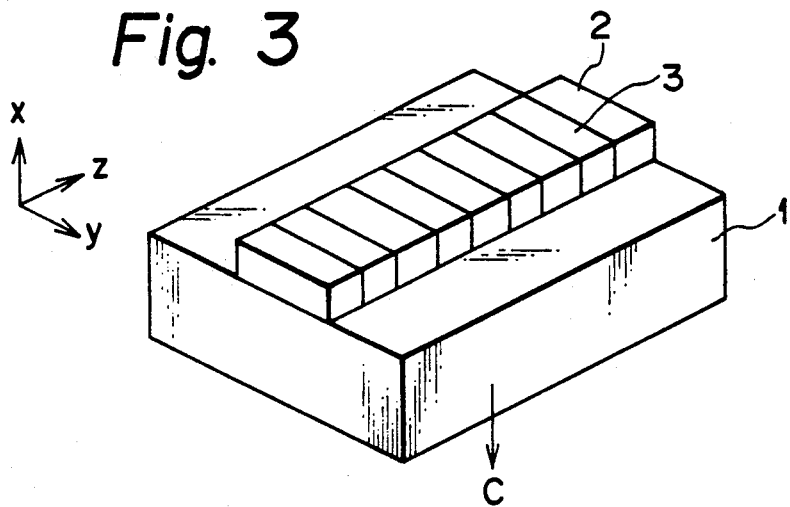
FIG. 3 is a perspective view to show a still another embodiment of a wavelength conversion element according to the present invention.

FIG. 3 shows still another embodiment of the present invention. In FIG. 3, numeral 1 is a single crystal substrate of LiTaO₃, and the orientation of the substrate is of -c plate. Numeral 2 is a ridge three-dimensional waveguide which is formed by etching after formation of polarization inversion layer 3 on the single crystal substrate layer 1. In this case, the waveguide may be formed with or without diffusion of metal.

The LiTaO₃ shows less photorefractive effect because it has a greater optical damage threshold level as compared to the LiNbO₃.

In the above embodiments, in which the waveguide layer 2 is of LiTaO₃ of nonlinear medium, wavelength dispersion in the three-dimensional waveguide is as follows for a light source of oscillation wavelength of 0.83 μm: Fundamental harmonic of wavelength of 0.83 μm; 2.1538 in $Ey_{00}$ mode corresponding to the ordinary wave, in which the electric field directs in the direction of y-axis, and 2.1578 in $Ex_{00}$ mode corresponding to the extraordinary wave, in which the electric field directs in the direction of x-axis: Second harmonic of wavelength of 0.415 μm; 2.2414 in the $Ey_{00}$ mode corresponding to the ordinary wave, and 2.2814 in the $Ex_{00}$ mode corresponding to the extraordinary wave.

If the light source is of oscillation wavelength of 1.2 μm, the wavelength dispersion of equivalent refractive index in the three-dimensional waveguide is as follows: Fundamental harmonic of wavelength of 1.2 μm; 2.1305 in the $Ey_{00}$ mode corresponding to the ordinary wave, and 2.1341 $Ex_{00}$ mode corresponding to the extraordinary wave: Second harmonic of wavelength of 0.6 μm; 2.1834 in the $Ey_{00}$ corresponding to the ordinary wave, and 2.1878 in the $Ex_{00}$ mode corresponding to the extraordinary wave.

Supposing the equivalent refractive index is n (ω) for a fundamental wave and n (2ω) for a second harmonic of the fundamental wave in the above three-dimensional waveguides, $$\beta(2\omega) - 2\beta(\omega) = 2m\pi/\Lambda \quad (2),$$

where m is a natural number.
Since $\beta = 2\pi n/\lambda$, $$n(2\omega) - n(\omega) = m\lambda/2\Lambda \quad (3).$$

The second harmonic generation can be effectively achieved with the period Λ μm of index change satisfying the above relation (3). If m=2, the period should be doubled to that of m=1.

The polarization inversion layer 3 formed on the upper surface of the waveguide 2 in the crystal substrate 1 serves as the second harmonic generation means, and provides a periodic structure of refractive index change with the period Λ satisfying the above relation (3). Also, a second harmonic may be generated by a periodic change in refractive index or by a periodic change in thickness of three-dimensional waveguide, similarly as by the polarization inversion layer 3.

In case that the fundamental wave of wavelength of 0.63 μm is in the $Ey_{00}$ mode corresponding to the ordinary wave and that the second harmonic thereof is in the $Ex_{00}$ mode corresponding to the extraordinary wave, the period of index change is about 3.3 μm for the above effective refractive index. The nonlinear constant d31 is used in this case. Also in case that the fundamental wave of 0.83 μm is in the $Ex_{00}$ mode corresponding to the extraordinary wave and the second harmonic thereof is in the $Ex_{00}$ mode corresponding to the extraordinary wave, the period of index change is about 3.4 μm. The nonlinear constant d33 is used in this case.

When the fundamental wave has the wavelength of 1.2 μm, the period of index change is as follows. In case that the fundamental wave is in the $Ey_{00}$ mode corresponding to the ordinary wave and the second harmonic thereof is in the $Ex_{00}$ mode corresponding to the extraordinary wave, the period of indices change is about 10.5 μm for the above effective refractive indices. The nonlinear constant d31 is used in this case. Also, in case that the fundamental wave is in the $Ex_{00}$ mode corresponding to the extraordinary wave and the second harmonic thereof is in the $Ex_{00}$ mode corresponding to the extraordinary wave, the period of index change is about 11.2 μm. The nonlinear constant d33 is used in this case.

Accordingly, the second harmonic generation element of waveguide type may be readily formed by providing the three-dimensional waveguide with a periodic structure with the period Λ of refractive index change satisfying the above relation (2) or (3) in the respective embodiments.

The above embodiments show the wavelength conversion elements the polarization inversion layer of which may be easily formed in a lower temperature.

The following embodiments relate to wavelength conversion elements which can execute both generation and modulation of second harmonic.

First explained are embodiments of wavelength conversion element which can execute on-off modulation of second harmonic.

Figure 4:
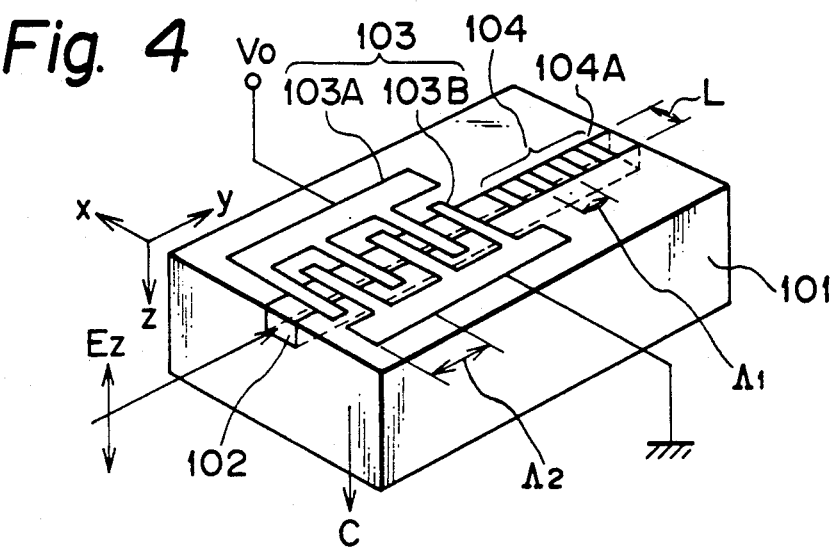
FIG. 4 is a drawing to illustrate a further embodiment of the present invention.

In FIG. 4, referential numeral 101 denotes a substrate of single crystal of LiTaO₃. The substrate 101 is a -c plate. Numeral 102 is a three-dimensional waveguide formed in the substrate 101, numeral 103 an electrode arrangement as optical modulation means, and 104 a polarization inversion region. If the coordinates are taken as x, y, and z as shown in FIG. 4, the -c axis of the substrate is in parallel with the z-direction, and the y-direction corresponds to a direction of light propagation in the three-dimensional waveguide 102. The three-dimensional waveguide 102 is formed by diffusion of Ti at a temperature of about 1000° C. on the substrate surface as in the preceding embodiments. The waveguide 102 thus has a higher refractive index than the substrate 101. The diffusion substance may be Cu or others instead of Ti. The three-dimensional waveguide is preferably a single mode waveguide. The polarization inversion region 104 is a region periodically inverted in polarizaion in the direction of light propagation or in the y-direction. The formation of polarization inversion region is similar to that in the preceding embodiments.

In detail, after the diffusion of diffusion substance into the substrate to obtain the three-dimensional waveguide, poling is effected to align the polarization direction by applying an electric field in the direction of c at the temperature near the Curie point.

Then a portion unhatched in FIG. 4 is masked by Ti, and proton exchange is effected at a temperature of about 250° C. in a benzoic acid solution. After the proton exchange, a thermal treatment is applied at a temperature right below the Curie point of $LiTaO_3$ ( Tc approximately equal to 600° C.), forming the polarization inversion layer 104A in the portion not masked. Then the polarization inversion region 104 is thus formed with the alternately inverted polarization in the y-direction. Such formation of the polarization inversion layer 104A is reported on 27-P-10 in Preview distributed at 1989 Spring Conference of Applied Physics of Japan.

Alternatively, the three-dimensional waveguide may be formed by ion diffusion of metal ion after formation of polarization inversion region by the above steps, or by proton exchange at about 250° C. followed by annealing at 380° C. Such methods are applicable for formation of three-dimensional waveguide by diffusion of metal such as Rb, Cs, Ag, or the like, which can diffuse at a temperature near 300°–400° C.

If a z plate of $KTiOPO_4$ is used as the substrate of nonlinear medium, the three-dimensional waveguide may be formed in a similar manner by the ion exchange using a fused salt of $RbNO_3/Ba(NO_3)_2$ as an ion source.

The thickness of the polarization inversion layer may be adjusted by changing a heating rate. It is not always necessary that the width L of the polarization inversion layer 104A is coincident with that of the three-dimensional waveguide 102.

The electrode arrangement 103 comprises a pair of comb electrodes 103A, 103B, which may be formed as follows. A buffer layer of silicon oxide layer is formed by the plasm CVD on the substrate on the surface of the three-dimensional waveguide 102. NiCr—Au is deposited as adhesive over the buffer layer. Then a thick film resist is formed in a pattern of electrodes as shown. Au is grown by the electroplating with a guide of the formed pattern. The resist is removed thereafter by a resist remover. Finally, etching is effected to remove the portion excluding the Au plating. The electrodes may alternatively be formed with Al, Ni, or the like in the lift-off, the photo-lithography, the electroplating, or other method. A period $\Lambda_1$ of periodic change in the polarization inversion region 104 is set as follows:

$$\Lambda_1 = 2(2m-1)\pi/\{\beta(2\omega) - 2\beta(\omega)\} \tag{4}$$

where m is a natural number, $\beta(\omega)$ a propagation constant of fundamental wave laser beam guided into the three-dimensional waveguide 102, and $\beta(2\omega)$ a propagation constant of second harmonic.

In the electrode arrangement 103, the comb electrode 103B is grounded and a voltage is applied to the comb electrode 103A to produce a periodic electric field in the direction of light propagation in the three-dimensional waveguide 102. A period $\Lambda_{j2}$ is set as follows between the comb electrodes to provide such an electric field:

$$\Lambda_2 = \lambda / \text{Nte-Ntm} \tag{5}$$

where Nte, Ntm are effective refractive indices of the TE and the TM modes, respectively, and $\lambda$ a wavelength of the fundamental wave laser beam.

As is well known, when an electric field is applied in the y-direction while the fundamental wave laser beam is guided in the three-dimensional waveguide 102, the major axis of index ellipsoid is rotated in the waveguide, producing off-diagonal components in the dielectric tensor, which causes coupling of the TE and the TM modes. This in turn causes mode conversion. In the mode conversion, mismatching of phase between the modes may be compensated for by the electric field with the period $\Lambda_2$ of the electrode arrangement 103.

Mismatching of phase between the fundamental wave and the second harmonic generated therefrom is compensated for by the polarization inversion region 104 alternately changing the polarization direction with the period $\Lambda_1$.

In the embodiment of FIG. 4, the substrate 101 is the -c plate of $LiTaO_3$.

Suppose the light source is a semiconductor laser of wavelength of 0.83 μm. The wavelength dispersion of equivalent refractive index in the three-dimensional waveguide 102 is as follows: For the fundamental wave of wavelength of 0.83 μm; 2.1538 in the $Ex_{00}$ mode corresponding to the ordinary wave, in which the electric field directs in the x-direction, and 2.1578 in the $Ez_{00}$ mode corresponding to the extraordinary wave, in which the electric field directs in the z-direction: For second harmonic of wavelength of 0.415 μm; 2.2414 in the $Ex_{00}$ mode corresponding to the ordinary wave, and 2.2814 in the $Ez_{00}$ mode corresponding to the extraordinary wave.

Also, suppose the light source is a semiconductor laser of wavelength of 1.2 μm. The wavelength dispersion of effective refractive index is as follows: For fundamental wave of wavelength of 1.2 μm; 2.1305 in the $Ex_{00}$ mode corresponding to the ordinary wave, and 2.1341 in the $Ez_{00}$ mode corresponding to the extraordinary wave: For second harmonic of wavelength of 0.6 μm; 2.1834 in the $Ex_{00}$ mode corresponding to the ordinary wave, and 2.1878 in the $Ez_{00}$ mode corresponding to the extraordinary wave.

When the effective refractive index is $N(\omega)$ for the fundamental wave and $N(2\omega)$ for the second harmonic, the following relation (6) is rewritten into a relation (7), using $\beta = 2\pi N/\pi$:

$$\Lambda_1 = 2(2m-1)\pi/\{\beta(2\omega) - 2\beta(\omega)\} \tag{6}$$

$$\Lambda_1 = 2(2m-1)\lambda/[2\{N(2\omega)-N(\omega)\}] \quad (7)$$

where m is a natural number. The phase matching may be well conducted by setting the period of polarization inversion in the polarization inversion region to satisfy the above relations, obtaining a stable second harmonic.

In case that the fundamental wave laser beam is of wavelength of 0.83 μm, that the fundamental wave is in the $Ex_{00}$ corresponding to the ordinary wave, and that the second harmonic is in the $Ez_{00}$ mode corresponding to the extraordinary wave, the period $\Lambda_1$ of index change is about 3.3 μm for the above effective refractive indices. The nonlinear constant $d_{31}$ is used in this case.

In case that the laser beam is of the wavelength of 0.83 μm, that the fundamental wave is in the $Ez_{00}$ mode corresponding to the extraordinary wave, and that the second harmonic is in the $Ez_{00}$ mode corresponding to the extraordinary wave, the period $\Lambda_1$ of index change is about 3.4 μm for the above effective refractive indices. The nonlinear constant $d_{33}$ is used in this case.

In case that the laser beam is of wavelength of 1.2 μm, that the fundamental wave is in the $Ex_{00}$ mode corresponding to the ordinary wave, and that the second harmonic is in the $Ez_{00}$ mode corresponding to the extraordinary wave, the period $\Lambda_1$ of index change is about 10.5 μm for the above effective refractive indices. The nonlinear constant $d_{31}$ is used in this case.

Also, in case that the laser beam is of wavelength of 1.2 μm that the fundamental wave is in the $Ez_{00}$ mode corresponding to the extraordinary wave, and that the second harmonic is in the $Ez_{00}$ mode corresponding to the extraordinary wave, the period $\Lambda_1$ of index change is about 11.2 μm for the above effective refractive indices. The nonlinear constant $d_{33}$ is used in this case.

If refractive indices are No and Ne for the ordinary wave and the extraordinary wave in the three-dimensional waveguide 102, respectively, and if Nte-Ntm ≈(No—Ne), the period $\Lambda_2$ of the electrode arrangement 103 is about 195 μm for the wavelength of 0.83 μm, and about 333 μm for the wavelength of 1.2 μm. The electrode arrangement 103 may be readily formed in such an order of period.

If the polarization inversion region 104 is formed such that the $Ex_{00}$ mode corresponding to the ordinary wave is used for fundamental wave and that the $Ez_{00}$ mode corresponding to the extraordinary wave for second harmonic, and then if a light of $Ex_{00}$ is input and the periodic electric field is applied by the electrode arrangement 103, the second harmonic is not generated because the $Ex_{00}$ mode is converted into the $Ez_{00}$ mode. However, the second harmonic is generated if the electric field is not applied.

Further, on the contrary, if the polarization inversion region 104 is formed such that the $Ex_{00}$ mode corresponding to the ordinary wave is used for fundamental wave and that the $Ez_{00}$ mode corresponding to the extraordinary wave for second harmonic, and then if a light of the $Ez_{00}$ mode is input and the periodic electric field is applied by the electrode arrangement 103, the second harmonic is generated because the $Ex_{00}$ mode is converted into the $Ez_{00}$ mode. However, the second harmonic is not generated if the electric field is not applied.

Accordingly, the second harmonic may be modulated by the on-off control of voltage applied to the comb electrodes 103A in either case.

Figure 5:
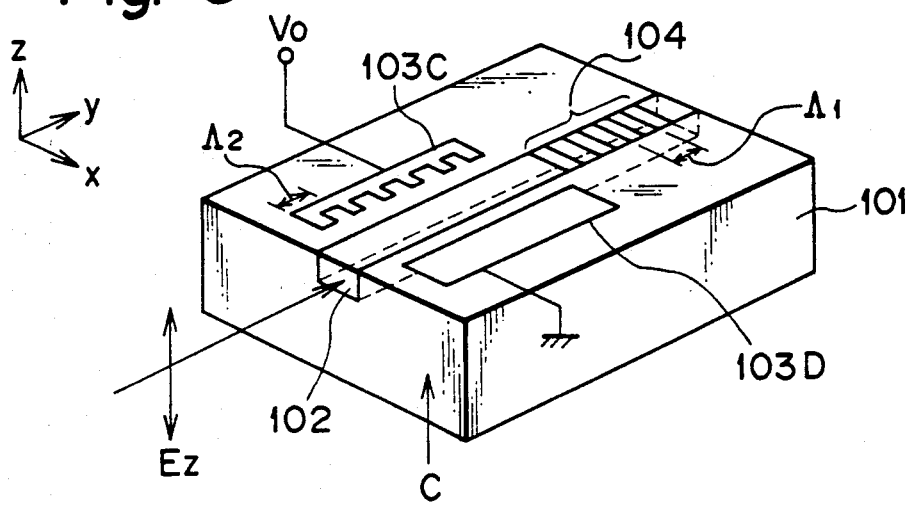
FIG. 5 is a drawing to illustrate a still further embodiment of the present invention.

FIG. 5 shows a modification of the embodiment as shown in FIG. 4. The same referential numerals as in FIG. 4 are used to avoid complexity if there seems no confusion caused. A difference from the embodiment as shown in FIG. 4 resides in a structure of the electrode arrangement. In detail, the electrode arrangement is provided along a three-dimensional waveguide 102, comprising a comb electrode 103C with a period $\Lambda_2$ and a rectangular electrode 103D provided to oppose the electrode 103C, on the both sides of the three-dimensional waveguide 102. Such an electrode arrangement may perform the same operation as in the embodiment of FIG. 4.

Figure 6:
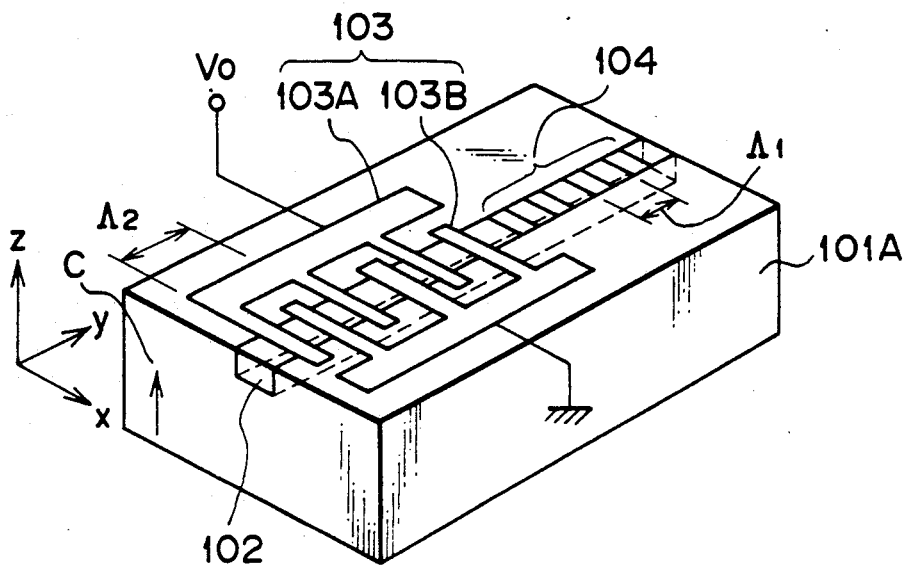
FIG. 6 is a drawing to illustrate a still further embodiment of the present invention.

FIG. 6 shows another embodiment of the wavelength conversion element according to the present invention. The same referential numerals as in the embodiment as shown in FIG. 4 are used if there seems no confusion caused. A substrate 101A is a c plate of $LiNbO_3$. The c axis is taken as the z-axis, and the x- and the y- axes as shown in FIG. 6.

If the light source is a semiconductor laser of wavelength of 0.83 μm, the wavelength dispersion of effective refractive index in the three-dimensional waveguide 102 is as follows: For the fundamental wave of wavelength of 0.83 μm; 2.22 in the $Ex_{00}$ mode corresponding to the ordinary wave, and 2.17 in the $Ez_{00}$ mode corresponding to the extraordinary wave: For second harmonic of wavelength of 0.415 μm; 2.39 in the $Ex_{00}$ mode corresponding to the ordinary wave, and 2.28 in the $Ez_{00}$ mode corresponding to the extraordinary wave.

In case that the fundamental wave laser beam is of wavelength of 0.83 μm, that the $Ex_{00}$ mode corresponding to the ordinary wave is used as the fundamental wave, and that the $Ez_{00}$ mode corresponding to the extraordinary wave is used as the second harmonic, the period $\Lambda_1$ of index change is about 6.9 μm for the above effective refractive indices. Also, in case that the $Ez_{00}$ mode corresponding to the extraordinary wave is used as the fundamental wave with the same wavelength and that the $Ez_{00}$ mode corresponding to the extraordinary wave is used as the second harmonic, the period $\Lambda_1$ of index change is about 3.8 μm. The period $\Lambda_2$ in the electrode arrangement 103 is about 16.6 μm for the wavelength of 0.83 μm. The electrode arrangement 103 may be readily formed in such an order of period.

Figure 7:
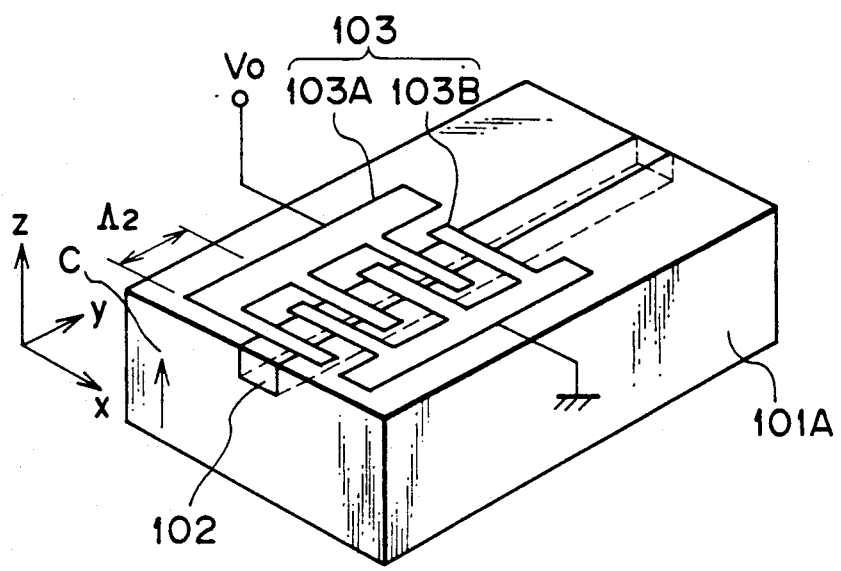
FIG. 7 is a drawing to illustrate a still further embodiment of the present invention.

The substrate 101A may be formed of $LiNbO_3$ crystal doped with MgO instead of the $LiNbO_3$ crystal. In case that the $LiNbO_3$ crystal or the $LiNbO_3$ crystal doped with MgO is used for the substrate 101A and that the $Ex_{00}$ mode corresponding to the ordinary wave and the $Ez_{00}$ mode corresponding to the extraordinary wave are used for the fundamental wave and the second harmonics, respectively, the phase matching may be effected by using the birefringence of substrate of nonlinear medium if the wavelength of fundamental wave is not less than 1 μm. In such case, the polarization inversion region 104 may be omitted for the phase matching between the fundamental wave and the second harmonics. FIG. 7 shows an embodiment of such a case. The embodiment of FIG. 7 is identical to that of FIG. 6 except that there is no polarization inversion region provided. When an input light is in the $Ex_{00}$ mode in the embodiments as shown in FIGS. 6 and 7, no second harmonic is generated if a voltage is applied to the electrode 103A, because the $Ex_{00}$ mode is converted into the $Ez_{00}$ mode. However, the second harmonic is generated if the voltage is not applied to the electrode 103A.

It is known that a stable second harmonic may be generated by the Cherenkov radiation when the three-dimensional waveguide is formed by proton exchange of the substrate 101A of $LiNbO_3$ (see P 1637 (49), Vol. 56, No. 12, Applied Physics, 1987). The polarization inversion region is unnecessary for the phase matching in this case.

Consequently, when the three-dimensional waveguide 102 is formed by proton exchange in the arrangement of FIG. 7, the second harmonic by the Cherenkov radiation may be modulated by on-off control of applied voltage to the electrode 103A.

As explained, either $LiTaO_3$ or $LiNbO_3$ is preferably used as the substrate in the embodiments of the present invention. Since the substrate of $LiTaO_3$ has a greater optical damage threshold level than that of $LiNbO_3$, the substrate of $LiTaO_3$ shows less of a photorefractive effect.

Below explained are further embodiments of wavelength conversion element according to the present invention. The same numerals as in FIGS. 4 to 7 will be used to avoid complexity if there seems no confusion caused.

Figure 8:
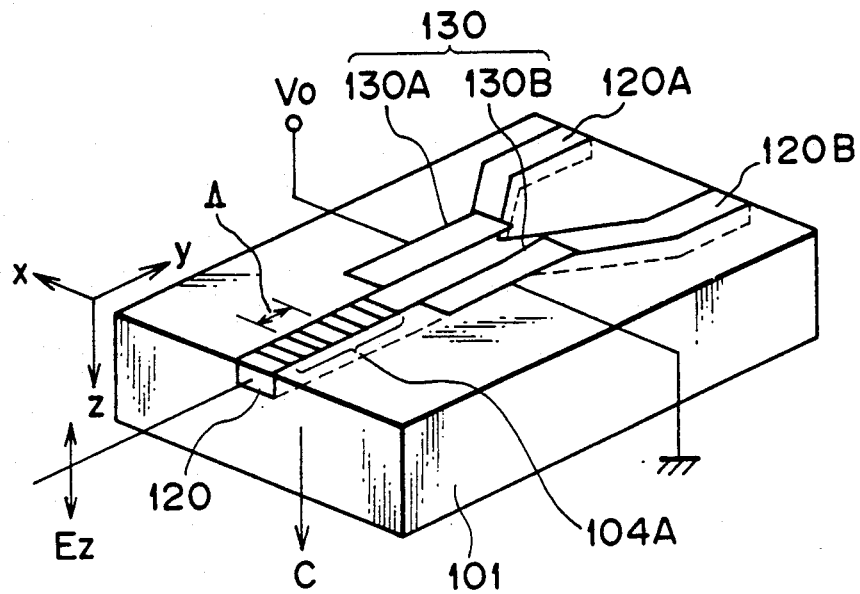
FIG. 8 is a drawing to illustrate a still further embodiment of the present invention.

In FIG. 8, referential numeral 104 denotes a substrate using the -c plate of $LiTaO_3$ as in the embodiment of FIG. 4. Numeral 120 denotes a three-dimensional waveguide. The three-dimensional waveguide 120 is of Y-shape, or divided into two branches on the output side, presenting two branch waveguides 120A, 120B. The three-dimensional waveguide 120 is preferably a single mode waveguide. Numeral 104A denotes a region of polarization inversion with a period $\Lambda$.

The period $\Lambda$ of polarization inversion is given in the polarization inversion region 104A by the following equation (8):

$$\Lambda = 2(2m-1)\pi/\{\beta(2\omega) - 2\beta(\omega)\} \quad (8),$$

where m is a natural number, $\beta(\omega)$ a propagation constant of guided mode light for the fundametal harmonic laser beam, and $\beta(2\omega)$ a propagation constant of guided mode light for the second harmonic.

Numeral 130 denotes a pair of electrodes. The pair of electrodes comprise electrodes 130A, 130B, which change a phase of guided light before a branch point of the three-dimensional waveguide 120 to select either of the branch waveguides 120A, 120B. The electrodes 130A, 130B are provided along the three-dimensional waveguide before the branch point, and cover a part of the branch waveguides 120A, 120B.

The three-dimensional waveguide 120 is formed in the same manner as the three-dimensional waveguide 102 in the embodiment of FIG. 4. Also, the polarization inversion region 104A and the paired electrodes 130 are formed in the same manner as the polarization inversion region 104 and the electrode arrangement 103 in the embodiment of FIG. 4, respectively.

It should be noted that the substrate 101 of -c plate $LiTaO_3$ may be replaced by $LiNbO_3$ crystal, $LiNbO_3$ crystal doped with MgO, or $KTiOPO_4$ substrate, forming therein the three-dimensional waveguide, the polarization inversion region, and the paired electrodes in the process explained in the embodiment of FIG. 4.

Suppose the electrode 130B is grounded and the electrode 130A is given a voltage of $V_0$ in the embodiment of FIG. 8. If the voltage $V_0$ is 0, a distribution of effective refractive index is uniform in the waveguide for the guided light, providing a symmetric electric field in the $Ez_{00}$ mode. If the voltage $V_0$ is not 0, the electrode 130A produces a high refractive index region in the three-dimensional waveguide 120 so that the guided wave is closed the high refractive index region to be drawn into the branched waveguide 120A and then to be output therefrom.

Then, if a polarized laser beam with an electric field directing in the z-direction is guided in the y-direction in the three-dimensional waveguide 120 as the fundamental wave as shown in FIG. 8, a phase-matched second harmonic is generated in the polarization inversion region 104A and is guided towards the branch point of the three-dimensional waveguide 120. If a voltage signal $V_0$ is applied to the electrode 130A as a modulation signal in this state, a modulated second harmonic is obtained from the branch waveguide 120A as explained above. On the contrary, if the modulation voltage signal is applied to the electrode 130B while the electrode 130A is grounded, a modulated second harmonic is obtained f tom the branch waveguide 120B.

If a branch angle is set within one degree between the two branch waveguides 120A and 120B of the three-dimensional waveguide 120, a scattering loss is within 1 dB in the branch point, preventing generation of higher mode. It is the same as in the embodiment of FIG. 4 that the substrate 101 of $LiTaO_3$ shows less of a photorefractive effect as compared to that of $LiNbO_3$.

Considering that the substrate is of -c plate of $LiTaO_3$ in the embodiment of FIG. 8 and that the light source is a fundamental wave laser beam of oscillation wavelength of 0.83 $\mu$m, a wavelength dispersion of equivalent refractive index is as follows in the three-dimensional waveguide 120: For fundamental wave; 2.1538 in the $Ex_{00}$ mode corresponding to the ordinary wave with the electric field directing in the x-axis, and 2.1578 in the $Ez_{00}$ mode corresponding to the extraordinary wave with the electric field directing in the z-axis: For second harmonic of wavelength of 0.415 $\mu$m; 2.2414 in the $Ex_{00}$ mode corresponding to the ordinary wave, and 2.2814 in the $Ez_{00}$ mode corresponding to the extraordinary wave.

Considering that the light source is a fundamental wave laser beam of oscillation wavelength of 1.2 $\mu$m, the wavelength dispersion of effective refractive index is as follows in the three-dimensional waveguide 120: For fundamental wave; 2.1305 in the $Ex_{00}$ mode corresponding to the ordinary wave, and 2.1341 in the $Ez_{00}$ mode corresponding to the extraordinary wave: For second harmonic of wavelength of 0.6 $\mu$m; 2.1834 in the $Ex_{00}$ mode corresponding to the ordinary wave, and 2.1878 in the $Ez_{00}$ mode corresponding to the extraordinary wave.

The above equation (8) may be rewritten as follows, using a relation of $\beta = 2\pi N/\lambda$:

$$\Lambda = (2m-1)\lambda/[2\{N(2\omega) - N(\omega)\}] \quad (9),$$

where m is a natural number. $N(\omega)$ and $N(2\omega)$ are effective refractive indices for fundamental wave and second harmonic, respectively, and $\lambda$ a wavelength in the three-dimensional waveguide 120. The second harmonic may be effectively generated using the period $j\Lambda$ of polarization inversion in the polarization inversion region 104A.

In case that the wavelength of fundamental wave is 0.83 μm and that the Ex$_{00}$ mode and the Ez$_{00}$ mode are used for the fundamental wave and for the second harmonic, respectively, the period Λ is 3.3 μm and the nonlinear constant d$_{31}$ is used. Further, in case that the wavelength of fundamental wave is 0.83 μm and that the mode of fundamental wave is the Ez$_{00}$ mode corresponding to the extraordinary wave and the mode of second harmonic is the Ez$_{00}$ mode corresponding to the. extraordinary wave, the period Λ is 3.4 μm. The nonlinear constant d$_{33}$ is used in this case.

In case that the wavelength of fundamental wave is 1.2 μm and that the Ex$_{00}$ mode and the Ez$_{00}$ mode are used for the fundamental wave and for the second harmonic, respectively, the period Λ is 10.5 μm and the nonlinear constant d$_{31}$ is used. Further, in case that the wavelength of fundamental wave is 1.2 μm and that the mode of fundamental wave is the Ez$_{00}$ mode corresponding to the extraordinary wave and the mode of second harmonic is the Ez$_{00}$ mode corresponding to the extraordinary wave, the period Λ is 11.2 μm. The nonlinear constant d$_{33}$ is used in this case.

Suppose the embodiment of FIG. 8 has the polarization inversion region 104A using the Ez$_{00}$ mode corresponding to the extraordinary wave both for the fundamental wave and the second harmonics. When a laser beam of Ez$_{00}$ mode is incident as the fundamental wave, a second harmonic is output from the branch waveguide 120A if a positive voltage is applied to the electrode 130A. If the polarity of applied voltage is inverted, the second harmonic is output from the branch waveguide 120B. In case that the mode of fundamental wave is the Ex$_{00}$ mode corresponding to the ordinary wave and the mode of second harmonic is the Ez$_{00}$ mode corresponding to the extraordinary wave, and that a positive voltage V$_0$ is applied to the electrode 130A, a second harmonic is output from the branched waveguide 120A. If the polarity of applied voltage V$_0$ is inverted, the second harmonic is output from the branched waveguide 120B.

Figure 9:
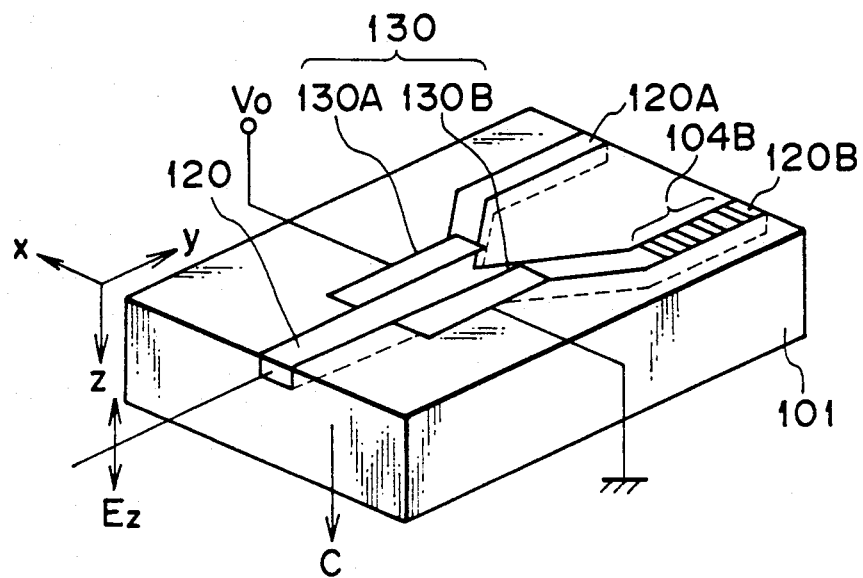
FIG. 9 is a drawing to illustrate a still further embodiment of the present invention.

The polarization inversion region 104B may be provided either on the branch waveguide 120B or 120A to generate the second harmonic as in the embodiment of FIG. 9 using the Ez$_{00}$ mode corresponding to the extraordinary wave as the mode of fundamental wave, so that a modulated second harmonic is obtained from either the branch waveguide 120B or 120A in response to the applied voltage V$_0$.

Figure 10:
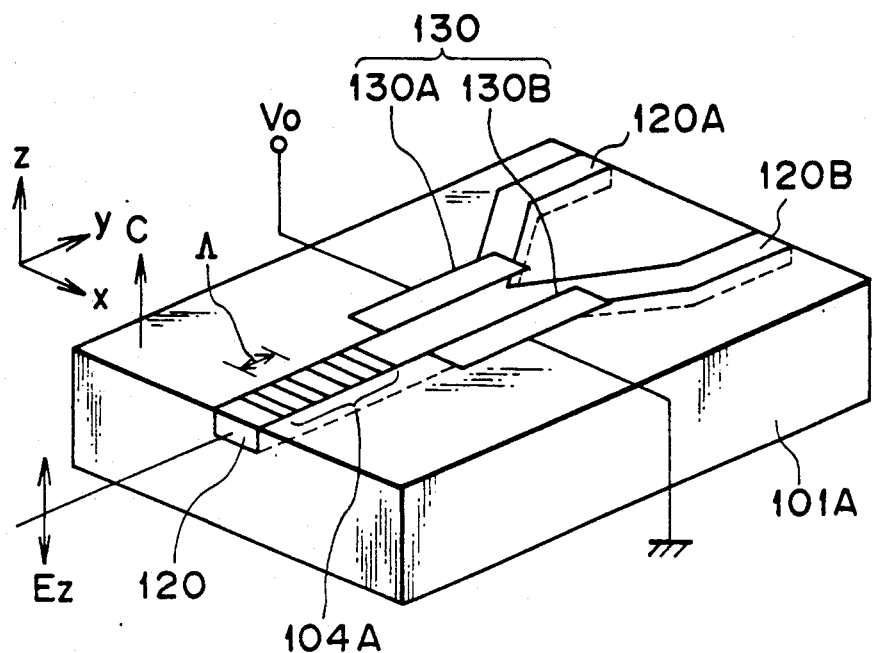
FIG. 10 is a drawing to illustrate a still further embodiment of the present invention.

In the embodiment as shown in FIG. 10, a substrate 101A is of c plate of LiNbO$_3$ as in the embodiment of FIG. 6. The z-axis is set along the c axis, and the x-, the y- axes as shown in FIG. 10. Supposing a light source of wavelength of 0.83 μm, the wavelength dispersion of effective refractive index is as follows in the three-dimensional waveguide 120: For fundamental wave of wavelength of 0.83 μm; 2.22 in the Ex$_{00}$ mode corresponding to the ordinary wave, and 2.17 in the Ez$_{00}$ mode corresponding to the extraordinary wave: For second harmonic of wavelength of 0.415 μm; 2.39 in the Ex$_{00}$ mode corresponding to the ordinary wave, and 2.28 in the Ez$_{00}$ mode corresponding to the extraordinary wave.

In case that the fundamental wave laser beam of wavelength of 0.83 μm and that the fundamental wave is in the Ex$_{00}$ mode corresponding to the ordinary wave and the second harmonic is in the Ez$_{00}$ mode corresponding to the extraordinary wave, the period Λ of polarization inversion is about 6.9 μm in the polarization inversion region. In case that the fundamental wave with the same wavelength is in the Ez$_{00}$ mode corresponding to the extraordinary wave and that the second harmonic is in the Ez$_{00}$ mode corresponding to the extraordinary wave, the period Λ is about 3.8 μm.

Figure 11:
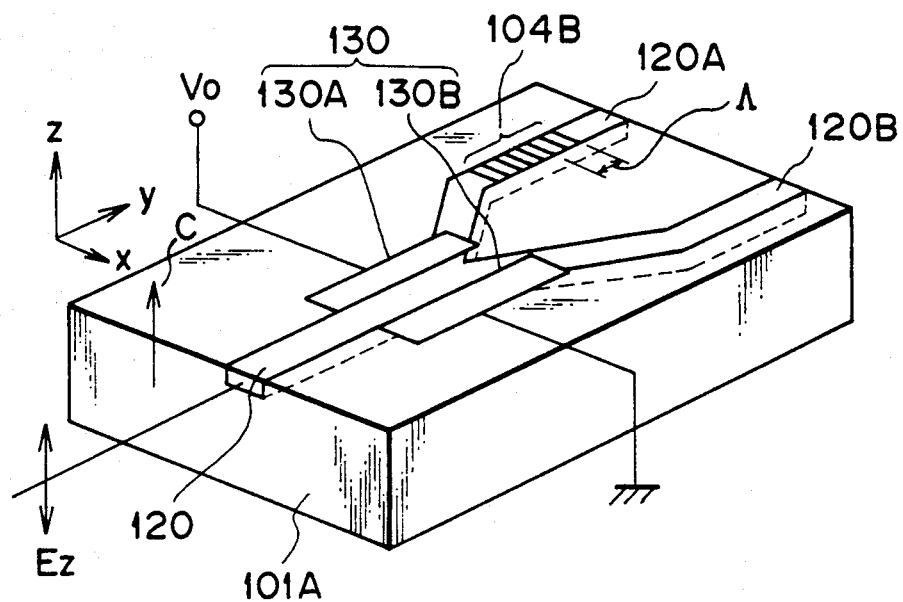
FIG. 11 is a drawing to illustrate a still further embodiment of the present invention.

As in the embodiment of FIG. 9, the polarization inversion region 104B may be provided either on the branch waveguide 120A or 120B of FIG. 10 as the second harmonic generation means as shown in FIG. 11.

Figure 12:
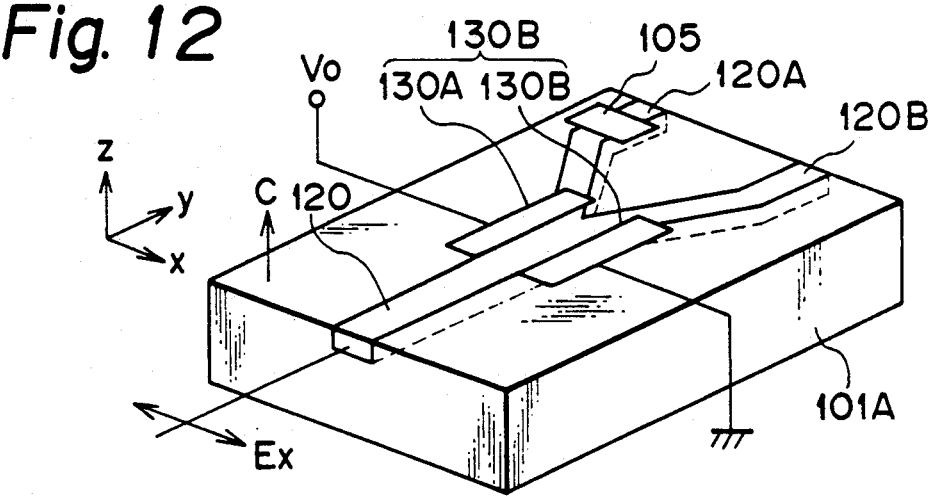
FIG. 12 is a drawing to illustrate a still further embodiment of the present invention.

The substrate of LiNbO$_3$ crystal may be replaced in the above embodiments by the LiNbO$_3$ crystal doped with MgO. As explained in the embodiment of FIG. 7, if LiNbO$_3$ crystal or LiNbO$_3$ crystal doped with MgO is used as the substrate 101A, then if the Ex$_{00}$ mode corresponding to the ordinary wave is used for the fundamental wave and the Ez$_{00}$ mode corresponding to the extraordinary wave for the second harmonic, and if a fundamental wave of Ex$_{00}$ mode is incident, a second harmonic of Ez$_{00}$ mode is generated as the extraordinary wave, not requiring the polarization inversion region as the second harmonic generation means. If the wavelength of fundamental wave is not less than 1 μm, the phase matching may be effected by using the birefringence of substrate of nonlinear medium. FIG. 12 shows an embodiment of such case.

In the embodiment of FIG. 12, if the incident light is in the Ex$_{00}$ mode, the second harmonic is in the Ez$_{00}$ mode. When a voltage V$_0$ is applied to an electrode 130A, a second harmonic is output from a branch waveguide 120A. If the polarity of applied voltage V$_0$ is inverted, the second harmonic is output from the a branch waveguide 120B. If a metal cladding 105 is provided on the surface of branch waveguide which does not output the second harmonic, the extinction ratio may be effectively increased.

Figure 13:
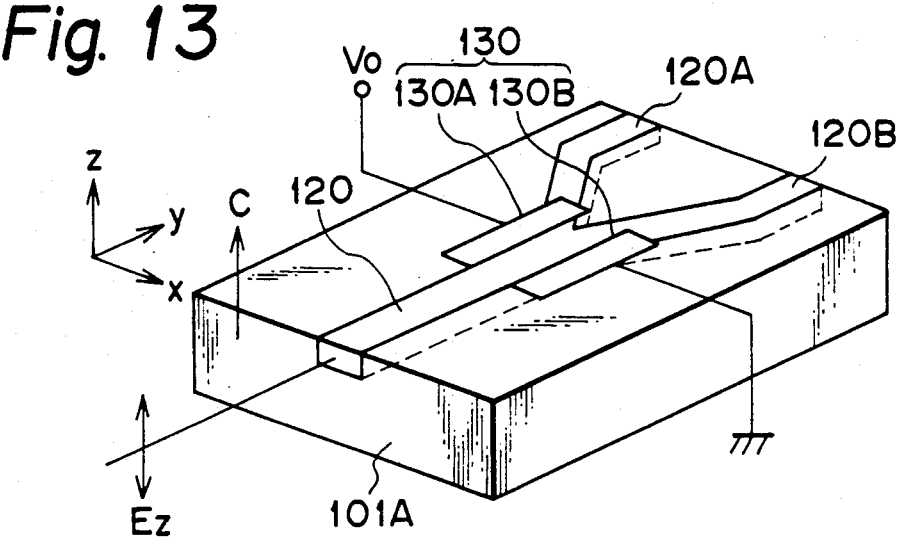
FIG. 13 is a drawing to illustrate a still further embodiment of the present invention.
Figure 14:
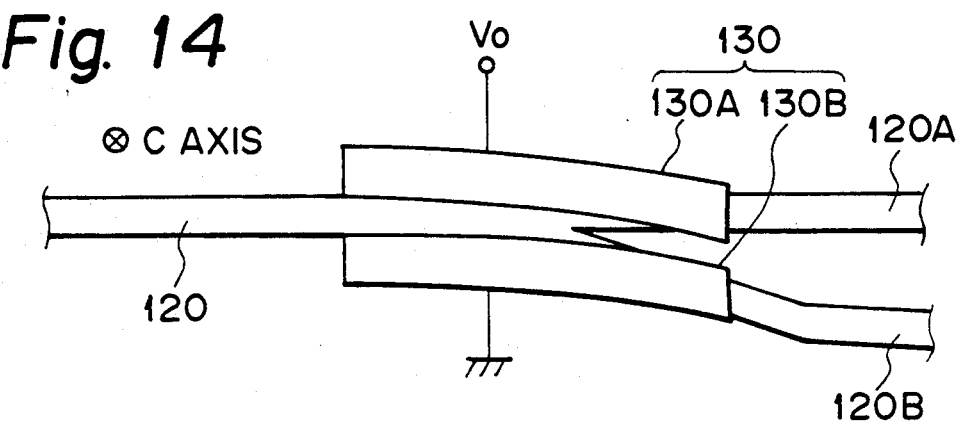
FIG. 14 is a drawing to show only a characteristic portion of a still further embodiment of the present invention.

Also, if the three-dimensional waveguide is formed by proton exchange of the substrate 101 of LiTaO$_3$ crystal or of the substrate 101A of LiNbO$_3$ crystal as shown in FIG. 13, a stable second harmonic may be generated by the Cherenkov radiation. Then the second harmonic by the Cherenkov radiation may be modulated by on-off control of applied voltage to the electrode 130A without the polarization inversion region as the second harmonic generation means. The modulated second harmonic may be taken out either of the branch waveguide 120A or 120B.

In the embodiments as shown in FIGS. 8 to 13, the three-dimensional waveguide 120 is branched symmetrically with respect to incidence of fundamental wave. However, the branches of three-dimensional waveguide 120 may be asymmetric with respect to the guided direction before the branch point, which can provide the same effect as in the embodiments of FIGS. 8 to 13.

The above embodiments show the wavelength conversion elements which can carry out the on-off modulation of second harmonic by the arrangements of electrodes and waveguide.

Next explained are embodiments of wavelength conversion element in which the on-off modulation of second harmonic may be effected by application of voltage with a predetermined frequency to electrodes.

Figure 15:
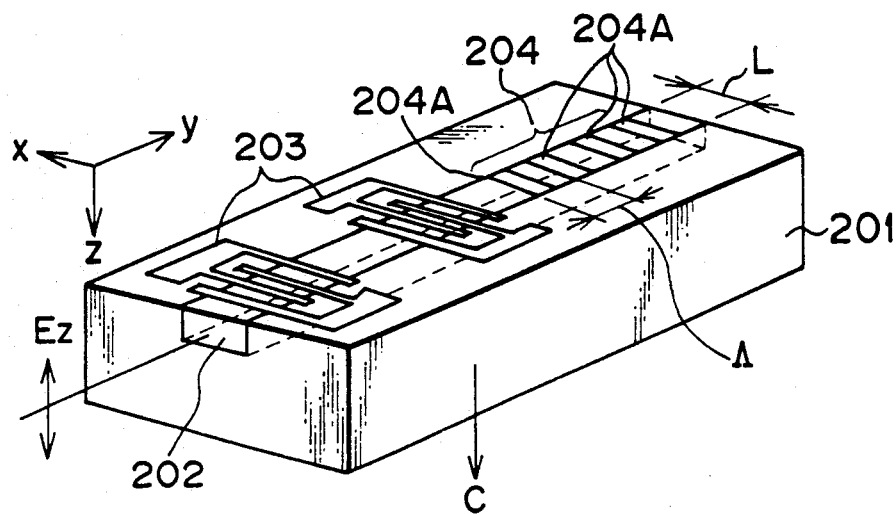
FIG. 15 is a drawing to illustrate a still further embodiment of the present invention.

In FIG. 15, referential numeral 201 denotes a substrate of single crystal of LiTaO$_3$. The substrate 201 is a -c plate. Numeral 202 is a three-dimensional waveguide formed in the substrate 201, numeral 203 an electrode arrangement of transducer as optical modulation means, and 204 a polarization inversion region. When the coordinates are set as x, y, z as shown in FIG. 15, the c axis of substrate 201 is in parallel with the z-direction and a direction of light propagation in the three-dimensional waveguide 202 corresponds to the y-direction.

The three-dimensional waveguide 202 is formed by diffusion of Ti into the substrate surface at about 1000° C. in the same manner as in the preceding embodiments. The three-dimensional waveguide 202 has a higher refractive index than the substrate 201. Cu may replace Ti as the diffusion substance. The three-dimensional waveguide 202 is preferably a single mode waveguide.

The polarization inversion region 204 periodically changes its polarization in the direction of light propagation or in the y-direction. The polarization inversion region 204 comprises alternate polarization inverted layers 204A and non-inverted layers, and is formed in the same manner as in the embodiment of FIG. 4. Details of formation of the polarization inversion region are omitted.

The electrode arrangement 203 of transducer comprises comb electrodes combined in mesh, similarly as in the embodiment of FIG. 4. The formation of the electrode arrangement is also the same as in the embodiment of FIG. 4, so that details thereof are omitted.

A period $\Lambda$ of periodic change of the polarization inversion region 204 is set as follows:

$$\Lambda = 2(2m-1)\pi/\{\beta(2\omega) - 2\beta(\omega)\} \tag{10}$$

where m is a natural number, $\beta(\omega)$ is a propagation constant of fundamental wave laser beam introduced into the three-dimensional waveguide 202, and $\beta(2\omega)$ a propagation constant of second harmonic. The coupling of the TE and the TM modes may be effectively conducted by such phase matching between the TE and the TM modes.

When one of the electrodes combined in mesh is grounded in the electrode arrangement 203 of transducer and a voltage is applied to the other electrode, a distortion is produced in the three-dimensional waveguide 202 in response to the applied voltage. When the allied voltage is vibrated with a frequency f, a surface acoustic wave is excited with the same frequency f in the three-dimensional waveguide 202, propagating in the direction of guided wave at a phase velocity v.

The propagation of surface acoustic wave may be tuned with that of guided light to cause mode conversion when the frequency f and the phase velocity satisfy the following relation:

$$f = v\, Nte\text{-}Ntm/\pi \tag{11}$$

where $\lambda$ is a wavelength of fundamental wave laser beam, and Nte, Ntm effective refractive indices of the TE and the TM modes, respectively.

A mismatching of phase between the fundamental wave laser beam and the second harmonic generated therefrom may be compensated for by the polarization inversion region 204, in which the polarization alternately changes with the period A.

The substrate 201 is the -c plate of $LiTaO_3$ in the embodiment of FIG. 15 as explained. Accordingly, supposing a light source is a semiconductor laser of wavelength of 0.83 $\mu$m, the wavelength dispersion of effective refractive index is as follows in the three-dimensional waveguide 202: For fundamental wave of wavelength of 0.83 $\mu$m; 2.1538 in the $Ex_{00}$ mode corresponding to the ordinary wave with the electric field directing in the x-direction, and 2.1578 in the $Ez_{00}$ mode corresponding to the extraordinary wave with the electric field directing in the z-direction: For second harmonic of wavelength of 0.415 $\mu$m; 2.2414 in the $Ex_{00}$ mode corresponding to the ordinary wave, and 2.2814 in the $Ez_{00}$ mode corresponding to the extraordinary wave.

Similarly, supposing the light source is a semiconductor laser of wavelength of 1.2 $\mu$m, the wavelength dispersion of the effective refractive index is as follows: For fundamental wave of wavelength of 1.2 $\mu$m; 2.1305 in the $Ex_{00}$ mode corresponding to the ordinary wave, and 2.1341 in the $Ez_{00}$ mode corresponding to the extraordinary wave: For second harmonic of wavelength of 0.6 $\mu$m; 2.1834 in the $Ex_{00}$ mode corresponding to the ordinary wave, and 2.1878 in the $Ez_{00}$ mode corresponding to the extraordinary wave.

When $N(\omega)$ and $N(2\omega)$ are effective refractive indices of three-dimensional waveguide 202 for fundamental wave and for second harmonic, respectively, the following relations are equivalent using a relation of $\beta = 2\pi N/\lambda$:

$$\Lambda = 2(2m-1)\pi/\{\beta(2\omega) - 2\beta(\omega)\} \tag{12}$$

and $$\Lambda = (2m-1)\lambda/2\{N(2\omega) - N(\omega)\} \tag{13}$$

where m is a natural number. A stable second harmonic may be obtained by proper phase matching with the period $\Lambda$ satisfying the above relations for the periodic change in the polarization inversion region 204.

In case that the wavelength of fundamental wave laser beam is 0.83 $\mu$m, that the $Ex_{00}$ mode corresponding to the ordinary wave is used for fundamental wave, and that the $Ez_{00}$ mode corresponding to the extraordinary wave is used for second harmonic, the period $\Lambda$ of polarization inversion is about 3.3 $\mu$m for the above effective refractive indices. The nonlinear constant $d_{31}$ is used in this case.

Similarly, in case that the wavelength of fundamental wave laser beam is 0.83 $\mu$m, that the $Ez_{00}$ mode corresponding to the extraordinary wave is used for fundamental wave, and that the $Ez_{00}$ mode corresponding to the extraordinary wave is used for second harmonic, the period $\Lambda$ of polarization inversion is about 3.4 $\mu$m for the above effective refractive indices. The nonlinear constant $d_{33}$ is used in this case.

In case that the wavelength of fundamental wave laser beam is 1.2 $\mu$m, that the $Ex_{00}$ mode corresponding to the ordinary wave is used for fundamental wave, and that the $Ez_{00}$ mode corresponding to the extraordinary wave is used for second harmonic, the period A of polarization inversion is about 10.5 $\mu$m for the above effective refractive indices. The nonlinear constant $d_{31}$ is used in this case.

In case that the wavelength of fundamental wave laser beam is 1.2 $\mu$m. that the $Ez_{00}$ mode corresponding to the extraordinary wave is used for fundamental wave, and that the $Ez_{00}$ mode corresponding to the extraordinary wave is used for second harmonic, the period $\Lambda$ of polarization inversion is about 11.2 $\mu$m for the above effective refractive indices. The nonlinear constant $d_{33}$ is used in this case.

When the substrate is made of $LiTaO_3$ of nonlinear medium as in the above embodiment, the phase velocity v of surface acoustic wave is $6.19 \times 10^3$ (m/sec). The frequency f of surface acoustic wave to cause the mode coupling is about 317 MHz for the wavelength of 0.83 μm, and about 186 MHz for the wavelength of 1.2 μm.

When the substrate is made of LiNbO$_3$ crystal, the phase velocity of surface acoustic wave is 6.57×10$^3$ (m/sec). The frequency f of surface acoustic wave to cause the mode coupling is about 4000 MHz for the wavelength of 0.83 μm.

Suppose the polarization inversion layer 204 is formed in the above embodiment such that the. Ex$_{00}$ mode corresponding to the ordinary wave is used for fundamental wave and that the Ez$_{00}$ mode corresponding to the extraordinary wave for second harmonic. Then, when a light of Ex$_{00}$ mode is incident and the oscillating electric field is applied with the above frequency f in the electrode arrangement 203 of transducer to produce the surface acoustic wave, no second harmonic is generated because the Ex$_{00}$ mode is converted into the Ez$_{00}$ mode. On the contrary, when the oscillating electric field is not applied, or, when the frequency of oscillating electric field is offset from the above frequency f, a second harmonic is generated.

Similarly, suppose the polarization inversion region 204 is formed such that the Ex$_{00}$ mode corresponding to the ordinary wave is used for the fundamental wave and the Ez$_{00}$ mode corresponding to the extraordinary wave for the second harmonic. Then, when a light of Ez$_{00}$ mode is incident and the oscillating electric field is applied with the above frequency f in the electrode arrangement 203, a second harmonic is generated by conversion of the Ex$_{00}$ mode into the Ez$_{00}$ mode. When the oscillating electric field is not applied, or, when the frequency of oscillating electric field is offset from the frequency f, no second harmonic is generated. Accordingly, the second harmonic may be modulated in either case by the on-off control of oscillation voltage to the electrode arrangement 203, or by switching the frequency of the oscillation voltage between the frequency f and a frequency off-f different therefrom.

Figure 16:
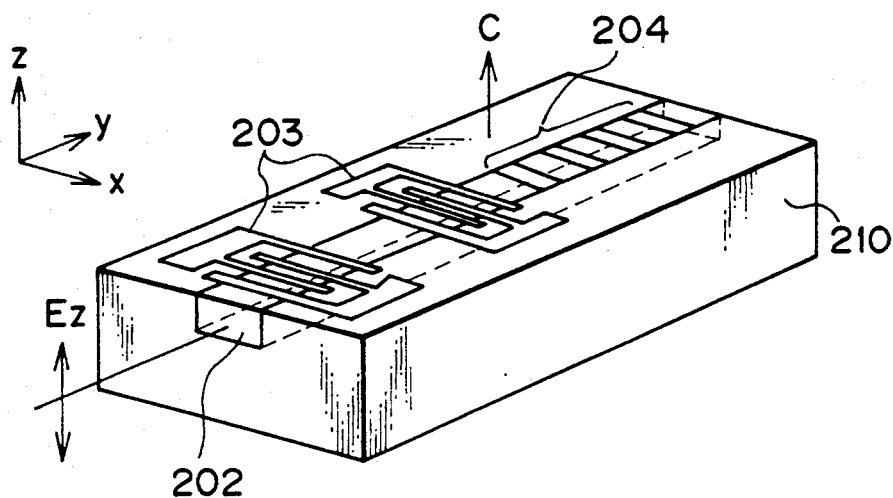
FIG. 16 is a drawing to illustrate a still further embodiment of the present invention.

FIG. 16 shows a modification of the embodiment as shown in FIG. 15. The same referential numerals as in FIG. 15 are used to avoid complexity if there seems no confusion caused.

A substrate 210 is a c plate of LiNbO$_3$ in this embodiment. The c axis is taken as the z-axis, and the x- and the y-directions as shown in FIG. 16.

Supposing a light source is a semiconductor laser of wavelength of 0.83 μm, the wavelength dispersion of equivalent refractive index is as follows in the three-dimensional waveguide 202: For fundamental wave of wavelength of 0.83 μm; 2.22 in the Ex$_{00}$ mode corresponding to the ordinary wave, and 2.17 in the Ez$_{00}$ mode corresponding to the extraordinary wave: For second harmonic of wavelength of 0.415 μm; 2.39 in the Ex$_{00}$ mode corresponding to the ordinary wave, and 2.28 in the Ez$_{00}$ mode corresponding to the extraordinary wave.

In case that the wavelength of fundamental wave laser beam is 0.83 μm, that the Ex$_{00}$ mode corresponding to the ordinary wave is used for fundamental wave, and that the Ez$_{00}$ mode corresponding to the extraordinary wave is used for second harmonic, the period Λ of polarization inversion is about 6.9 μm for the above effective refractive indices.

Similarly, in case that the Ez$_{00}$ mode corresponding to the extraordinary wave is used as the fundamental wave with the same wavelength and that the Ez$_{00}$ mode corresponding to the extraordinary wave is used for the second harmonic, the period Λ of index change is about 3.8 μm.

Then the formation of polarization inversion region is easy in either case of LiNbO$_3$ substrate and the LiTaO$_3$ substrate. Use of LiNbO$_3$ crystal doped with MgO instead of the LiNbO$_3$ crystal for the substrate leads to the same result as in the embodiment using the LiNbO$_3$ crystal.

Figure 17:
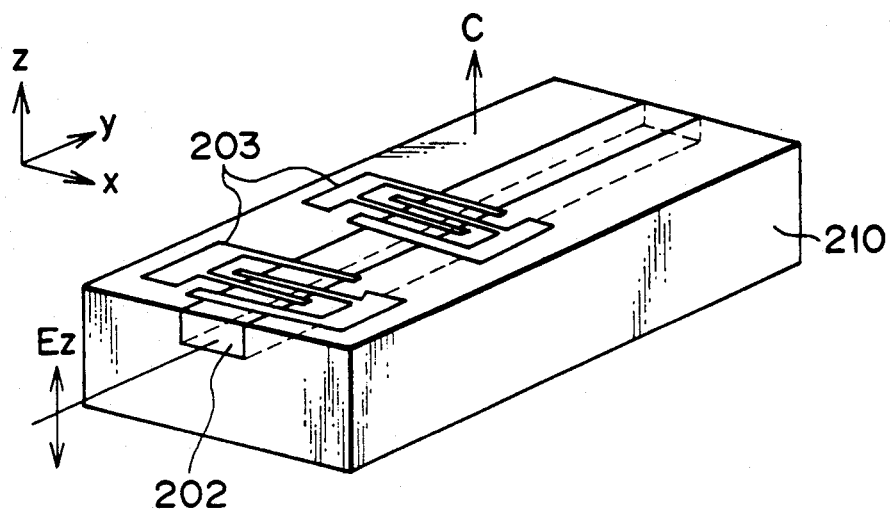
FIG. 17 is a drawing to illustrate a still further embodiment of the present invention.

In the embodiment of FIG. 16, when either the LiNbO$_3$ crystal or the LiNbO$_3$ crystal doped with MgO is used as the substrate 210 while using the Ex$_{00}$ mode corresponding to the ordinary wave for fundamental wave and the Ez$_{00}$ mode corresponding to the extraordinary wave for second harmonic, the phase matching may be effected by the birefringence of the substrate 210 of nonlinear medium if the wavelength of fundamental wave is not less than 1 μm. The polarization inversion region 204 may be omitted for the phase matching between the fundamental wave and the second harmonic in such a case accordingly. FIG. 17 shows an embodiment of a such case.

In the embodiment of FIG. 17, if a light of Ex$_{00}$ mode is incident, no second harmonic is generated when an oscillation voltage is applied with the frequency f in the electrode arrangement 203, because the Ex$_{00}$ mode is converted into the Ez$_{00}$ mode. However, when the oscillation voltage is stopped applying, or, when the frequency is offset from the frequency f, a second harmonic is generated.

As explained before, a stable second harmonic may be obtained by the Cherenkov radiation if the three-dimensional waveguide is formed by the proton exchange of the substrate 210 of LiNbO$_3$. The polarization inversion region is unnecessary for the phase matching in this case, either. If the three-dimensional waveguide 202 is formed by the proton exchange in the arrangement of FIG. 21, the second harmonic by the Cherenkov radiation may be modulated by the on-off control of application of oscillation voltage to the electrode arrangement 203 or by switching the oscillation voltage frequency between f and off-f.

Either the LiTaO$_3$ or the LiNbO$_3$ may be preferably used as the substrate in the embodiments of the present invention. Since the substrate of LiTaO$_3$ has a higher optical damage threshold level than that of LiNbO$_3$, the substrate of LiTaO$_3$ shows less of a photorefractive effect.

Figure 18:
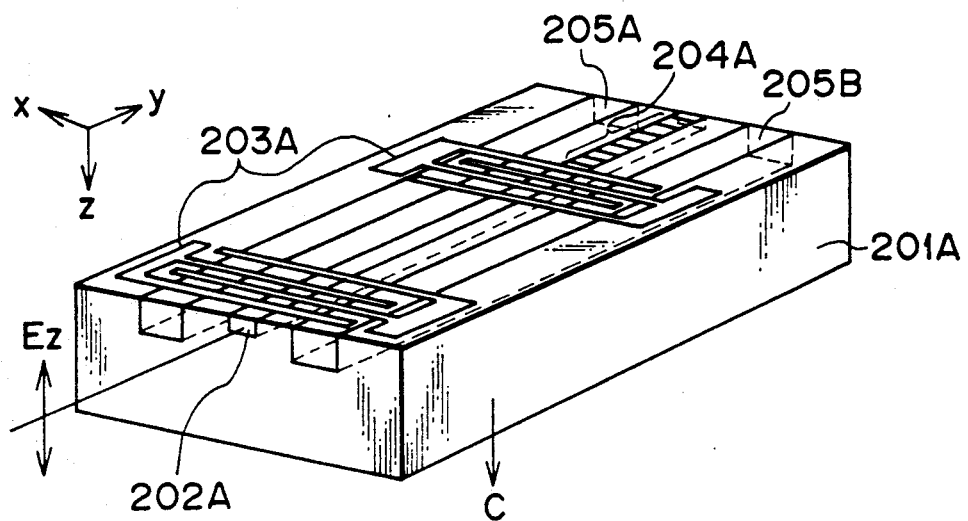
FIG. 18 is a drawing to illustrate a still further embodiment of the present invention.

FIG. 18 shows another embodiment of the wavelength conversion element according to the present invention. Reference numeral 201A denotes a substrate, for example, of -c plate of LiTaO$_3$. Numeral 202A denotes a three-dimensional waveguide, numeral 203A an electrode arrangement of transducer, and 204A a polarization inversion region. These are the same as in the preceding embodiments.

Numerals 205A, 205B denote three-dimensional waveguide elements formed in parallel with the three-dimensional waveguide 202A. The three-dimensional waveguide elements 205A, 205B are for surface acoustic wave, which guide respective surface acoustic waves oscillated by the transducer. By such an arrangement that the three-dimensional waveguide elements for surface acoustic wave are formed in parallel with the three-dimensional waveguide 202A, a propagation direction of surface acoustic wave may be well kept in parallel with the waveguide direction of three-dimensional waveguide to reduce a drive power of transducer. Such formation of three-dimensional waveguide elements for surface acoustic wave may be applied to the embodiment as shown in either of FIGS. 15 to 17.

It is readily understood in the above explanation that the transducer comprises the electrode arrangement and a drive circuit for applying the oscillation voltage thereto, which is not shown in the drawings.

Next explained are embodiments of wavelength conversion elements in which on-off modulation of second harmonic is effected by a combination of waveguide and electrodes.

Figure 19:
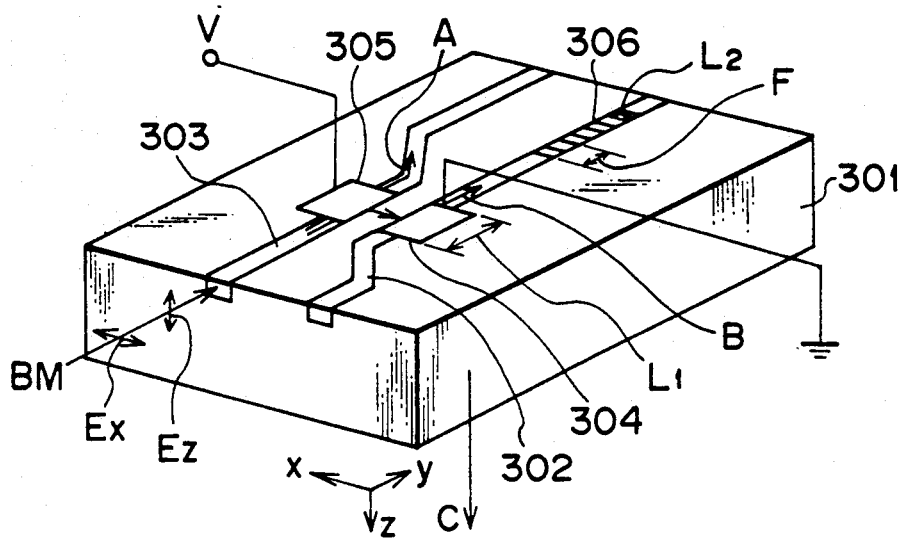
FIG. 19 is a drawing to illustrate a still further embodiment of the present invention.

FIG. 19 is a drawing to show such an embodiment of a wavelength conversion element according to the present invention. In the wavelength conversion element of FIG. 19, a substrate 301 is of LiTaO$_3$ of nonlinear optical crystal material, which is a single crystal with an orientation of -c plate. Waveguides 302, 303 are formed on the substrate 301. The waveguides 302, 303 have a higher refractive index than the substrate 301. The waveguides 302, 303 approach each other in a part thereof to form a coupling region. There are electrodes 304, 305 provided on the waveguides 302, 303, respectively, to supply a variable potential difference to the coupling region of waveguides 302, 303.

For example, the electrode 304 on the waveguide 302 is kept in the ground potential and the electrode 305 on the waveguide 303 is given a variable voltage V. The variable potential difference V between the electrodes 305 and 304 variably controls a ratio of fundamental wave BM, which is incident into the waveguide 303 and propagating along an arrow A therein, to a fundamental wave, which is transmitted into the waveguide 302 and propagating along an arrow B therein.

In more detail, when the two waveguides 302, 303 are coincident with each other in shape and refractive index, a harmonic is not transmitted from one to the other, i.e., from the waveguide 303 to the waveguide 302, in the coupling region if the potential difference V is over a predetermined value. If the potential difference V is "0", 100% transmission of guided light occurs from the one waveguide 303 to the other waveguide 302 by the evanescent coupling. A length necessary for the transmission is called as a complete coupling length 1, which is given by the following equation (14).

$$l = \pi/2\kappa = \pi/(\beta_e \beta_o) \quad (14),$$

where $\kappa$ is a coupling constant, and $\beta_e$, $\beta_o$ propagation constants of even mode and odd mode in the coupling waveguides, respectively. In order to prevent the guided wave having been transmitted from the waveguide 303 to the waveguide 302 from returning to the waveguide 303, a length L1 of electrodes 304, 305 must be so set in the light propagation direction as to satisfy the following equation (15).

$$L1 = (2m-1) l \quad (15),$$

where m is a positive integer and l the complete coupling length.

Figure 26:
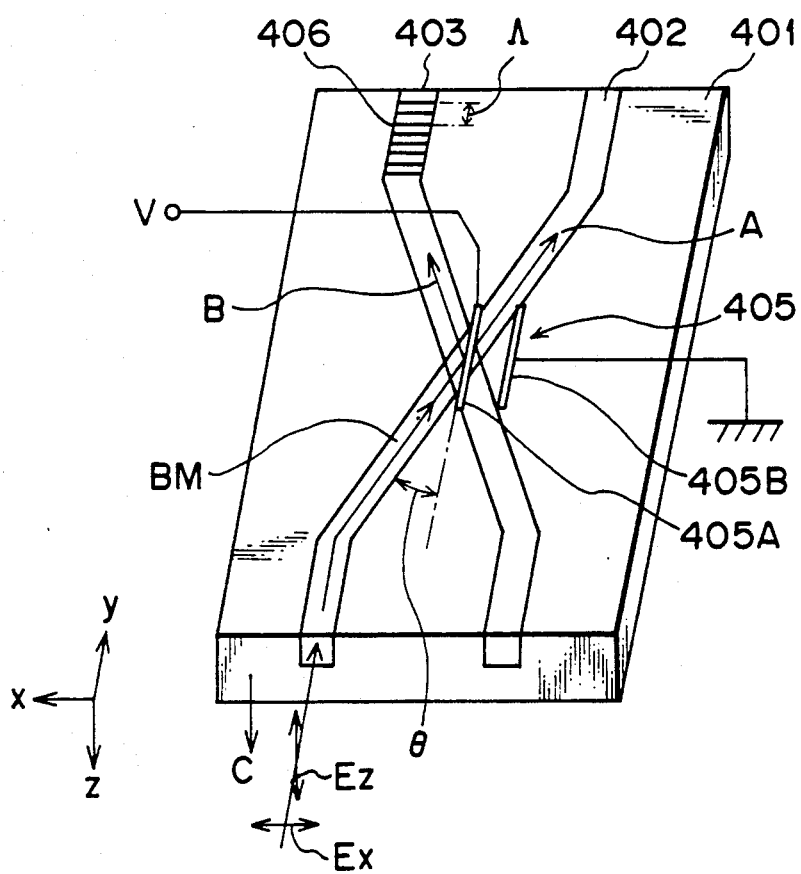
FIG. 26 is a drawing to show a still further embodiment of a wavelength conversion element according to the present invention.

A phase matching portion 306 is provided on the waveguide 302 to effectively convert the fundamental wave in the waveguide 302 into a shorter wavelength harmonic, for example, into a second harmonic. In the embodiment of FIG. 26, the phase matching portion 306 comprises a polarizaion inversion layer formed by the proton exchange followed by a thermal treatment, to provide a periodic change of the polarization inversion region. A period F of polarization change must satisfy the following relation (16) to effect phase matching between the fundamental wave and the second harmonic:

$$\beta(2\omega) - 2\beta(\omega) = 2\pi(2m-1)/F \quad (16),$$

where m is a natural number, $\omega$, $2\omega$ frequencies of fundamental wave and second harmonic in the waveguide 302, and $\beta(\omega)$, $\beta(2\omega)$ propagation constants of fundamental wave and second harmonic in the waveguide 302, respectively.

When N ($\omega$), N ($2\omega$) are effective refractive indices for the fundamental wave and the second harmonic in the waveguide 302, respectively, the above equation (16) may be transformed into the following equation (17), using a relation, $\beta = 2\pi N/\lambda$, between the equivalent refractive index N and the propagation constant $\beta$.

$$F = (2m-1)\lambda/2\{N(2\omega) - N(\omega)\} \quad (17),$$

where m is a natural number.

Since the refractive index change of period F satisfying the above equation (17) leads to effective conversion into the second harmonic, the polarization inversion layer 306 is suitable if it comprises polarization domains formed with a pitch of period F.

For example, if the fundamental wave is wavelength $\lambda$ of 0.83 $\mu$m and is in the Ex$_{00}$ mode (the ordinary wave) with the electric field thereof directing in the x-axis, the wavelength dispersion of equivalent refractive index is 2.1538 for the fundamental wave in the waveguide 302 of LiTaO$_3$. A second harmonic of wavelength $\pi/2$ of 0.415 $\mu$m is generated in the Ez$_{00}$ mode by the nonlinear constant d$_{31}$ of nonlinear optical crystal material based on the fundamental wave to have the wavelength dispersion of equivalent refractive index of 2.2814. Then the period F of index change is about 3.3 $\mu$m in this case by the equation (17). Therefore, if the polarization domains of polarization inversion layer 306 are formed at a pitch of about 3.3 $\mu$m, the fundamental wave and the second harmonic are matched in phase with each other in the polarization inversion layer 306.

Similarly, for example, if the fundamental wave is of wavelength $\lambda$ of 0.83 $\mu$m and is in the Ez$_{00}$ mode (the extraordinary wave) with the electric field thereof directing in the z-axis, the wavelength dispersion of equivalent refractive index is 2.1578 for the fundamental wave in the waveguide 302 of LiTaO$_3$. Also, a second harmonic of wavelength $\lambda/2$ of 0.415 $\mu$m is generated in the Ez$_{00}$ mode by the nonlinear constant d$_{33}$ of nonlinear optical crystal material based on the fundamental wave to have the wavelength dispersion of equivalent refractive index of 2.2814 in the waveguide 302. Then the period F of polarization inversion is about 3.4 $\mu$m in this case by the equation (17). Therefore, if the polarization domains of polarization inversion layer 306 are formed at a pitch of about 3.4 $\mu$m, the fundamental wave and the second harmonic may be matched in phase with each other in the polarization inversion layer 306.

Further, for example, if the fundamental wave is of wavelength $\lambda$ of 1.2 $\mu$m and is in the Ex$_{00}$ mode (the ordinary wave) with the electric field thereof directing in the x-axis, the wavelength dispersion of equivalent refractive index is 2.1305 for the fundamental wave in the waveguide 302 of LiTaO$_3$. Also, a second harmonic of wavelength $\lambda/2$ of 0.6 $\mu$m is generated in the Ez$_{00}$ mode by the nonlinear constant d$_{31}$ of nonlinear optical crystal material based on the fundamental wave to have the wavelength dispersion of equivalent refractive index of 2.1878 in the waveguide 302. Then the period F of polarization inversion is about 10.5 μm in this case by the equation (17). Therefore, if the polarization domains of polarization inversion layer 306 are formed at a pitch of about 10.5 μm, the fundamental wave and the second harmonic may be matched in phase with each other in the polarization inversion layer 306.

Furthermore, for example, if the fundamental wave is of wavelength λ of 1.2 μm and is in the $Ez_{00}$ mode (the extraordinary wave) with the electric field thereof directing in the z-axis, the wavelength dispersion of equivalent refractive index is 2.1341 for the fundamental wave in the waveguide 302 of $LiTaO_3$. Also, a second harmonic of wavelength λ/2 of 0.6 μm is generated in the $Ez_{00}$ mode by the nonlinear constant $d_{33}$ of nonlinear optical crystal material based on the fundamental wave, to have the wavelength dispersion of equivalent refractive index of 2.1878 in the waveguide 302. Then the period F of polarization inversion is about 11.2 μm in this case by the equation (17). Therefore, if the polarization domains of polarization layer 306 are formed at a pitch of about 11.2 μm, the fundamental wave and the second harmonic may be matched in phase with each other in the polarization inversion layer 306.

The wavelength conversion element of FIG. 19 may be formed in the same manner as in the embodiment as shown in FIG. 4. In detail, the waveguides 302, 303 are formed by diffusion of Ti, Cu or the like into a surface of the substrate 301 of nonlinear optical crystal material of $LiTaO_3$ at a temperature of about 1000° C. The waveguides 302, 303 are preferably formed in a single mode. An electric field is applied at a temperature near the Curie point in the direction of c axis of chip cut out, to align the polarization direction by poling. Then a mask is given over the upper surface of the substrate 301 except the hatched portion in FIG. 19. The masked substrate is subject to the proton exchange at a temperature of about 250° C. in a benzoic acid solution. After the proton exchange, the substrate is subject to a thermal treatment at a temperature right below the Curie point of $LiTaO_3$ (Tc approximately equal to 600° C.), forming the phase matching portion or polarization inversion layer 306 in the portion not masked. The thickness of polarization inversion layer 306 may be adjusted by changing a heating rate. It is not always necessary that the width $L_2$ of polarization inversion layer 306 is coincident with that of the waveguide 302.

The electrodes 304, 305 are formed in the same manner as those in the embodiment as shown in FIG. 4. Therefore, detailed explanation will be omitted.

Explained in the following is an operation of the wavelength conversion element thus formed as in FIG. 19. A fundamental wave BM is incident into the waveguide 303 and propagates up to a position of electrode 305 or to the coupling region in the waveguide 303. If a voltage V of predetermined value, for example, of about 3 V, is applied to the electrode 305, a difference Δβ is caused in propagation constant between the fundamental waves propagating the two waveguides 302, 303. The phase mismatch Δβ does not allow the fundamental wave to be transmitted from the waveguide 303 to the waveguide 302. That is, the fundamental wave propagating into the coupling region of the waveguide 303 continues propagating in the same waveguide 303 as shown by the arrow A in FIG. 19 to be output from the waveguide 303. A second harmonic is generated during the propagation of fundamental wave in the waveguide 303 based on the fundamental wave propagating there in. However, since the phase matching is not effected between the fundamental wave and the second harmonic in the waveguide 303, the conversion efficiency into the second harmonic is extremely low, which results in substantial output of fundamental wave without second harmonic from the waveguide 303. Further, since the fundamental wave is not transmitted into the waveguide 302, no second harmonic is output from the waveguide 302.

As the voltage V to the electrode 305 decreases, the propagation constant difference Δβ of fundamental waves propagating in the two waveguides 302, 303 also decreases to allow the fundamental wave to transfer from the waveguide 303 to the waveguide 302. When the voltage V to the electrode 305 is "0", the propagation constant difference Δβ becomes "0", so that the fundamental wave propagated up to the electrode 305 of the waveguide 303 may be transmitted into the waveguide 302 as shown by an arrow B in FIG. 19 in the coupling region. The fundamental wave transmitted into the waveguide 302 propagates in the waveguide 302 to substantially produce a second harmonic in the phase matching portion or polarization inversion layer 306. That is, the phase is matched between the fundamental wave and the second harmonic generated therefrom in the polarization inversion layer 306, so that the fundamental wave is effectively converted into the second harmonic. Then the second harmonic is output from the waveguide 302.

As explained in the embodiment as shown in FIG. 19, the transmission of fundamental wave is controlled from the waveguide 303 to the waveguide 302 by changing the voltage V to the electrode 305, which can substantially modulate the second harmonic. In other words, the on-off control of voltage V results in the on-off control of second harmonic output.

For example, if the wavelength λ is 0.83 μm and if a fundamental wave of $Ex_{00}$ mode is incident into the waveguide 303 to obtain a second harmonic of $Ez_{00}$ mode from the waveguide 302, the polarization domains of polarization inversion layer 306 are formed at a pitch F of about 3.3 μm as explained above. Similarly, if the wavelength λ is 0.83 μm and if a fundamental wave of $Ez_{00}$ mode is incident into the waveguide 303 to obtain a second harmonic of $Ez_{00}$ mode from the waveguide 302, the polarization domains of polarization inversion layer 306 are formed at a pitch F of about 3.4 μm.

Figure 20:
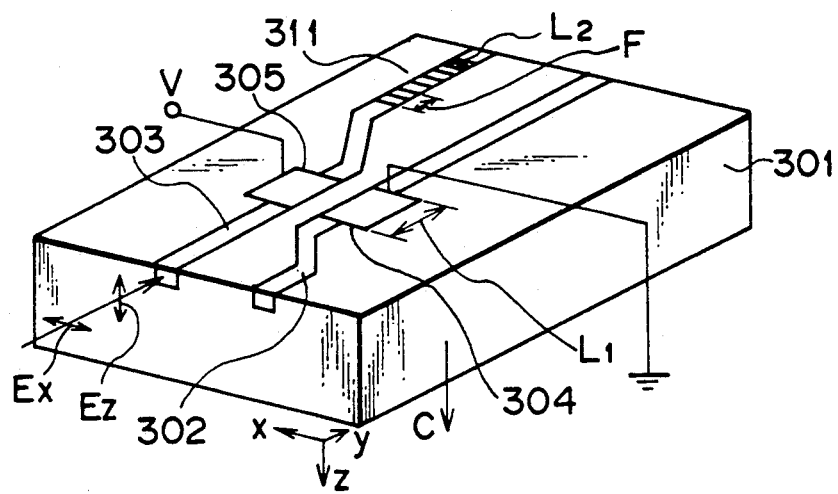
FIG. 20 is a drawing to show a modification of the wavelength conversion element as shown in FIG. 19.
Figure 21:
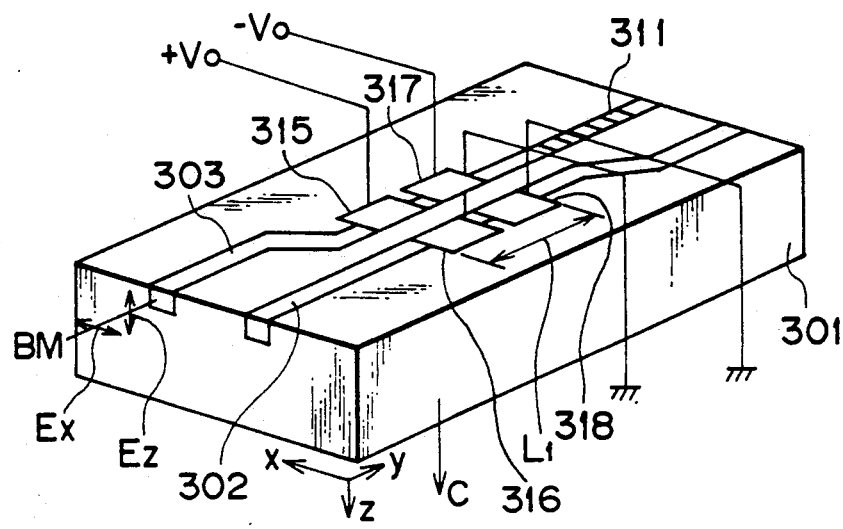
FIG. 21 is a drawing to show another modification of the wavelength conversion element as shown in FIG. 19.
Figure 22:
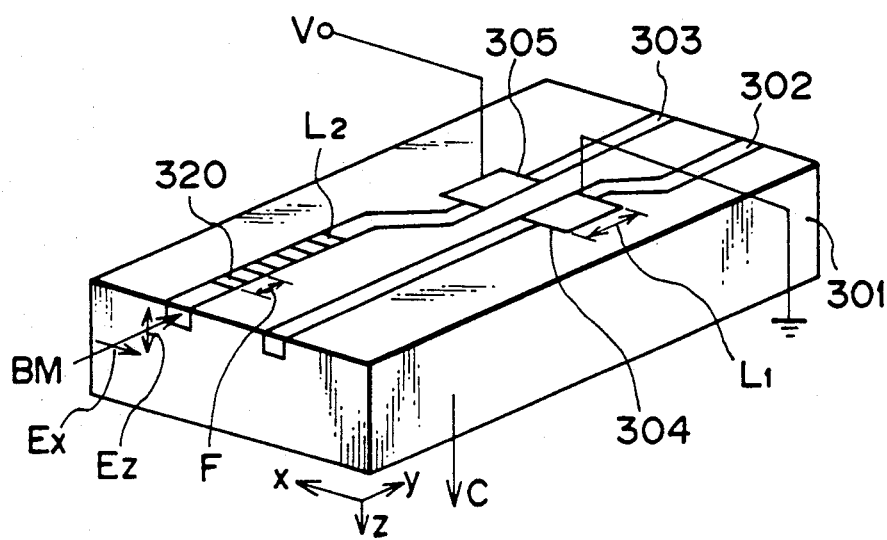
FIG. 22 is a drawing to show still another modification of the wavelength conversion element as shown in FIG. 19.

FIGS. 20-22 show modifications of the wavelength conversion element as shown in FIG. 19 In FIGS. 20-22, the same referential numerals as in FIG. 19 are used for similar elements.

Formed on a waveguide 303 in the wavelength conversion element as shown in FIG. 20 is a phase matching portion 311 similar to that 306 formed in the wavelength conversion element of FIG. 19. A fundamental wave is controlled to transfer from the waveguide 303 to a waveguide 302 by changing a voltage V to an electrode 305, so that a second harmonic may be substantially modulated. Contrary to the wavelength conversion element of FIG. 19, when the voltage V is "0", no second harmonic is output, while a second harmonic is output from the waveguide 303 when the voltage is over a predetermined value. Then the on-off control of voltage results in the on-off control of second harmonic output.

In the embodiment as shown in FIG. 21, half-divided electrodes 315, 316 and another half-divided electrodes 317, 318 are provided on waveguides 302, 303, respectively. Voltages of +V and of −V are applied to the electrodes 315, 317, respectively. In the former embodiment of FIG. 19, an optical power may be transmitted from the waveguide 303 to the waveguide 302 only if the length $L_1$ of electrodes 304, 305 is an odd multiple of the complete coupling length and if the voltage V is "0". In the embodiment of FIG. 21, the voltages +V, −V different in polarity are supplied to the electrodes 315, 317, so that a phase mismatch of $+\Delta\beta$ exists between the electrodes 315 and 316, while another phase mismatch of $-\Delta\beta$ exists between the other electrodes 317, 318. In such an arrangement, adjustment of voltage +V, −V allows an optical power having been transmitted from the waveguide 303 to the waveguide 302 to be again transmitted from the waveguide 302 to the waveguide 303, in addition to the operation mode in FIG. 19. The total length $L_1$ of electrodes 315, 316 or electrodes 317, 318 must be between 1 and 31, where 1 is the complete coupling length. Although each of the electrodes is divided into two in the embodiment of FIG. 21, each may be divided into more, obtaining the same effect.

In the wavelength conversion element as shown in FIG. 22, a phase matching portion or polarization inversion layer 320 is provided on the input side of fundamental wave with respect to a coupling region of two waveguides 302, 303. A second harmonic is effectively produced in the polarization inversion layer 320 before the fundamental wave reaches the electrode 305 in the waveguide 303 in this case. Then the second harmonic itself is controlled in propagation path by the voltage V of electrode 305 to be output from either of waveguides 302, 303. That is, the second harmonic is output from the waveguide 302 when the voltage V is "0", while the second harmonic is output from the waveguide 303 when the voltage V is over a predetermined value.

In the embodiment as shown in FIGS. 19–22, the substrate 301 is of $LiTaO_3$. Since the $LiTaO_3$ has a higher optical damage threshold level, it shows less of a degree of optical damage. The use of substrate 301 of $LiTaO_3$ is effective to avoid degradation of performance of element even in use for a long term. Also, the wavelength conversion element may be prepared at a relatively low temperature because the $LiTaO_3$ has the low Curie point Tc of 600° C.

On the contrary, $LiNbO_3$ or $LiNbO_3$ doped with MgO, which has been conventionally used as nonlinear optical crystal, has a lower optical damage threshold level easy to suffer optical damage and has a high Curie point Tc of 1000° C., requiring a higher temperature treatment as compared to $LiTaO_3$. However, it is of course possible that a wavelength conversion element is made by using $LiNbO_3$ or $LiNbO_3$ doped with MgO as a substrate with the same function as those in FIGS. 19–22.

Figure 23:
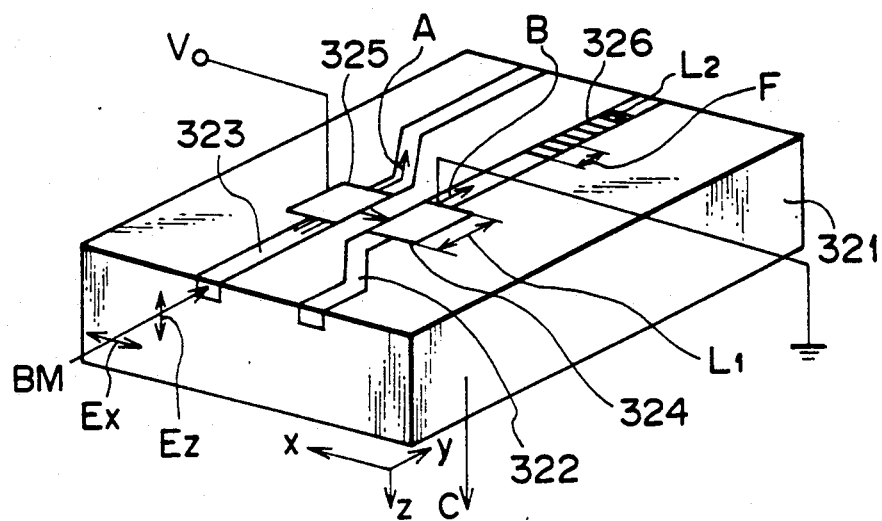
FIG. 23 is a drawing to show a still further embodiment of a wavelength conversion element according to the present invention.

FIG. 23 shows another embodiment of a wavelength conversion element according to the present invention. A substrate 321 is made of $LiNbO_3$ or $LiNbO_3$ doped with MgO of nonlinear optical crystal material (a single crystal with orientation of c plate) in this embodiment. The wavelength conversion element of FIG. 23 is constructed corresponding to that of FIG. 19, such that two waveguides 322, 323 are formed on the substrate 321, that electrodes 324, 325 are provided at a predetermined position on the waveguides 322, 323 to supply a variable potential difference to a coupling region of waveguides 322, 323, and that a polarization inversion layer 326 is formed as a phase matching portion on the waveguide 323. Polarization domains of polarization inversion layer 326 are formed at a pitch of period F as defined by the equation (17) similarly as the polarization inversion layer 306 in FIG. 19. However, since the substrate 301 is made of $LiNbO_3$ or $LiNbO_3$ doped with MgO instead of $LiTaO_3$ in this embodiment, the period F is different from that in FIG. 19.

For example, if a fundamental wave is of wavelength $\lambda$ of 0.83 μm and is in the $Ex_{00}$ mode (the ordinary wave) with the electric field directing in the x-direction, the wavelength dispersion of equivalent refractive index is 2.22 for the fundamental wave in the waveguide 322 of $LiNbO_3$. Also, a second harmonic of wavelength $\lambda/2$ of 0.415 μm is generated in the $Ez_{00}$ mode by the nonlinear constant $d_{31}$ of nonlinear optical crystal material based on the fundamental wave to have the wavelength dispersion of equivalent refractive index of 2.28 in the waveguide 322. Then the period F of polarization inversion is about 6.9 μm in this case by the equation (17). Therefore, if the polarization domains of polarization inversion layer 326 are formed at a pitch of about 6.9 μm, the fundamental wave and the second harmonic may be matched in phase with each other in the polarization inversion layer 326.

Similarly if a fundamental wave is of wavelength $\lambda$ of 0.83 μm and is in the $Ez_{00}$ mode (the extraordinary wave) with the electric field thereof directing in the z-axis, the wavelength dispersion of equivalent refractive index is 2.17 for the fundamental wave in the waveguide 322 of $LiNbO_3$. Also, a second harmonic of wavelength $\lambda/2$ of 0.415 μm is generated in the $Ez_{00}$ mode by the nonlinear constant $d_{31}$ of nonlinear optical crystal material based on the fundamental wave to have the wavelength dispersion of equivalent refractive index of 2.28 in the waveguide 322. Then the period F of polarization inversion is about 3.8 μm in this case by the equation (17). Therefore, if the polarization domains of polarization inversion layer 326 are formed at a pitch of about 3.8 μm, the fundamental wave and the second harmonic may be matched in phase with each other in the polarization inversion layer 326.

In the wavelength conversion element as constructed as in FIG. 23, the change of voltage V to the electrode 325 controls the transmission of fundamental wave from the waveguide 323 to the waveguide 322 to effect substantial modulation of second harmonic, similarly as in the wavelength conversion element of FIG. 19. The wavelength conversion element of FIG. 23 may be modified like the embodiments as shown in FIGS. 20–22.

Figure 24:
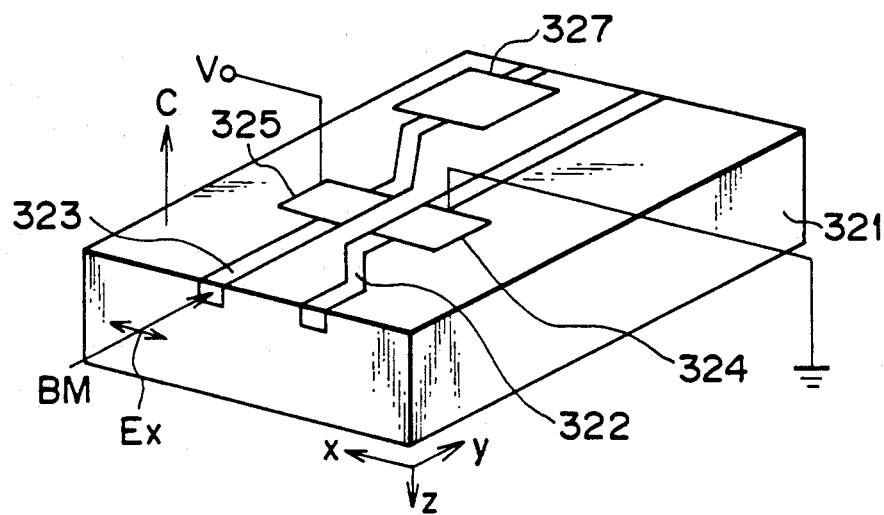
FIG. 24 is a drawing to show a still further embodiment of a wavelength conversion element according to the present invention.

FIG. 24 shows another embodiment of a wavelength conversion element according to the present invention. The same numerals as in FIG. 23 are used for similar elements in FIG. 24. A substrate 321 is made of $LiNbO_3$ or $LiNbO_3$ doped with MgO. Two waveguides 322, 323 are formed on the substrate 321. Electrodes 324, 325 are provided on the waveguides 322, 323 to give a variable potential difference to a coupling region of waveguides 322, 323. There is no polarization inversion layer formed on the waveguides 322, 323. It is presumed in this embodiment that a fundamental wave is of wavelength $\lambda$ of not less than 1 μm in the $Ex_{00}$ mode. If the fundamental wave has the wavelength $\lambda$ of not less than 1 μm in the $Ex_{00}$ mode, the phase matching can be achieved by the birefringence of $LiNbO_3$. Then a second harmonic may be effectively produced in either of waveguides 322, 323 without a polarization inversion layer. However, the second harmonic is always output from either of waveguides 322, 323 even upon change of voltage V to the electrode 325 in such an arrangement. Therefore, a cladding metal layer 327 is formed on a partial surface of waveguide 323 for modulation of second harmonic. The metal layer 327 is made of Al, or, of $Nb_2O_5$ sputtering film.

When the fundamental wave of wavelength of not less than 1 μm is incident into the waveguide 323 in the $Ex_{00}$ mode in such an arrangement, a second harmonic is effectively produced in the waveguide 323 to reach the electrode 325 or coupling region. When the voltage V to the electrode 325 is "0", the second harmonic reached to the coupling region is transmitted to the waveguide 322 and then output therefrom. On the contrary, if the voltage V to the electrode 325 is over a predetermined value, the second harmonic reached to the coupling region is not transmitted to the waveguide 322 and continues propagating in the waveguide 323. However, the second harmonic is absorbed by the cladding metal layer 327 not to be output from the waveguide 323. Accordingly, the on-off control of voltage V results in the off-on control of second harmonic output.

Figure 25:
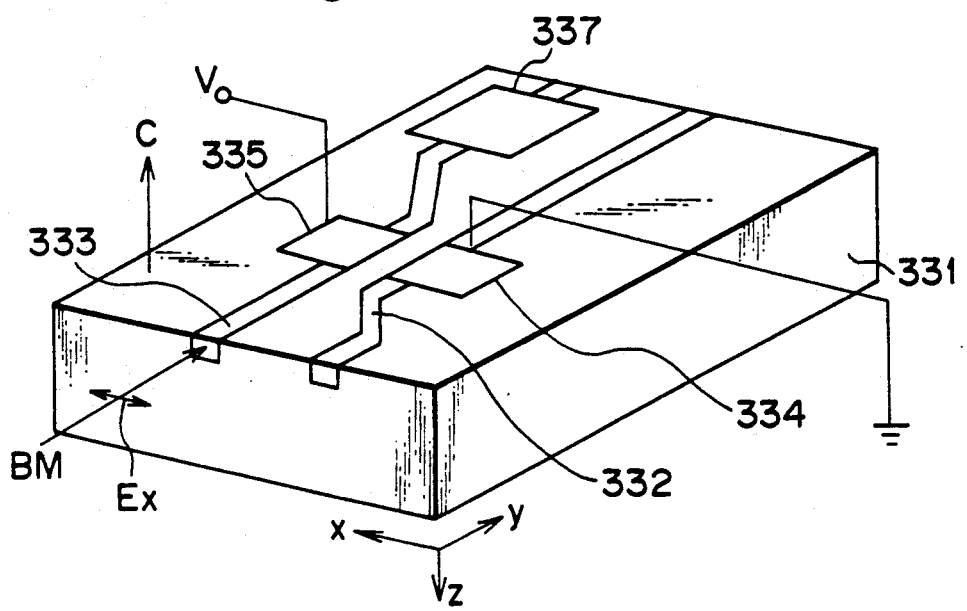
FIG. 25 is a drawing to show a still further embodiment of a wavelength conversion element according to the present invention.

FIG. 25 shows still another embodiment of a wavelength conversion element according to the present invention. In this embodiment, a substrate 331 is made of nonlinear optical crystal material and waveguides 332, 333 are formed by the proton exchange on the substrate 331. Electrodes 334, 335 are provided on the waveguides 332, 333, respectively, and a cladding metal layer 337 is formed on a partial surface of waveguide 332.

Since the waveguides 332, 333 are proton exchange waveguides, a second harmonic may be generated by the Cherenkov radiation in the waveguides 332, 333 without a polarization inversion layer. Further, the cladding metal layer 337 is formed on the waveguide 333 similarly as in the embodiment of FIG. 24, so that the second harmonic in the waveguide 333 may be absorbed by the metal layer 337. Therefore, the on-off control of voltage V results in the off-on control of second harmonic output.

As explained, both the generation and the modulation of shorter wavelength harmonic may be achieved on the single substrate in the simple and compact arrangement in the above embodiments, keeping the wavelength conversion element compact. Also, since the modulation of shorter wavelength harmonic is easy, the wavelength conversion element is suitable for optical disk apparatus.

Although there are two waveguides provided in the above embodiments, more waveguides than two may be used for more complex optical modulation control.

In the wavelength conversion elements of FIGS. 15-25 as explained above, a fundamental wave is incident into at least one of the plural waveguides of nonlinear optical medium, and the variable potential difference is applied to the optical coupling region of the plural waveguides. There is provided on at least one of the plural waveguides the shorter wavelength harmonic generation portion for effectively generating the shorter wavelength harmonic based on the fundamental wave, or the shorter wavelength harmonic annihilation portion for annihilating the generated shorter wavelength harmonic. Then the wavelength conversion element effectively outputs the modulated shorter wavelength harmonic with the change of potential difference.

In case that the plural waveguides are formed of $LiTaO_3$ of nonlinear optical medium, the performance degradation may be minimized even after a long term use, and the element may be made at a relatively low temperature.

The shorter wavelength generation portion comprises the phase matching portion for matching the phases of fundamental wave and second harmonic generated therefrom, thereby effectively producing the second harmonic.

Further, if the plural waveguides are formed of nonlinear optical medium of $LiNbO_3$ or $LiNbO_3$ doped with MgO, the phase matching can be achieved by the birefringence of $LiNbO_3$ in the waveguides. The shorter wavelength harmonic may be effectively produced without the shorter wavelength generation portion in this case. The shorter wavelength harmonic annihilation portion is provided for modulation of second harmonic instead.

The shorter wavelength annihilation portion comprises the cladding metal layer for absorbing the shorter wavelength harmonic generated from the fundamental wave, thereby surely absorbing to annihilate the shorter wavelength harmonic.

When the plural waveguides are proton exchange waveguides, the shorter wavelength harmonic may be produced by the Cherenkov radiation. The shorter wavelength harmonic may be modulated in this case by the shorter wavelength harmonic annihilation portion provided on at least one of plural waveguides.

Next explained with reference to FIGS. 26-32 are embodiments of wavelength conversion elements in which the on-off control of second harmonic may be effected by electrodes using the total reflection of light.

Figure 27:
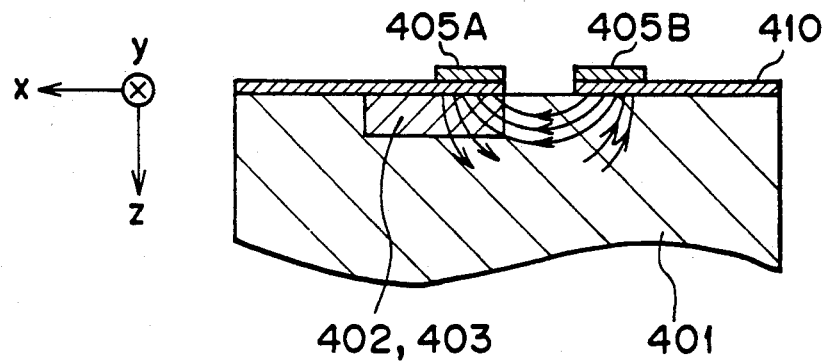
FIG. 27 is a drawing to illustrate a state of voltage application to planar electrodes.

FIG. 26 shows an embodiment of such a wavelength conversion element according to the present invention. In the wavelength conversion element of FIG. 26, a substrate 401 is made of $LiTaO_3$ of nonlinear optical material (a single crystal with orientation of -c plate), two waveguides 402, 403 are formed on the substrate 401. The waveguides 402, 403 have a higher refractive index than the substrate 401. The waveguides 402, 403 cross each other on the substrate 401. A planar electrode 405 comprised of electrodes 405A, 405B is disposed at the intersection. When a positive voltage is applied to the planar electrode 405, the refractive index decreases by the Pockels effect in proportion to an electric field formed in the substrate 401, to form a boundary plane of total reflection directly below the electrode. In case that the substrate 401 is a -c plate of $LiTaO_3$ as shown in FIG. 26, or in case that the substrate is a c plate of $LiNbO_3$, an edge of electrode 405A of planar electrode 405 is aligned with the center of the intersection of waveguides to use components of electric field perpendicular to the surface as shown in FIG. 27. Thus the electrode 405A of planar electrode 405 is located on the waveguide. A predetermined voltage is applied to the electrode 405A, and the other electrode 405B is kept in the ground potential, which is located off the waveguides.

The total reflection will occur in the intersection of waveguides 402, 403 when the following condition from the Snell's law is satisfied.

$$\cos\theta > (n_i - \Delta n_i)/n_i, \; \Delta n_0 = n_0^3 r_{13} E/2, \text{ and}$$
$$\Delta n_e = n_e^3 r_{3\cdot 3} E/2 \quad (18)$$

In the condition (18), $n_i$ represents a refractive index of medium, E an electric field formed in the substrate, and $r_{13}$, $r_{33}$ Pockels constants, e.g., $r_{13}=7.0/10^6$ ($\mu$m/V) and $r_{33}=30.3/10^6$ ($\mu$m/V) for a substrate of LiTaO$_3$. When the voltage is not applied to the planar electrode 405 or to the electrode 405A on the intersection of waveguides 402, 403, a fundamental wave BM propagating in the waveguide 402 continues proceeding in the same waveguide 402 as shown by an arrow A in FIG. 26 without the total reflection in the intersection. When the predetermined voltage V is applied to the electrode 405A, the fundamental wave BM propagating in the waveguide 402 is totally reflected in the intersection as shown by an arrow B in FIG. 26, whereby being transmitted into the waveguide 403. The optical path of fundamental wave is switched from the waveguide 402 to the waveguide 403 by the total reflection. The smaller a cross angle between the waveguides 402, 403 and the planar electrode 405, the smaller the applied voltage V necessary for the switching of optical path, as seen from the condition (18).

In the embodiment of FIG. 26, a phase matching portion 406 is provided on the waveguide 403 to effectively convert the fundamental wave propagating therein into a shorter wavelength harmonic, for example into a second harmonic. The phase matching portion 406 comprises a polarization inversion layer formed by the proton exchange followed by a thermal treatment. The polarization inversion layer 406 presents a periodic change of nonlinear constant for the fundamental wave and the second harmonic generated therefrom. A period $\Lambda$ of polarization inversion must satisfy the following equation (19) to effect the phase matching between the fundamental wave and the second harmonic:

$$\beta(2\omega)-2\beta(\omega)=2\pi(2m-1)/\Lambda \qquad (19),$$

where m is a natural number, $\omega$, $2\omega$ frequencies of fundamental wave and second harmonic in the waveguide 403, and $\beta(\omega)$, $\beta(2\omega)$ propagation constants of fundamental wave and second harmonic in the waveguide 403.

When $N(\omega)$, $N(2\omega)$ are effective refractive indices for fundamental wave and second harmonic, respectively, in the waveguide 403, the above equation (19) may be transformed as the following equation (20), using the relation of $\beta=2\pi N/\lambda$ between the equivalent refractive index N and the propagation constant $\beta$.

$$\Lambda=(2m-1)\lambda/2\{N(2\omega)-N(\omega)\} \qquad (20),$$

where m is a natural number.

The second harmonic may be effectively obtained by presence of polarization inversion arrangement of period $\Lambda$ satisfying the above equation (20). Thus polarization domains of polarization inversion layer 406 should be made at a pitch of period $\omega$.

For example, if the fundamental wave is of wavelength $\lambda$ of 0.83 $\mu$m and is in the Ex$_{00}$ mode (the ordinary wave) with the electric field thereof directing in the x-axis, the wavelength dispersion of equivalent refractive index is 2.1538 for the fundamental wave in the waveguide 403 of LiTaO$_3$. Also, a second harmonic of wavelength $\lambda/2$ of 0.415 $\mu$m is generated in the Ez$_{00}$ mode by the nonlinear constant $d_{31}$ of nonlinear optical crystal material based on the fundamental wave to have the wavelength dispersion of equivalent refractive index of 2.2814. Then the period $\Lambda$ of polarization inversion is about 3.3 $\mu$m in this case by the equation (20). Therefore, if the polarization domains of polarization inversion layer 406 are formed at a pitch of about 3.3 $\mu$m, the fundamental wave and the second harmonic may be matched in phase with each other in the polarization inversion layer 406.

Similarly, if the fundamental wave is of wavelength $\lambda$ of 0.83 $\mu$m and in the Ez$_{00}$ mode (the extraordinary wave) with the electric field thereof directing in the z-axis, the wavelength dispersion of equivalent refractive index is 2.1578 for the fundamental wave in the waveguide 403 of LiTaO$_3$. Also, a second harmonic of wavelength $\lambda/2$ of 0.415 $\mu$m is generated in the Ez$_{00}$ mode by the nonlinear constant $d_{33}$ of nonlinear optical crystal material based on the fundamental wave to have the wavelength dispersion of equivalent refractive index of 2.2814 in the waveguide 403. Then the period $\Lambda$ of polarization inversion is about 3.4 $\mu$m in this case by the equation (20). Therefore, if the polarization domains of polarization inversion layer 406 are formed at a pitch of about 3.4 $\mu$m, the fundamental wave and the second harmonic may be matched in phase with each other in the polarization inversion layer 406.

Further, if the fundamental wave is of wavelength $\lambda$ of 1.2 $\mu$m and in the Ex$_{00}$ mode (the ordinary wave) with the electric field thereof directing in the x-axis, the wavelength dispersion of equivalent refractive index is 2.1305 for the fundamental wave in the waveguide 403 of LiTaO$_3$. Also, a second harmonic of wavelength $\lambda/2$ of 0.6 $\mu$m is generated in the Ez$_{00}$ mode by the nonlinear constant $d_{31}$ of nonlinear optical crystal material based on the fundamental wave to have the wavelength dispersion of equivalent refractive index of 2.1878. Then the period $\Lambda$ of polarization inversion is about 10.5 $\mu$m in this case by the equation (20). Therefore, if the polarization domains of polarization inversion layer 406 are formed at a pitch of about 10.5 $\mu$m, the fundamental wave and the second harmonic may be matched in phase with each other in the polarization inversion layer 406.

Furthermore, if the fundamental wave is of wavelength $\lambda$ of 1.2 $\mu$m and in the Ez$_{00}$ mode (the extraordinary wave) with the electric field thereof directing in the z-axis, the wavelength dispersion of equivalent refractive index is 2.1341 for the fundamental wave in the waveguide 403 of LiTaO$_3$. Also, a second harmonic of wavelength $\lambda/2$ of 0.6 $\mu$m is generated in the Ez$_{00}$ mode by the nonlinear constant $d_{33}$ of nonlinear optical crystal material based on the fundamental wave to have the wavelength dispersion of equivalent refractive index of 2.1878. Then the period $\Lambda$ of polarization inversion is about 11.2 $\mu$m in this case by the equation (20). Therefore, if the polarization domains of polarization inversion layer 406 are formed at a pitch of about 11.2 $\mu$m, the fundamental wave and the second harmonic may be matched in phase with each other in the polarization inversion layer 406.

The wavelength conversion element as shown in FIG. 26 may be made in the same manner as in the embodiment of FIG. 4. In detail, the substrate 401 is formed of nonlinear optical material, for example of LiTaO$_3$. The waveguides 402, 403 are formed by diffusion of Ti, Cu, or the like at about 1000° C. on the surface of substrate 401. The waveguides 402, 403 are preferably in the single mode. The polarization inversion layer 406 is formed in the same manner as in the embodiment of FIG. 4.

The planar electrode 405 comprising the electrodes 405A, 405B may be formed by using the plasma CVD and the electroplating as in the embodiment of FIG. 4.

Explained in the following is an operation of the wavelength conversion element as shown in FIG. 26. When a laser beam from a laser beam source is incident into the waveguide 402, a fundamental wave BM propagates in the waveguide 402 to the planar electrode 405, or to the intersection. When a voltage is not applied to the electrode 405A, the fundamental wave propagating in the waveguide 402 is not reflected in the intersection, and therefore continues proceeding in the same waveguide 402 as shown by an arrow A in FIG. 26. The fundamental wave is output from the waveguide 402 without transmission from the waveguide 402 to the waveguide 403. A second harmonic is generated in the waveguide 402 based on the fundamental wave propagating therein. Since the phase matching is not effected between the fundamental wave and the second harmonic in the waveguide 402, the conversion efficiency into the second harmonic is extremely low. Therefore, only the fundamental wave is substantially output from the waveguide 402 without second harmonic output. Since the fundamental wave is not transmitted into the waveguide 403, no second harmonic is output from the waveguide 403, either.

When the applied voltage to the electrode 405A is increased, a reflection plane is formed by the Pockels effect in the intersection of two waveguides 402, 403. The fundamental wave then becomes transmitted from the waveguide 402 to the waveguide 403. When the voltage to the electrode 405A reaches a predetermined voltage V, the fundamental wave is reflected by the total reflection plane in the intersection to be transmitted into the waveguide 403 as shown by an arrow B in FIG. 26. The fundamental wave transmitted into the waveguide 403 propagates therein to reach the phase matching portion or polarization inversion layer 406, substantially producing a second harmonic therein. That is, the phase matching is effected between the fundamental wave and the second harmonic generated therefrom in the polarization inversion layer 406, whereby effectively converting the fundamental wave into the second harmonic. The second harmonic is output from the waveguide 403.

In the embodiment of FIG. 26, the change of voltage V to the electrode 405A controls the transmission of fundamental wave from the waveguide 402 to the waveguide 403, so that the second harmonic may be substantially modulated. The on-off control of voltage V results in the on-off control of second harmonic output.

Specifically, in case that a cross angle $\theta$ is 1/100 radian between the waveguides and the planar electrode 405, that a fundamental wave of wavelength $\lambda$ of 0.83 $\mu m$ is introduced into the waveguide 402 in the $Ex_{00}$ mode, and that a second harmonic of $Ez_{00}$ mode is expected from the waveguide 403, the intensity of electric field of 3.0 V/$\mu m$ is necessary for the total reflection of fundamental wave in the intersection. Similarly, in case that the wavelength $\lambda$ of incident fundamental wave is for example 0.83 $\mu m$, that the fundamental wave is introduced into the waveguide 402 in the $Ez_{00}$ mode, and that a second harmonic of $Ez_{00}$ mode is expected from the waveguide 403, the intensity of electric field of not less than 0.7 V/$\mu m$ is necessary for the total reflection of fundamental wave in the intersection. Also, if a fundamental wave of $Ex_{00}$ mode with the wavelength of 1.2 $\mu m$ is introduced into the waveguide 402, the electric field intensity is not less than 3.1 V/$\mu m$ for the total reflection, and if a fundamental wave of $Ez_{00}$ mode with the wavelength of 1.2 $\mu m$ is introduced into the waveguide 402, the electric field intensity is not less than 0.72 V/$\mu m$ for the total reflection.

Figure 28:
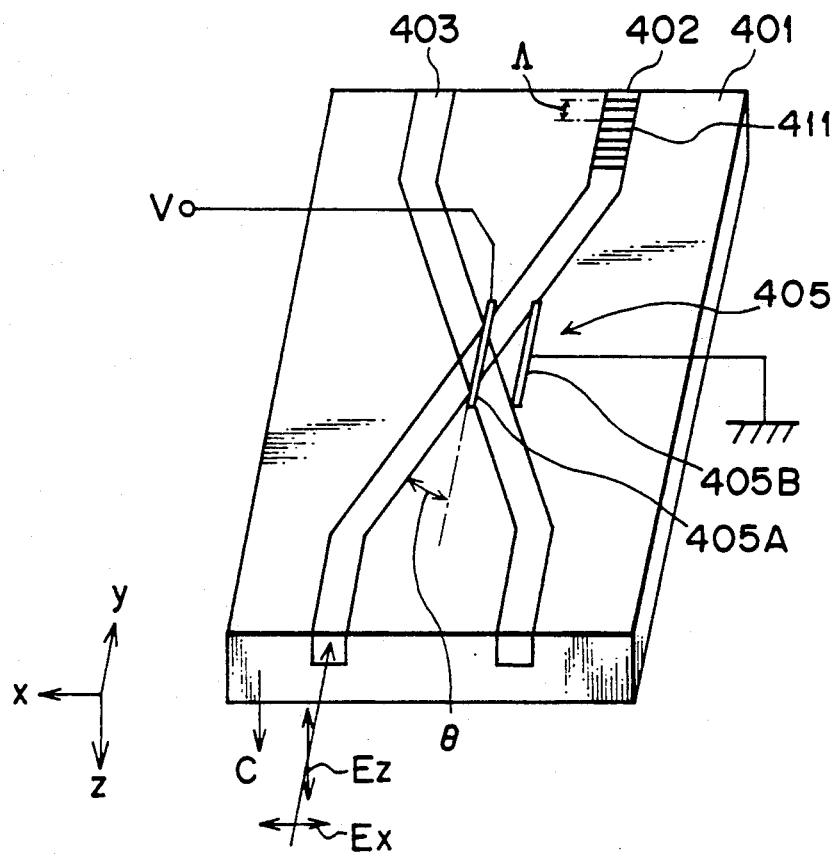
FIG. 28 is a drawing to show a modification of the wavelength conversion element as shown in FIG. 26.
Figure 29:
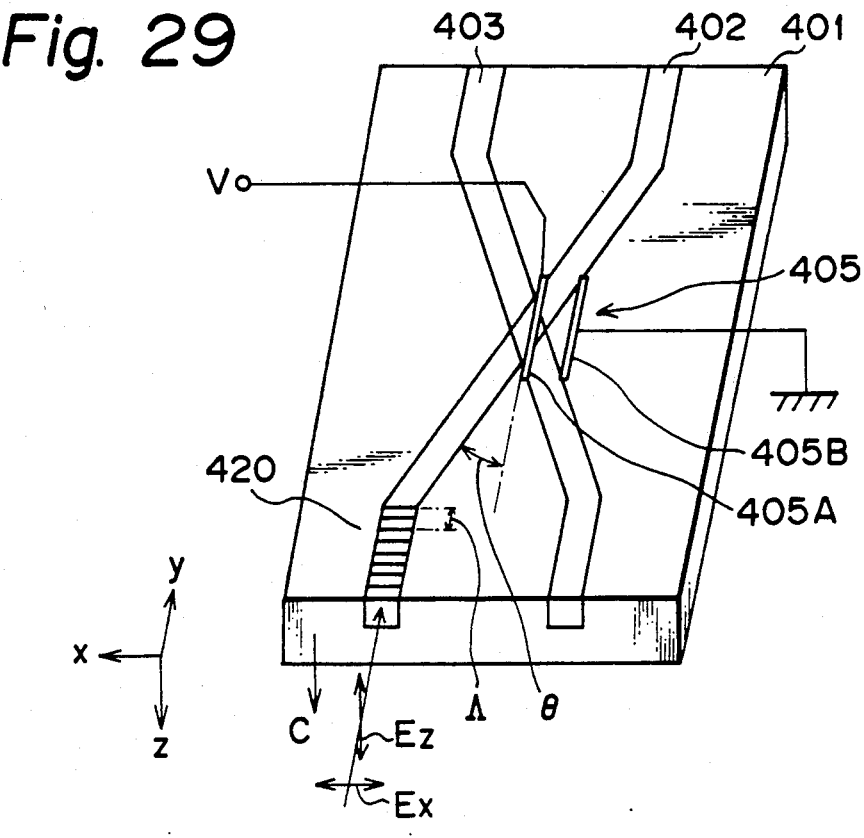
FIG. 29 is a drawing to show another modification of the wavelength conversion element as shown in FIG. 26.

FIGS. 28–29 show modifications of the wavelength conversion element as shown in FIG. 26. The same numerals as in FIG. 26 are used for similar elements in FIGS. 28–29. The wavelength conversion element of FIG. 28 has a phase matching portion 411 in a waveguide 402 similar to that 406 in FIG. 26. Also in this embodiment, a change of voltage to an electrode 405A controls transmission of fundamental wave from the waveguide 402 to another waveguide 403, to substantially modulate a second harmonic similarly as in FIG. 26. Contrary to the wavelength conversion element of FIG. 26, no second harmonic is output when the voltage is a predetermined voltage V, while a second harmonic is output from the waveguide 402 when the voltage is "0" in the wavelength conversion element of FIG. 28. The on-off control of vol rage results in the off-of control of second harmonic output.

The wavelength conversion element of FIG. 29 has a phase matching portion or polarization inversion layer 420 on the input side of light with respect to an intersection. A second harmonic may be effectively produced in the polarization inversion layer 420 in this embodiment before the fundamental wave reaches the intersection in the waveguide 402. A path of second harmonic itself is controlled by the voltage to the electrode 405A. The second harmonic is always output from either of the waveguides 402, 403. That is, the second harmonic is output from the waveguide 402 when the voltage is "0", while it is output from the waveguide 403 when the voltage is not less than a predetermined value V. In case that a cross angle $\theta$ is 1/100 radian and that the wavelength of fundamental wave is 0.83 $\mu m$, the electric field intensity is not less than 0.63 V/$\mu m$ necessary for the total reflection. In case that the wavelength of fundamental wave is 1.2 $\mu m$, the electric field intensity is not less than 0.68 V/$\mu m$ necessary for the total reflection.

In the embodiments of FIGS. 26–29, the substrate 401 is made of $LiTaO_3$. Since $LiTaO_3$ has a high optical damage threshold level, it shows less of a degree of optical damage. Then the performance degradation of element may be minimized even after long term use by using the substrate 401 of $LiTaO_3$. Also since $LiTaO_3$ has a lower Curie point Tc of 600° C., the wavelength conversion element may be made at a relatively low temperature.

On the contrary, $LiNbO_3$ or $LiNbO_3$ doped with MgO has a lower optical damage threshold level than $LiTaO_3$, so that it is easy to suffer an optical damage. Also, since $LiNbO_3$ or $LiNbO_3$ doped with MgO has a high Curie point Tc of about 1100° C., it requires a higher thermal treatment to produce a wavelength conversion element than $LiTaO_3$. However, it is of course possible that a wavelength conversion element is made with the same function as those in FIGS. 26–29 using a substrate of $LiNbO_3$ or $LiNbO_3$ doped with MgO.

Figure 30:
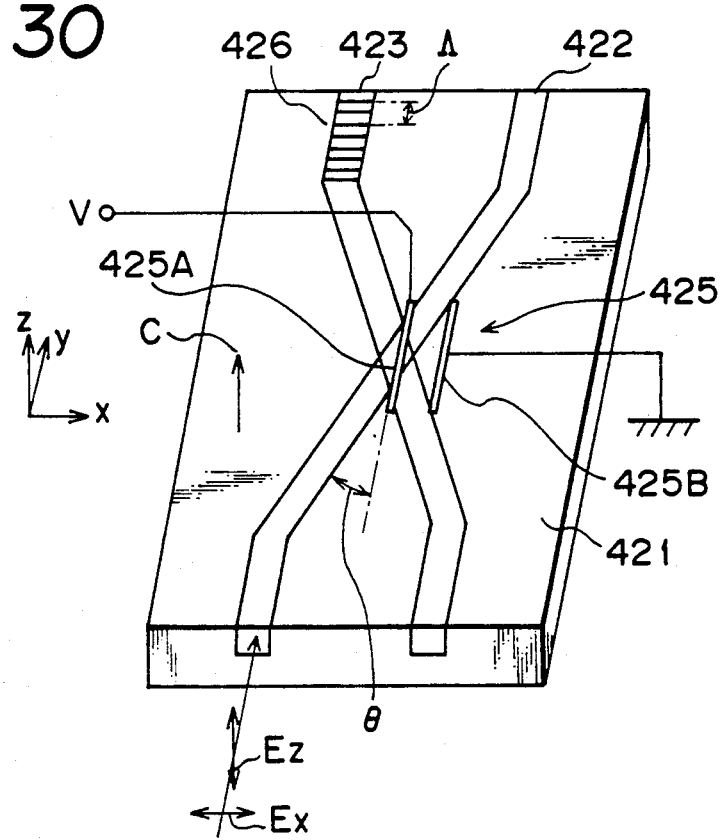
FIG. 30 is a drawing to show a still further embodiment of a wavelength conversion element according to the present invention.

FIG. 30 shows another embodiment of a wavelength conversion element according to the present invention. In this embodiment, a substrate 421 is made of $LiNbO_3$ or $LiNbO_3$ doped with MgO of nonlinear optical material (a single crystal with orientation of c plate). The wavelength conversion element of FIG. 30 corresponds to that of FIG. 26. Two waveguides 422, 423 are formed on the substrate 421. The waveguides 422, 423 cross each other on the substrate 421, and a planar electrode 425 comprising electrodes 425A, 425B is provided on an intersection thereof. A polarization inversion layer 426 is formed on the waveguide 423 as a phase matching portion.

A pitch of polarization domains of polarization inversion layer 426 is a period Λ determined by the equation (20) similarly as the polarization inversion layer 406 in FIG. 26. The period Λ of this embodiment is different from that of FIG. 26 because the substrate 401 is made of $LiNbO_3$ or $LiNbO_3$ doped with MgO instead of $LiTaO_3$ in FIG. 26.

For example, if the fundamental wave is of wavelength λ of 0.83 μm and in the $Ex_{00}$ mode (the ordinary wave) with the electric field thereof directing in the x-axis, the wavelength dispersion of equivalent refractive index is 2.22 for fundamental wave in the waveguide of $LiNbO_3$. Also, a second harmonic of wavelength λ/2 of 0.415 μm is generated in the $Ez_{00}$ mode by the nonlinear constant $d_{31}$ of nonlinear optical crystal material based on the fundamental wave to have the wavelength dispersion of equivalent refractive index of 2.28. Then the period Λ of polarization inversion is about 6.9 μm in this case by the equation (20). Therefore, if the polarization domains of polarization inversion layer 426 are formed at a pitch of about 6.9 μm, the fundamental wave and the second harmonic may be matched in phase with each other in the polarization inversion layer 426.

Similarly, if the fundamental wave is of wavelength λ of 0.83 μm and in the $Ez_{00}$ mode (the extraordinary wave) with the electric field thereof directing in the z-axis, the wavelength dispersion of equivalent refractive index is 2.17 for fundamental wave in the waveguide of $LiNbO_3$. Also, a second harmonic of wavelength λ/2 of 0.415 μm is generated in the $Ez_{00}$ mode by the nonlinear constant $d_{31}$ of nonlinear optical crystal material based on the fundamental wave to have the wavelength dispersion of equivalent refractive index of 2.28. Then the period Λ of polarization inversion is about 3.8 μm in this case by the equation (20). Therefore, if the polarization domains of polarization inversion layer 426 are formed at a pitch of about 3.8 μm, the fundamental wave and the second harmonic may be matched in phase with each other in the polarization inversion layer 426.

The wavelength conversion element of FIG. 30 is operated in the same manner as that of FIG. 26. The change of voltage to the electrode 425A controls the transmission of fundamental wave from the waveguide 422 to the waveguide 423, whereby substantially modulating the second harmonic. In this embodiment, the Pockels constant is as follows: $r_{13}=8.6/10^6$ (μm/V); $r_{33}=30.8/10^6$ (μm/V). In case that a cross angle θ is 1/100 radian between the waveguides and the planar electrode 425 and that the fundamental wave is of wavelength of 0.83 μm in the $Ex_{00}$ mode, the electric field intensity is not less than 2.3 V/μm necessary for the total reflection. Further, in case that the fundamental wave is of wavelength of 0.83 μm in the $Ez_{00}$ mode, the electric field intensity is not less than 0.68 V/μm necessary for the total reflection.

The applied voltage for the total reflection is negative, different from that in the embodiment of FIG. 26, because the substrate of this embodiment is the c plate of $LiNbO_3$. The wavelength conversion element of FIG. 30 may be modified like the modifications of FIGS. 28-29 to the embodiment of FIG. 26.

Figure 31:
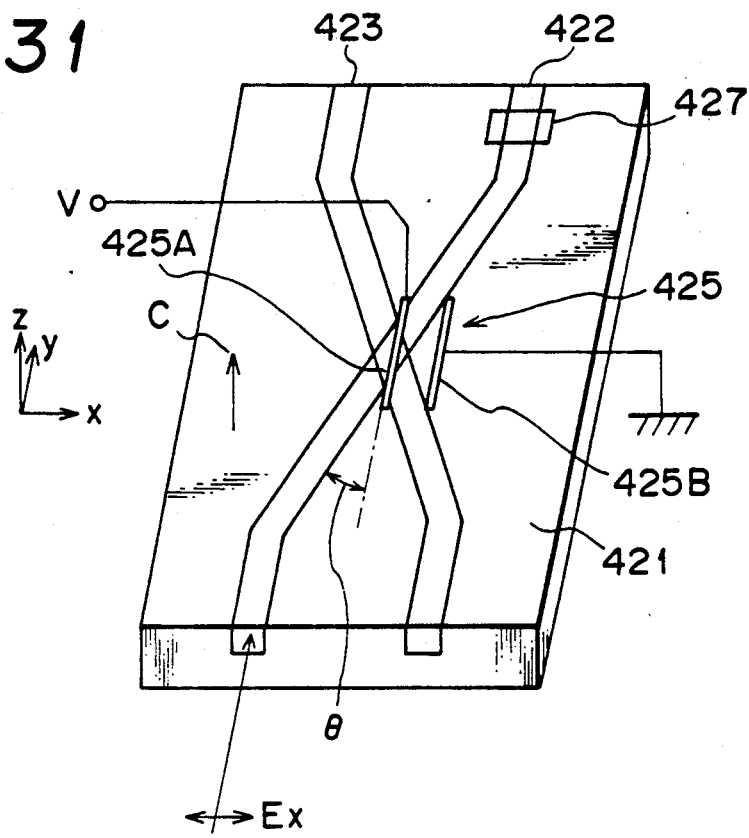
FIG. 31 is a drawing to show a still further embodiment of a wavelength conversion element according to the present invention.

FIG. 31 shows another embodiment using the total reflection for modulation of second harmonic. The same numerals as in FIG. 30 are used for similar elements in FIG. 31. In this embodiment, a substrate 421 is made of $LiNbO_3$ or $LiNbO_3$ doped with MgO, and two waveguides 422, 423 are formed on the substrate 421, similarly as in FIG. 30. The waveguides 422, 423 cross each other on the substrate 421. A planar electrode 425 comprising electrodes 425A, 425B is provided at the intersection of waveguides 422, 423. There is no polarization inversion layer formed on the waveguides 422, 423. It is presumed in this embodiment that a fundamental wave of wavelength λ of not less than 1 μm is used in the $Ex_{00}$ mode. If the fundamental wave is of wavelength λ of not less than 1 μm in the $Ex_{00}$ mode and the second harmonic is in the $Ex_{00}$ mode, the phase matching may be effected by the birefringence of $LiNbO_3$, not requiring a polarization inversion layer for a periodic change of equivalent refractive index in the waveguides. A second harmonic may be effectively produced in the waveguides 422, 423 without the polarization inversion layer. However, in such an arrangement, a second harmonic is always output from either of the waveguides 422, 423 even upon a change of voltage to the electrode 425A. Thus there is a cladding metal layer 427 formed on a partial surface of waveguide 422 for modulation of second harmonic. The metal layer 427 is made of Al, or, of a sputtering film of $Nb_2O_5$.

When a fundamental wave of wavelength of not less than 1 μm is incident in the $Ex_{00}$ mode into the waveguide 422, a second harmonic is effectively produced in the waveguide 422 to reach the intersection. If the voltage to the electrode 425A is a predetermined voltage V, the second harmonic reached the intersection is transmitted into the waveguide 423 and then output therefrom. On the contrary, if the voltage to the electrode 425A is "0", the second harmonic is not transmitted into the waveguide 423 in the intersection and continues propagating in the waveguide 422. The cladding metal layer 427 absorbs the second harmonic in the waveguide 422, so that no second harmonic is output from the waveguide 422. The on-off control of voltage V results in the on-off control of second harmonic output.

Figure 32:
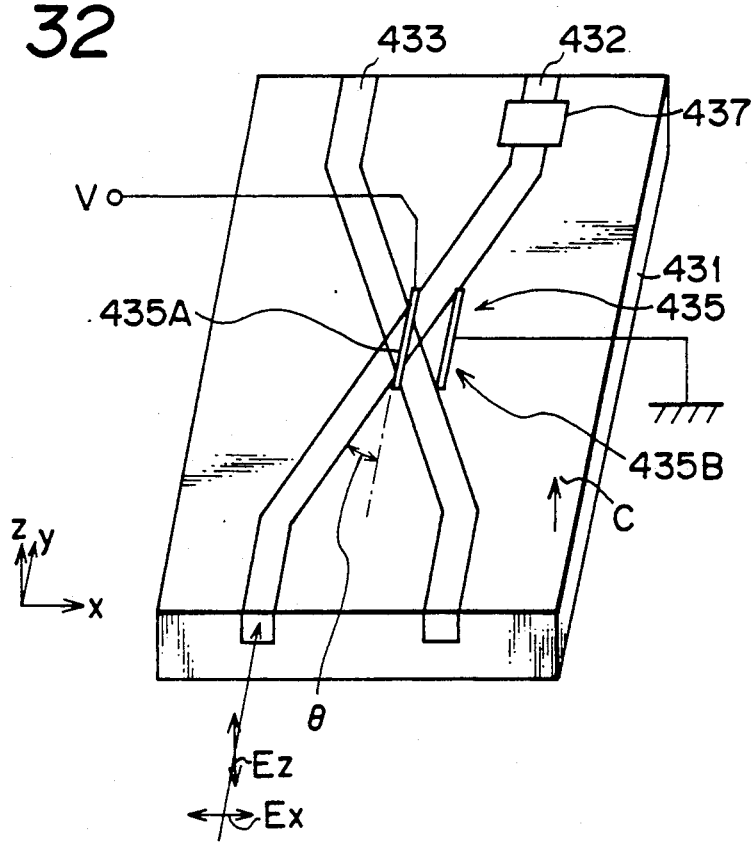
FIG. 32 is a drawing to show a still further embodiment of a wavelength conversion element according to the present invention.

FIG. 32 shows a further embodiment using the total reflection for modulation of second harmonic. In this embodiment, a substrate 431 is made of nonlinear optical material such as $LiNbO_3$, $LiTaO_3$, or the like. Two waveguides 432, 433 are formed by the proton exchange on the substrate 431. The waveguides 432, 433 cross each other on the substrate 431. A planar electrode 435 comprising electrodes 435A, 435B is provided on the intersection of the waveguides 432, 433, and a cladding metal layer 437 is formed on a partial surface of waveguide 432.

Since the waveguides 432, 433 are made by the proton exchange in this embodiment, a second harmonic may be generated by the Cherenkov radiation in the waveguides 432, 433 without a polarization inversion layer. Also since the cladding metal layer 437 is formed on the waveguide 432, the metal layer 437 absorbs the second harmonic in the waveguide 432. The on-off control of voltage V results in the on-off control of second harmonic output.

As explained in the above embodiments using the total reflection for modulation of second harmonic, the generation and the modulation of shorter wavelength harmonic may be achieved on the single substrate in the simple and compact arrangement, keeping the wavelength conversion element compact. Also, since the modulation of shorter wavelength harmonic is easy, the wavelength conversion elements as described are suitable for optical disk apparatus.

Although there are two waveguides provided in the respective embodiments, waveguides more than two may be used for a complex optical modulation control. It should be noted in the embodiments of FIGS. 26-32 that a portion of waveguide 403, 423, or 433 may be omitted between the front end thereof and the intersection if the fundamental wave is incident into waveguide 402, 422, or 432. The waveguides may cross each other in a symmetric or asymmetric manner with respect to the y-axis.

In the wavelength conversion elements as explained in the above embodiments using the total reflection for modulation of second harmonic, the potential difference may be applied in the intersection of plural waveguides of nonlinear optical medium. At least one of plural waveguides is given a shorter wavelength harmonic generation portion for effectively generating a shorter wavelength harmonic based on the fundamental wave introduced into the waveguide, or a shorter wavelength harmonic annihilation portion for annihilating the generated shorter wavelength harmonic. The fundamental wave is incident into the at least one of plural waveguides. The modulated shorter wavelength harmonic is effectively output from the wavelength conversion element by changing an optical path of fundamental wave or shorter wavelength harmonic by change of potential difference in the intersection.

When the plural waveguides are made of nonlinear optical medium of LiTaO$_3$, the performance degradation of element may be minimized even after long term use, and the element may be made at a relatively low temperature.

The shorter wavelength harmonic generation portion comprises the phase matching portion for matching phases of fundamental wave and second harmonic generated therefrom, thereby effectively producing the shorter wavelength harmonic. The shorter wavelength harmonic annihilation portion comprises the cladding metal layer for absorbing the shorter wavelength harmonic generated based on the fundamental wave, whereby surely absorbing to annihilate the shorter wavelength harmonic.

When the plural waveguides are formed of nonlinear optical medium of LiNbO$_3$ or LiNbO$_3$ doped with MgO, the phase matching can be effected by the birefringence of LiNbO$_3$ in the waveguides. In such a case, the shorter wavelength harmonic may be effectively produced without a shorter wavelength harmonic generation portion. The modulation may be effected by the shorter wavelength harmonic annihilation portion.

If the plural waveguides are made by the proton exchange, the shorter wavelength harmonic may be produced by the Cherenkov radiation. In this case, the shorter wavelength harmonic annihilation portion is provided on at least one of plural waveguides, to modulate the shorter wavelength harmonic.

Explained in the following are embodiments of wavelength conversion elements enabling intensity modulation of second harmonic.

Figure 33:
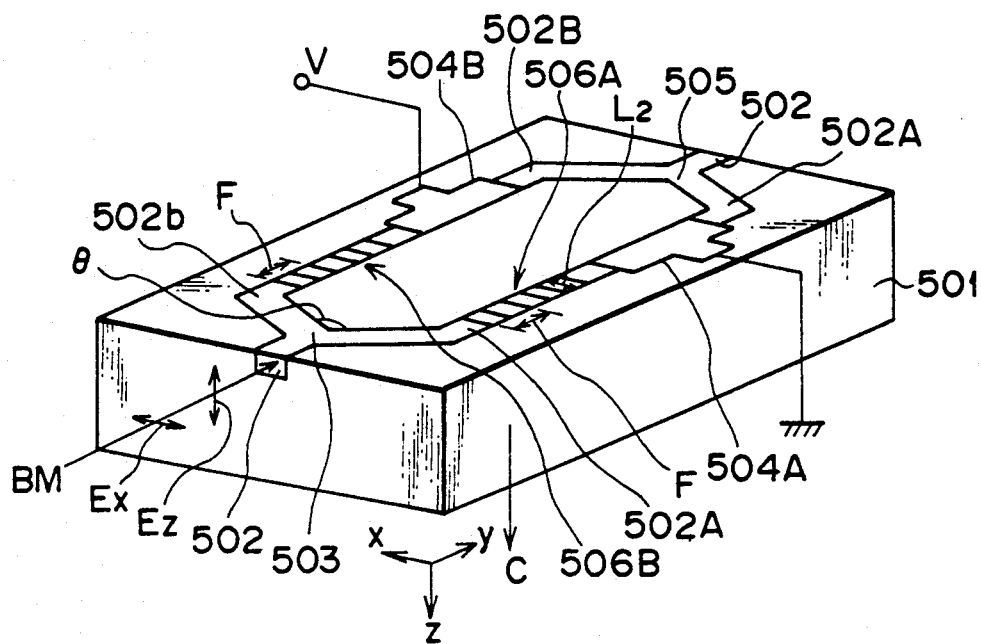
FIG. 33 is a drawing to show a still further embodiment of a wavelength conversion element according to the present invention.

FIG. 33 shows an embodiment of a wavelength conversion element of such type. In the wavelength conversion element of FIG. 33, a substrate 501 is made of LiTaO$_3$ of nonlinear optical crystal material (a single crystal with orientation of -c plate). A waveguide 502 is formed on the substrate 501, having a higher refractive index than the substrate 501. The waveguide 502 has a Mach-Zehnder interference portion, which is a combination of two Y's. The waveguide 502 is separated into two arms 502A, 502B in the interference portion. Phase matching portions 506A, 506B are provided on the arms 502A, 502B, respectively. The phase matching portions 506A, 508B effectively convert respective fundamental waves divided at a branch point 503 on the input side and propagating in the arms 502A, 502B, into a shorter wavelength harmonic, for example, into a second harmonic. The phase matching portions 506A, 506B comprise polarization inversion layers formed by the proton exchange in the embodiment of FIG. 33. The polarization inversion layers 506A, 506B give a periodic change of polarization inversion region. A period F of polarization inversion must satisfy the following equation (21) to match phases of fundamental wave and second harmonic:

$$\beta(2\omega) - 2\beta(\omega) = 2\pi(2m-1)/F \qquad (21),$$

where $\omega$, $2\omega$ are frequencies of fundamental wave and second harmonic in the arms 502A, 502B, and $\beta(\omega)$, $\beta(2\omega)$ propagation constants of fundamental wave and second harmonic in the arms 502A, 502B.

If $N(\omega)$, $N(2\omega)$ are effective refractive indices for fundamental wave and for second harmonic in the arms 502A, 502B, respectively, the above equation (21) may be transformed as the following equation (22), using the relation of $\beta = 2\pi N/\lambda$ between the equivalent refractive index N and the propagation constant $\beta$.

$$F = (2m-1)\lambda/2\{N(2\omega) - N(\omega)\} \qquad (22),$$

where m is a natural number.

If the index change is given in the period F satisfying the above equation (22), the second harmonic may be effectively obtained. It is, therefore, advantageous that polarization domains are formed at a pitch of period F in the polarization inversion layers 506A, 506B.

For example, if a fundamental wave is of wavelength $\lambda$ of 0.83 $\mu$m and in the Ex$_{00}$ mode (the ordinary wave) with the electric field thereof directing in the x-axis, the wavelength dispersion of equivalent refractive index is 2.1538 for the fundamental wave in the arms 502A, 502B of LiTaO$_3$. Also, a second harmonic of wavelength $\lambda/2$ of 0.415 $\mu$m is generated in the Ez$_{00}$ mode by the nonlinear constant d$_{31}$ of nonlinear optical crystal material based on the fundamental wave to have the wavelength dispersion of equivalent refractive index of 2.2814 in the arms 502A, 502B. Then the period F of polarization inversion is about 3.3 $\mu$m in this case by the equation (22). Therefore, if the polarization domains of polarization inversion layers 506A, 506B are formed at a pitch of about 3.3 $\mu$m, the fundamental wave and the second harmonic may be matched in phase with each o the r in the polarization inversion layers 506A, 506B.

Similarly, if the fundamental wave is of wavelength $\lambda$ of 0.83 $\mu$m and in the Ez$_{00}$ mode (the extraordinary wave) with the electric field thereof directing in the z-axis, the wavelength dispersion of equivalent refractive index is 2.1578 for fundamental wave in the arms 502A, 502B of LiTaO$_3$. Also, a second harmonic of wavelength $\lambda/2$ of 0.415 $\mu$m is generated in the Ez$_{00}$ mode by the nonlinear constant $d_{33}$ of nonlinear optical crystal material based on the fundamental wave to have the wavelength dispersion of equivalent refractive index of 2.2814 in the arms 502A, 502B. Then the period F of polarization inversion is about 3.4 μm in this case by the equation (22). Therefore, if the polarization domains of polarization inversion layers 506A, 506B are formed at a pitch of about 3.4 μm, the fundamental wave and the second harmonic may be matched in phase with each other in the polarization inversion layers 506A, 506B.

Further, if a fundamental wave is of wavelength λ of 1.2 μm and in the $Ex_{00}$ mode (the ordinary wave) with the electric field directing in the x-axis, the wavelength dispersion of equivalent refractive index is 2.1305 for the fundamental wave in the arms 502A, 502B of LiTaO$_3$. Also, a second harmonic of wavelength λ/2 of 0.6 μm is generated in the $Ez_{00}$ mode by the nonlinear constant $d_{31}$ of nonlinear optical crystal material based on the fundamental wave to have the wavelength dispersion of equivalent refractive index of 2.1878 in the arms 502A, 502B. Then the period F of polarization inversion is about 10.5 μm in this case by the equation (22). Therefore, if the polarization domains of polarization inversion layers 506A, 506B are formed at a pitch of about 10.5 μm, the fundamental wave and the second harmonic may be matched in phase with each other in the polarization inversion layers 506A, 506B.

Furthermore, if the fundamental wave is of wavelength λ of 1.2 μm and in the $Ez_{00}$ mode (the extraordinary wave) with the electric field directing in the z-axis, the wavelength dispersion of equivalent refractive index is 2.1341 for fundamental wave in the arms 502A, 502B of LiTaO$_3$. Also, a second harmonic of wavelength λ/2 of 0.6 μm is generated in the $Ez_{00}$ mode by the nonlinear constant $d_{33}$ of nonlinear optical crystal material based on the fundamental wave to have the wavelength dispersion of equivalent refractive index of 2.1878 in the arms 502A, 502B. Then the period F of polarization inversion is about 11.2 μm in this case by the equation (22). Therefore, if the polarization domains of polarization inversion layers 506A, 506B are formed at a pitch of about 11.2 μm, the fundamental wave and the second harmonic may be matched in phase with each other in the polarization inversion layers 506A, 506B Electrodes 504A, 504B are provided on the arms 502A, 502B to provide a variable potential difference between the arms 502A and 502B.

The electrode 504A on the arm 502A is kept in the ground potential and the electrode 504B on the arm 502B is given a variable potential V. The variable potential difference V between the electrodes 504B and 504A causes a phase change δ Ψ in second harmonic generated in the phase matching portion 506B of one arm 502B. The second harmonic having the phase change δ Ψ is coupled to interfere with the other second harmonic or reference wave generated in the other arm 502A, at a branch point 505 on the output side. The interfered second harmonics may be modulated in intensity in correspondence with the phase difference δ Ψ. After the interference, the modulated second harmonic is output from the waveguide 502.

More specifically, if the potential difference V is "0", the phase difference δ Ψ is also "0". The phases of second harmonics from the arms 502A, 502B are completely coincident with each other, so that the second harmonics are superimposed at the branch point 505 so as to have the maximam intensity. On the contrary, if such a potential difference V is applied that the phase difference δ Ψ therebetween is π, the phases of second harmonics in the waveguides 502A, 502B are deviated by π. Then the second harmonics are superimposed at the branch point 505 so as to have the intensity of "0".

Suppose the wavelength of second harmonics produced in the arms 502A, 502B of LiTaO$_3$ is 0.415 μm, a spacing d is 10 μm between the electrodes 504A and 504B, and a length L$_1$ of electrodes 504A, 504B is 5 min. The electro-optical or nonlinear constant $r_{33}$ of LiTaO$_3$ is $1/(30.3 \times 10^{12})$ mV. The half-wavelength voltage V π is about 3.85 V, which is a potential difference when the phase difference δ Ψ is π. When the power of fundamental wave is divided precisely into the two arms 502A, 502B at the branch point 503 on the input side, the intensity of second harmonic becomes exactly "0" upon the interference. Even if the power of fundamental wave is divided at a ratio 1:2 into the arms 502A, 502B, sufficient annihilation ratio may be obtained. If the branch angle θ of waveguide 502 is set within about 1 degree, a scattering loss of light may be held within 1 dB at the branch points 503, 505.

The wavelength conversion element of FIG. 33 may be made in the same manner as in the embodiment of FIG. 4. The substrate 501 is made of nonlinear optical crystal material of LiTaO$_3$. The waveguide 502 is formed by the diffusion of Ti, Cu, or the like at about 1000° C. on the substrate 501. The waveguide 502 is preferably made in the single mode. The polarization inversion layers 506A, 506B are formed in the same manner as in the embodiment of FIG. 4. Thus details of formation of polarization inversion layers are omitted.

Figure 34:
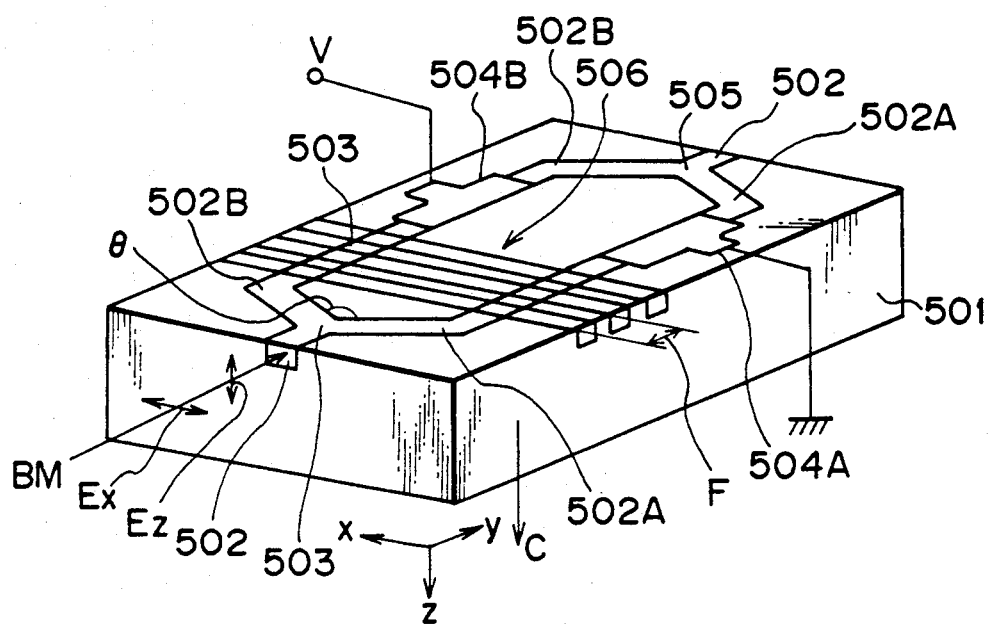
FIG. 34 is a drawing to show a modification of the wavelength conversion element as shown in FIG. 33.

It is not always necessary that the width L$_2$ of polarization inversion layers 506A, 506B is coincident with that of arms 502A, 502B. As shown in FIG. 34, the polarization inversion layer 506 may extend over the entire width of substrate 501 in the x-direction including the two arms 502A, 502B. Such an arrangement is easy in production of the two polarization inversion layers 506A, 506B as compared to that of FIG. 33. The production errors between the polarization inversion layers 506A and 506B can also be made smaller in the arrangement of FIG. 34 than in that of FIG. 33.

The electrodes 504A, 504B are made by the plasma CVD and by the electroplating as explained in the embodiment of FIG. 4. Reference should be made to the description about the embodiment of FIG. 4.

Explained in the following is an operation of the wavelength conversion element as shown in FIG. 33. A fundamental wave BM is incident into the waveguide 502 and propagates up to the branch point 503 therein. The fundamental wave is divided at the branch point 503 into the arms 502A. 502B. Second harmonics may be effectively produced in the polarization inversion layers 506A, 506B, respectively, based on the fundamental waves divided into the arms 502A, 502B. The second harmonics have the same phase in the polarization inversion layers 506A, 506B, presenting no phase difference therebetween. The thus-produced second harmonics propagate in the arms 502A, 502B to the electrodes 504A, 504B.

When the voltage V to the electrode 504B is "0", that is, when the potential difference is "0" between the electrodes 504B and 504A, the second harmonic propagating in the arm 502B is not changed in phase to have the same phase as the second harmonic or reference wave propagating in the arm 502A. The two second harmonics having the same phase are coupled with each other at the branch point 505. Since the second harmonics are superimposed in the same phase, the intensity of interfered second harmonics becomes maximum. The thus-obtained second harmonic is output from the waveguide 502.

In contrast, when the voltage V to the electrode 504B is a half-wavelength voltage, for example 3.85, that is, when the potential difference is 3.85 V between the electrodes 504B and 504A, the second harmonic propagating in the arm 502B is changed in phase by $\pi$ to have a phase difference $\pi$ to the second harmonic or reference wave propagating in the arm 502A. The second harmonics propagate in the respective arms 502B, 502A, keeping the phase difference $\pi$ therebetween to the branch point 505. The second harmonics are coupled with each other at the branch point 505. The coupled second harmonics are interfered with each other with the phase difference $\pi$. Since the second harmonics are superimposed in the respective phases shifted by $\pi$, they cancel each other to have "0" intensity. Thus no second harmonic is output from the waveguide 502.

As explained in the embodiment of FIG. 33, the change of voltage V to the electrode 504B causes the phase difference between the second harmonics in the arms 502A, 502B with correspondence to the voltage V to substantially modulate the output second harmonic. The on-off control of voltage V results in the off-on control of second harmonic output. If the potential V is continuously changed, the output intensity of second harmonic may also be continuously changed.

Figure 35:
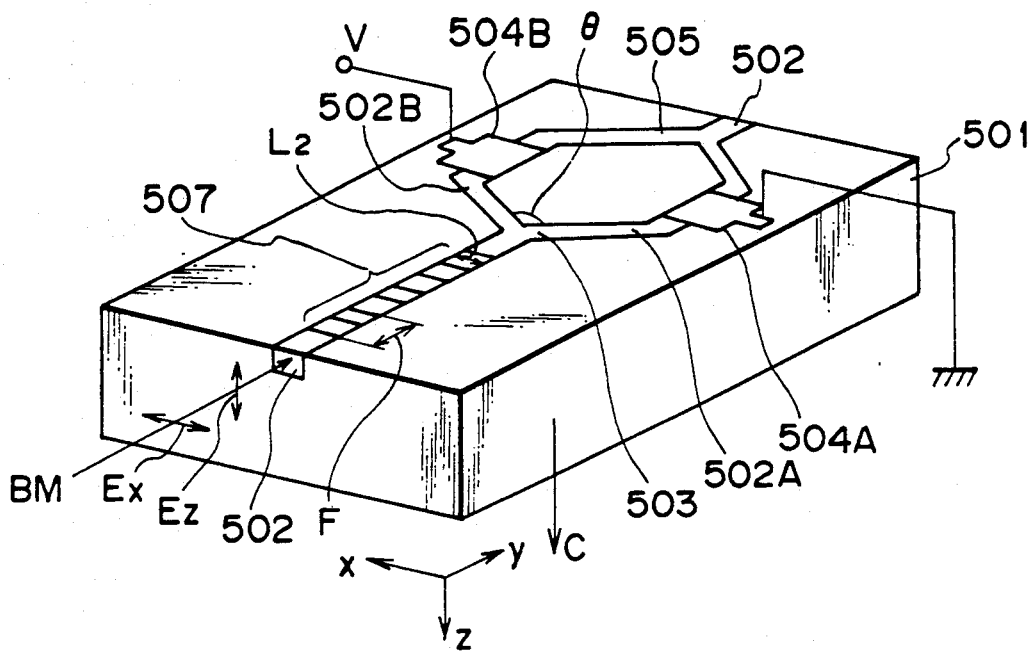
FIG. 35 is a drawing to show another modification of the wavelength conversion element as shown in FIG. 33.
Figure 36:
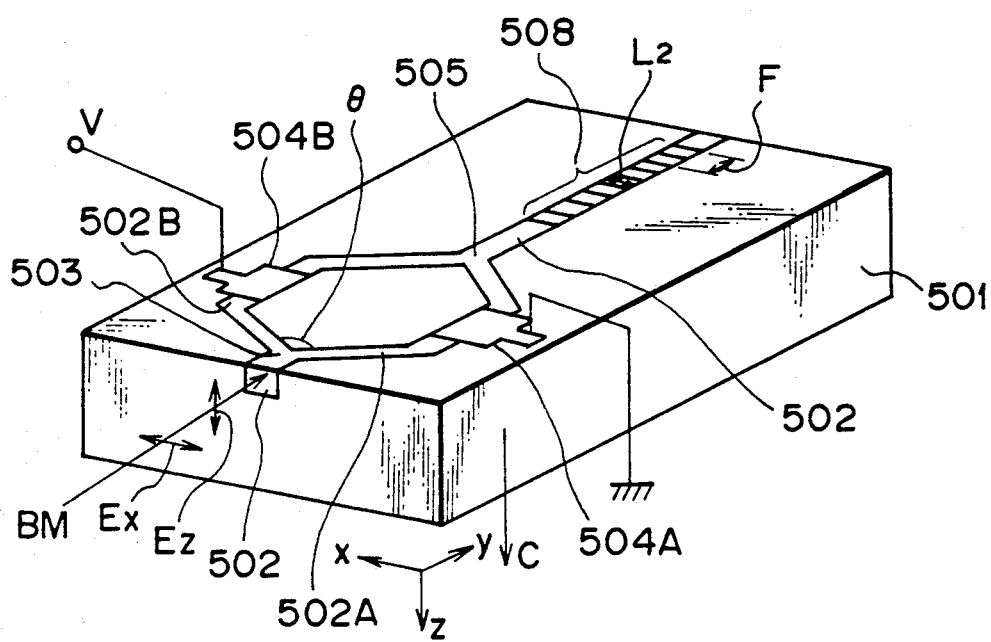
FIG. 36 is a drawing to show still another embodiment of the wavelength conversion element as shown in FIG. 33.

FIGS. 35 and 36 show modifications of the wavelength conversion element as shown in FIG. 33 The same numerals as in FIG. 33 are used for similar elements in FIGS. 35 and 36.

In the wavelength conversion elements as shown in FIGS. 35 and 36, a waveguide 502 of combination of two Y's comprises an interference portion of two branches. There is no phase matching portions provided in the intereference portion. A phase matching portion or polarization inversion layer, 507 or 508, is provided on the waveguide 502 before or after the interference portion, respectively. In the element of FIG. 35, the polarization inversion layer 507 is provided before the interference portion to obtain a second harmonic in the waveguide 502 before the interference portion. The produced second harmonic is guided into the interference portion to be separated at the branch point 503. A phase difference is given to the separate second harmonics by a potential difference between electrodes 504B and 504A similarly as in the embodiment of FIG. 33. The second harmonics with the phase difference are coupled with each other at the branch point 505 to be subject to the intensity modulation in correspondence to the phase difference. The thus-modulated second harmonic is output from the waveguide 502.

In the element of FIG. 36, the polarization inversion layer 508 is provided after the interference portion. A fundamental wave is separated at the branch point 503. A phase difference is given to the separate fundamental waves in the interference portion by a potential difference between electrodes 504B and 504A. The fundamental waves with the phase difference are coupled with each other at the branch point 505. The coupled fundamental waves interfere with each other to be subject to the intensity modulation by the phase difference. The interfered fundamental wave is output from the interference portion. A second harmonic is produced in the polarization inversion layer 508 located down the interference portion based on the fundamental wave after the intensity modulation. The produced second harmonic is output from the waveguide 502. The second harmonic may be modulated in intensity similarly as in the embodiment of FIG. 33, because the fundamental wave is modulated in intensity.

In the embodiments as shown in FIGS. 33-36, the substrate 501 is made of $LiTaO_3$. The $LiTaO_3$ has a higher optical damage threshold level, which suffers less optical damage. Using the substrate 501 of $LiTaO_3C$., the performance degradation of element may be minimized even after long term use. Also, since the $LiTaO_3$ has a lower Curie point Tc of about 600° C., the wavelength conversion element may be made at a relatively low temperature.

In contrast, $LiNbO_3$ or $LiNbO_3$ doped with MgO has a lower optical damage threshold level than the $LiTaO_3$, which easily suffers optical damage. Since the Curie point Tc of $LiNbO_3$ or $LiNbO_3$ doped with MgO is 1000°, a higher thermal treatment is required for production of wavelength conversion element than the $LiTaO_3$. However, it is of course possible that a substrate is made of $LiNbO_3$ or $LiNbO_3$ doped with MgO to obtain a wavelength conversion element having the same function as those in FIGS. 33-36.

Figure 37:
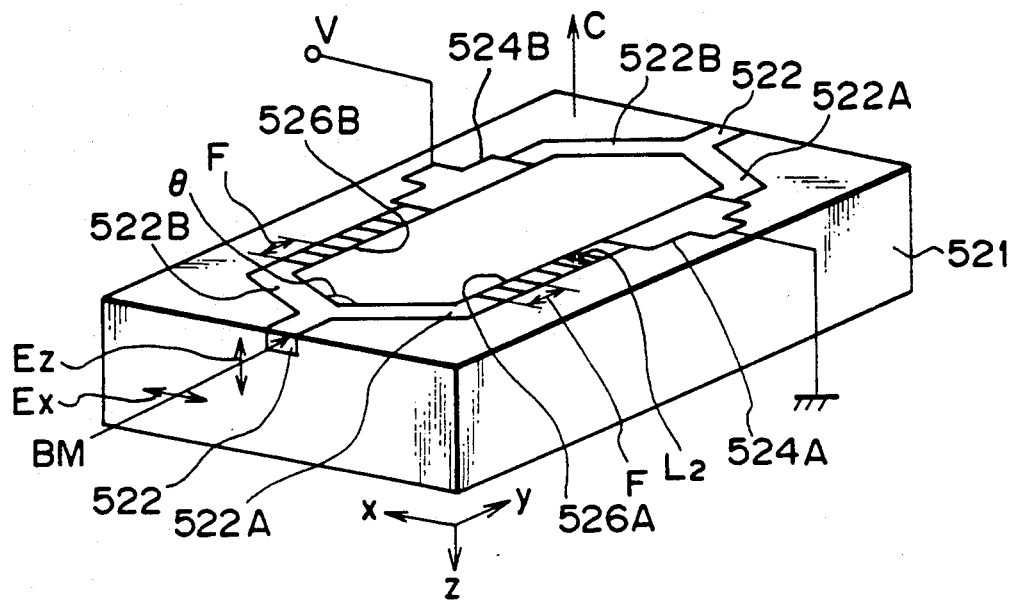
FIG. 37 is a drawing to show a still further embodiment of wavelength conversion element according to the present invention.

FIG. 37 shows another embodiment of a wavelength conversion element enabling the intensity modulation. In this embodiment, a substrate 521 is made of $LiNbO_3$ or $LiNbO_3$ doped with MgO of nonlinear optical crystal material (a single crystal with orientation of c plate). The wavelength conversion element of FIG. 37 has an arrangement corresponding to that in FIG. 33. A waveguide 522 is formed on the substrate 521, and has a Mach-Zehnder interference portion. The interference portion is divided into two arms 522A, 522B. Electrodes 524A, 524B are provided on the arms 522A, 522B. Also polarization inversion layers 526A, 526B are as provided phase matching portion on the arms 522A, 522B, respectively.

Polarization domains of polarization inversion layers 526A, 526B are formed at a pitch of period F as defined in equation (22) similarly as in the polarization inversion layers 506A, 506B in FIG. 33. Since the substrate 501 is made of $LiNbO_3$ or $LiNbO_3$ doped with MgO instead of $LiTaO_3$, the period F is different from that in FIG. 33.

For example, if a fundamental wave is of wavelength $\lambda$ of 0.83 $\mu$m and in the $Ex_{00}$ mode (the ordinary wave) with the electric field thereof directing in the x-axis, the wavelength dispersion of equivalent refractive index is 2.22 for the fundamental wave in the arms 522A, 522B of $LiNbO_3$. Also, a second harmonic of wavelength $\lambda/2$ of 0.415 $\mu$m is generated in the $Ez_{00}$ mode by the nonlinear constant $d_{31}$ of nonlinear optical crystal material based on the fundamental wave to have the wavelength dispersion of equivalent refractive index of 2.28 in the arms 522A, 522B. Then the period F of polarization inversion is about 6.9 $\mu$m in this case by the equation (22). Therefore, if the polarization domains of polarization inversion layers 526A, 526B are formed at a pitch of about 6.9 $\mu$m, the fundamental wave and the second harmonic may be matched in phase with each other in the polarization inversion layers 526A, 526B.

Similarly, if the fundamental wave is of wavelength $\lambda$ of 0.83 $\mu$m and in the $Ez_{00}$ mode (the extraordinary wave) with the electric field thereof directing in the z-axis, the wavelength dispersion of equivalent refractive index is 2.17 for the fundamental wave in the arms 522A, 522B of LiNbO$_3$. Also, a second harmonic of wavelength λ/2 of 0.415 μm is generated in the Ez$_{00}$ mode by the nonlinear constant d$_{31}$ of nonlinear optical crystal material based on the fundamental wave to have the wavelength dispersion of equivalent refractive index of 2.28in the arms 522A, 522B. Then the period F of polarization inversion is about 3.8 μm in this case by the equation (22). Therefore, if the polarization domains of polarization inversion layers 526A, 526B are formed at a pitch of about 3.8 μm, the fundamental wave and the second harmonic may be matched in phase with each other in the polarization inversion layers 526A, 526B.

The wavelength conversion element of FIG. 37 is operated in the similar manner to that of FIG. 33. The change of voltage V to the electrode 524B causes a change of phase of second harmonic in the arm 522B. The phase-changed second harmonic is coupled with the other second harmonic in the arm 522A. The coupled second harmonics interfere with each other to be modulated in intensity. The second harmonic after the interference is output while substantially moculated in intensity. The wavelength conversion element of FIG. 37 may be modified like the modifications of FIGS. 34–36.

Figure 38:
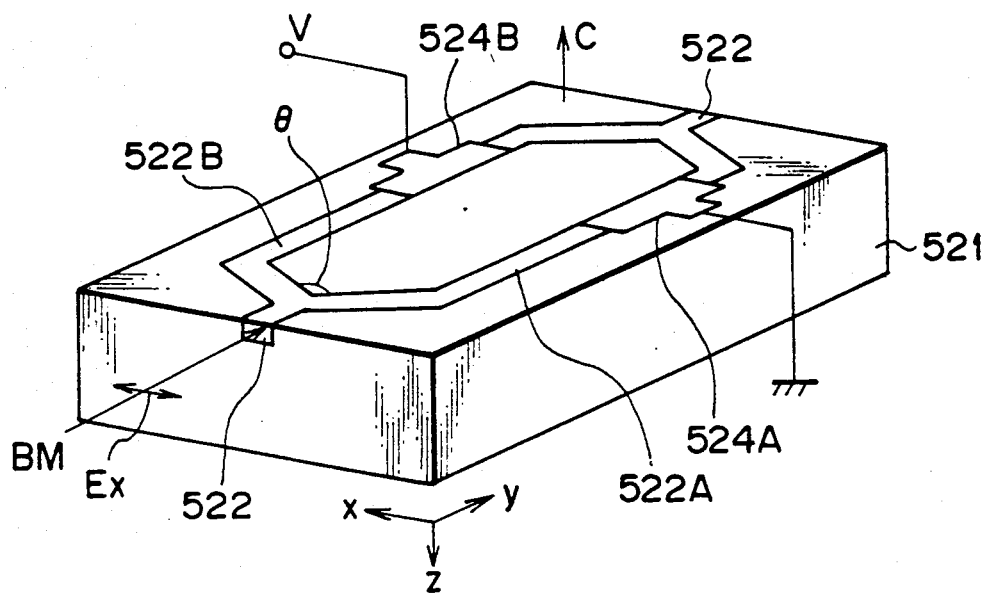
FIG. 38 is a drawing to show a still further embodiment of a wavelength conversion element according to the present invention.

FIG. 38 shows a further embodiment of a wavelength conversion element enabling the intensity modulation. The same numerals as in FIG. 37 are used for similar elements in FIG. 38. In this embodiment, a substrate 521 is made of LiNbO$_3$ or LiNbO$_3$ doped with MgO similarly as in the embodiment of FIG. 37. A waveguide 522 is formed on the substrate 521 and has an interference portion. Electrodes 524A. 524B are provided on the interference portion of waveguide 522 to provide a potential difference. There is no polarization inversion layer formed on the waveguide 522. It is presumed in this embodiment that the fundamental wave introduced has a wavelength λ of not less than 1 μm in the Ex$_{00}$ mode. If the fundamental wave is of wavelength λ of not less than 1 μm in the Ex$_{00}$ mode, a second harmonic may be effectively generated in the waveguide 522 comprised of arms 522A, 522B without a polarization inversion layer for phase matching by using the birefringence of LiNbO$_3$. Then a phase difference is made between two second harmonics by the potential difference between the electrodes 524B, 524A, whereby modulating the intensity of second harmonic similarly as in the embodiment of FIG. 37.

Figure 39:
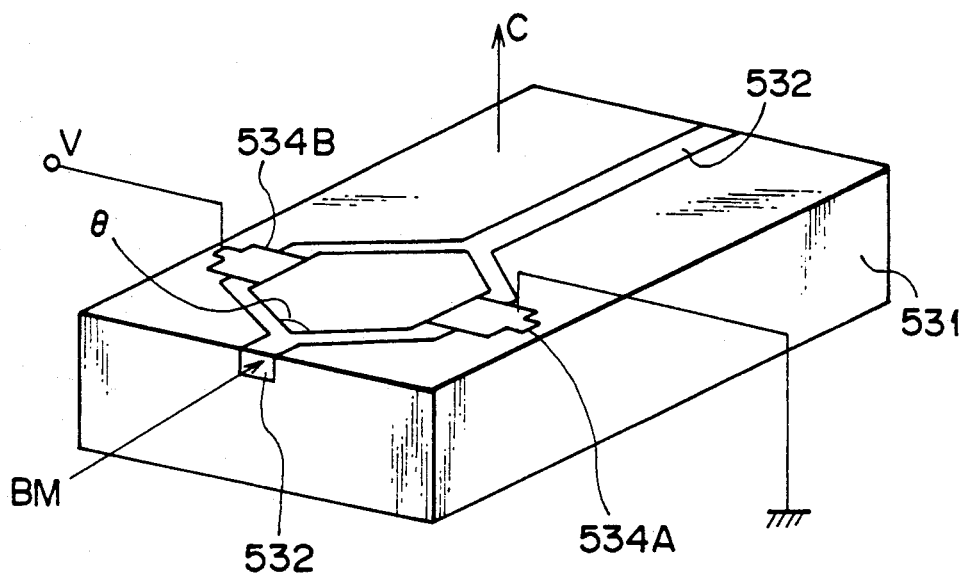
FIG. 39 is a drawing to show a still further embodiment of a wavelength conversion element according to the present invention.

FIG. 39 shows a further embodiment of a wavelength conversion element enabling the intensity modulation. In this embodiment, a substrate 531 is made of nonlinear optical crystal material such as LiTaO$_3$, LiNbO$_3$, or the like. A waveguide 532 is formed by the proton exchange on the substrate 531. An interference portion is provided in the waveguide 532. Electrodes 534A, 534B are provided on the interference portion of waveguide 532.

Since the waveguide 532 is made by the proton exchange in this embodiment, a second harmonic may be generated by the Cherenkov radiation in the waveguide 532 without a polarization inversion layer. This embodiment also enables the intensity modulation of second harmonic similarly as in the embodiment of FIG. 38.

In the embodiments of FIGS. 33–39 as explained, the generation and the intensity modulation of shorter wavelength harmonic may be effected on a single substrate in a simple and compact arrangement, keeping the wavelength conversion element compact. Also, since the intensity of shorter wavelength harmonic may be readily modulated without decrease in conversion efficiency into the shorter wavelength harmonic, the wavelength conversion element is suitable for optical disk apparatus.

There are two arms provided in the interference portion of waveguide in the above embodiments of FIGS. 33–39. Arms more than two are effective for further complex optical modulation control by adjusting phases of guided waves in the arms.

Further, a z plate of KTiOPO$_4$ may be also used for substrate as nonlinear optical crystal material in addition to the LiTaO$_3$, LiNbO$_3$, and the LiNbO$_3$ doped with MgO. When the KTiOPO$_4$ is used, a waveguide may be formed on a substrate by the ion exchange using an ion source of fused salt of RbNO$_3$/Ba (NO$_3$)$_2$.

In the wavelength conversion element enabling the intensity modulation, the waveguide of nonlinear optical medium is provided with the interference portion of plural arms. A variable potential difference is applied between the plural arms of interference portion. Two shorter wavelength harmonics are produced based on the fundamental wave incident into the waveguide and propagate in the respective arms. A phase difference is given between the second harmonics in correspondence to the variable potential difference in the interference portion. The harmonics with the phase difference are coupled with each other and then output from the waveguide. The shorter wavelength harmonic may be effectively output from the element after modulated in intensity by changing the potential difference.

Also in another arrangement, separate fundamental waves propagate in the prulal arms and are given a phase difference corresponding to the variable potential difference. The fundamental waves with the phase difference are coupled with each other and modulated in intensity. A shorter wavelength harmonic may be produced based on the fundamental wave modulated in intensity. Thus the shorter wavelength harmonic modulated in intensity may be effectively output from the element.

When the waveguide is made of nonlinear optical medium of LiTaO$_3$, the performance degradation of element may be minimized even after long term use. Also the element may be produced at a relatively low temperature.

When the waveguide is made of nonlinear optical medium of LiTaO$_3$, the shorter wavelength harmonic may be effectively produced by providing the waveguide with the phase matching portion for matching phases of fundamental wave and shorter wavelength harmonic generated therefrom.

When the waveguide is made of nonlinear optical medium of LiNbO$_3$ or LiNbO$_3$ doped with MgO, the phase matching may be effected by the birefringence of LiNbO$_3$. In such a case, a shorter wavelength harmonic may be effectively produced without a phase matching portion.

When the waveguide is made by the proton exchange, a shorter wavelength harmonic may be produced by the Cherenkov radiation.

It should be noted that the subscripts x, z in the Ex$_{00}$ and the Ez$_{00}$ are usually written as superscripts to the respective E.

As explained above, the present invention provides novel wavelength conversion elements which have never been obtained. The wavelength conversion elements of the present invention enable the generation and the modulation of second harmonic in a single element.

Many widely different embodiments of the present invention may be constructed without departing from the spirit and scope of the present invention. It should be understood that the present invention is not limited to the specific embodiments described in the specification, except as defined in the appended claims.

What is claimed is:

1. A wavelength conversion element comprising:
    a substrate made of LiTaO$_3$, LiNbO$_3$ or LiNbO$_3$ doped with MgO of non-linear optical medium;
    a plurality of three-dimensional waveguides formed in the substrate and crossed on the substrate;
    a potential difference application means formed on an intersection to apply a potential difference for change of optical path of a fundamental wave guided through a waveguide; and
    a second harmonic generation means formed on at least one of the plurality of waveguides for defining a change in refractive index in a waveguide with a period $\Lambda$ and generating a second harmonic of the fundamental wave introduced into the waveguide, where $\Lambda = 2m\pi/\{\beta(2\omega) - 2\beta(\omega)\}$, where m is a natural number, $\omega$ is a frequency of the fundamental wave, $\beta(\omega)$ is a propagation constant of the fundamental wave, and $\beta(2\omega)$ is a propagation constant of the second harmonic.

2. A wavelength conversion element according to claim 1, wherein a polarization with a direction of an electric field parallel to a x axis is used as the fundamental wave and a polarization with a direction of an electric field parallel to the x axis is used as the second harmonic in a case where a $\pm$c plate is used as the substrate, a direction of light propagation is taken as a z axis and the x axis perpendicular to the z axis is taken as a $\pm$c axis of the substrate.

3. A wavelength conversion element according to claim 1, wherein a y-directional polarization with a direction of an electric field parallel to a y axis is used as the fundamental wave and a polarization with a direction of an electric field parallel to an x axis is used as the second harmonic in a case where a $\pm$c plate is used as the substrate, a direction of light propagation is taken as a z axis and a $\pm$c axis of the substrate is taken as the x axis perpendicular to the z axis.

4. A wavelength conversion element according to claim 1, wherein the second harmonic generation means comprises polarization inversion layers transverse of the waveguide and arranged with the period $\Lambda$ for each other.

5. A wavelength conversion element according to claim 1, wherein the second harmonic generation means comprises polarization inversion layers arranged with the period $\Lambda$ for each other on both sides of the waveguide.

6. A wavelength conversion element according to either one of claims 4 or 5, wherein the polarization inversion layers are formed by proton exchange of the substrate.

7. A wavelength conversion element comprising:
    a substrate of non-linear optical medium;
    a plurality of three-dimensional waveguides formed in the substrate and crossed on the substrate;
    a potential difference application means formed on an intersection to apply a potential difference for change of optical path of a fundamental wave guided through a waveguide; and
    a shorter wavelength harmonic generation means formed on at least one of the plurality of waveguides for generating a shorter wavelength harmonic from the fundamental wave introduced into the waveguide.

8. A wavelength conversion element according to claim 7, wherein said wavelength conversion element further comprises a shorter wavelength harmonic annihilation means for annihilating the generated shorter wavelength harmonic.

9. A wavelength conversion element according to claim 7, wherein the substrate is formed of non-linear optical medium of LiTaO$_3$.

10. A wavelength conversion element according to claim 7, wherein the shorter wavelength harmonic generation means is constructed by a phase matching portion for matching phases of the fundamental wave and the shorter wavelength harmonic generated therefrom.

11. A wavelength conversion element according to claim 7, wherein the substrate is made of non-linear optical medium of LiNbO$_3$ or LiNbO$_3$ doped with MgO.

12. A wavelength conversion element according to claim 10, wherein the phase matching portion is formed by polarization inversion with a predetermined period, or by birefringence of non-linear optical medium.

13. A wavelength conversion element according to either one of claims 9 or 11, wherein the plurality of waveguides are proton exchange waveguides.

14. A wavelength conversion element according to claim 8, wherein the shorter wavelength harmonic annihilation means is constructed by a cladding metal layer to absorb the shorter wavelength harmonic.

15. A wavelength conversion element comprising:
    a substrate made of LiTaO$_3$, LiNbO$_3$ or LiNbO$_3$ doped with MgO of non-linear medium;
    a three-dimensional waveguide formed in the substrate; and
    a second harmonic generation means for defining a change in refractive index in the waveguide with a period $\Lambda$ and generating a second harmonic of a fundamental wave introduced into the waveguide, where $\Lambda = 2m\pi/\{\beta(2\omega) - 2\beta(\omega)\}$, where m is a natural number, $\omega$ is a frequency of the fundamental wave, $\beta(\omega)$ is a propagation constant of the fundamental wave, and $\beta(2\omega)$ is a propagation constant of the second harmonic,
    wherein a y-directional polarization with a direction of an electric field parallel to a y axis is used as the fundamental wave and a polarization with a direction of an electric field parallel to an x axis is used as the second harmonic in a case where a $\pm$c plate is used as the substrate, a direction of light propagation is taken as a z axis and a $\pm$c axis of the substrate is taken as the x axis perpendicular to the z axis.

16. A wavelength conversion element according to claim 15, wherein the second harmonic generation means comprises polarization inversion layers transverse of the waveguide and arranged with the period $\Lambda$ for each other.

17. A wavelength conversion element according to claim 15, wherein the second harmonic generation means comprises polarization inversion layers arranged with the period $\Lambda$ for each other on both sides of the waveguide.

* * * * *